US008514968B2

(12) United States Patent
Jovicic et al.

(10) Patent No.: US 8,514,968 B2
(45) Date of Patent: Aug. 20, 2013

(54) METHODS AND APPARATUS FOR ENCODING AND TRANSMITTING MOBILE DEVICE LOCATION INFORMATION

(75) Inventors: Aleksandar Jovicic, Jersey City, NJ (US); Cyril Measson, Somerville, NJ (US); Thomas Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 12/875,419

(22) Filed: Sep. 3, 2010

(65) Prior Publication Data

US 2012/0057646 A1 Mar. 8, 2012

(51) Int. Cl.
*H04L 27/00* (2006.01)

(52) U.S. Cl.
USPC .......................................... 375/295; 375/267

(58) Field of Classification Search
USPC ........................................ 375/267, 295, 299
See application file for complete search history.

(56) References Cited

U.S. PATENT DOCUMENTS

| 6,414,608 | B1* | 7/2002 | Nishida et al. ................... 341/67 |
| 6,456,852 | B2 | 9/2002 | Bar et al. |
| 6,757,544 | B2 | 6/2004 | Rangarajan et al. |
| 6,823,189 | B2 | 11/2004 | Akhteruzzaman et al. |
| 7,057,556 | B2 | 6/2006 | Hall et al. |
| 7,576,692 | B2 | 8/2009 | Sairo et al. |
| 2002/0119789 | A1 | 8/2002 | Friedman |
| 2006/0052116 | A1 | 3/2006 | Bhogal et al. |
| 2006/0106850 | A1 | 5/2006 | Morgan et al. |
| 2008/0032705 | A1 | 2/2008 | Patel et al. |
| 2011/0126067 | A1* | 5/2011 | Rezk et al. ................... 714/748 |
| 2011/0194638 | A1* | 8/2011 | Erell et al. ................... 375/267 |

FOREIGN PATENT DOCUMENTS

| EP | 1176840 A1 | 1/2002 |
| JP | 2009059199 A | 3/2009 |
| WO | 2004111676 A1 | 12/2004 |
| WO | 2008049971 A1 | 5/2008 |

OTHER PUBLICATIONS

International Search Report and Written Opinion—PCT/US2011/050416, International Search Authority—European Patent Office, Aug. 8, 2012.

* cited by examiner

*Primary Examiner* — Emmanuel Bayard
(74) *Attorney, Agent, or Firm* — James K. O'Hare

(57) ABSTRACT

Methods and apparatus for communicating the location of a mobile wireless communications device are described. Codewords, e.g., values or sets of bits, are selected from a codebook mapping different codewords to corresponding pieces of location information. In a first approach location information is communicated by using codewords from different codebooks with the product, e.g., intersection of location information provided by the codewords, providing relatively detailed location information using relatively few bits. In a second approach user specific codebooks are defined for individual users. The codewords in the codebook corresponding to a particular user map to locations the individual specific user is likely to frequent. In another approach codewords are transmitted at different power levels and/or using different coding rates. Received codewords corresponding to a device may be used in combination to determine the location or refine the understanding of the device location.

45 Claims, 30 Drawing Sheets

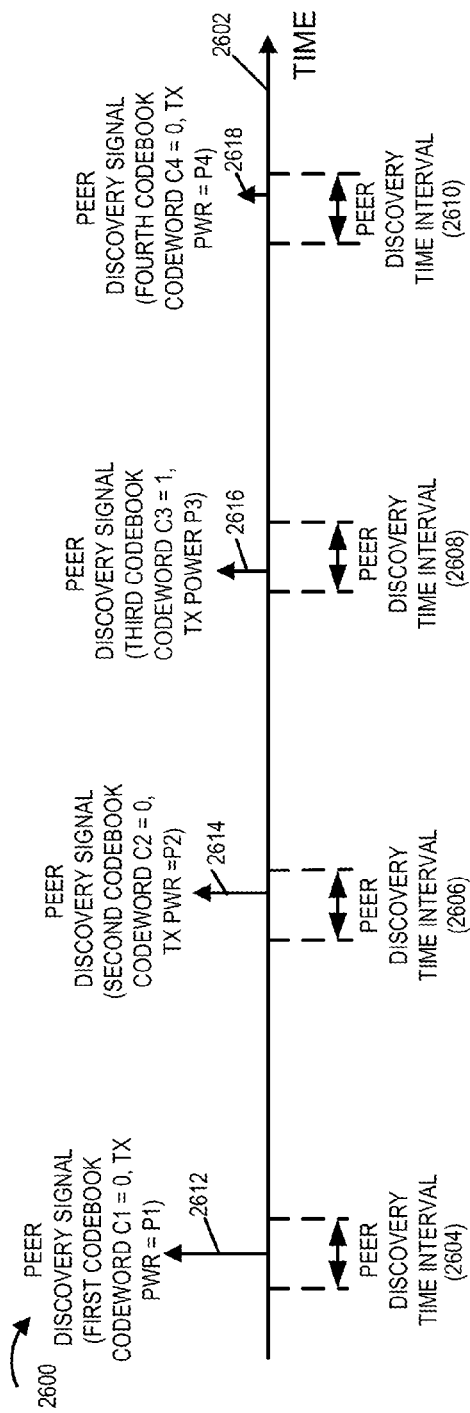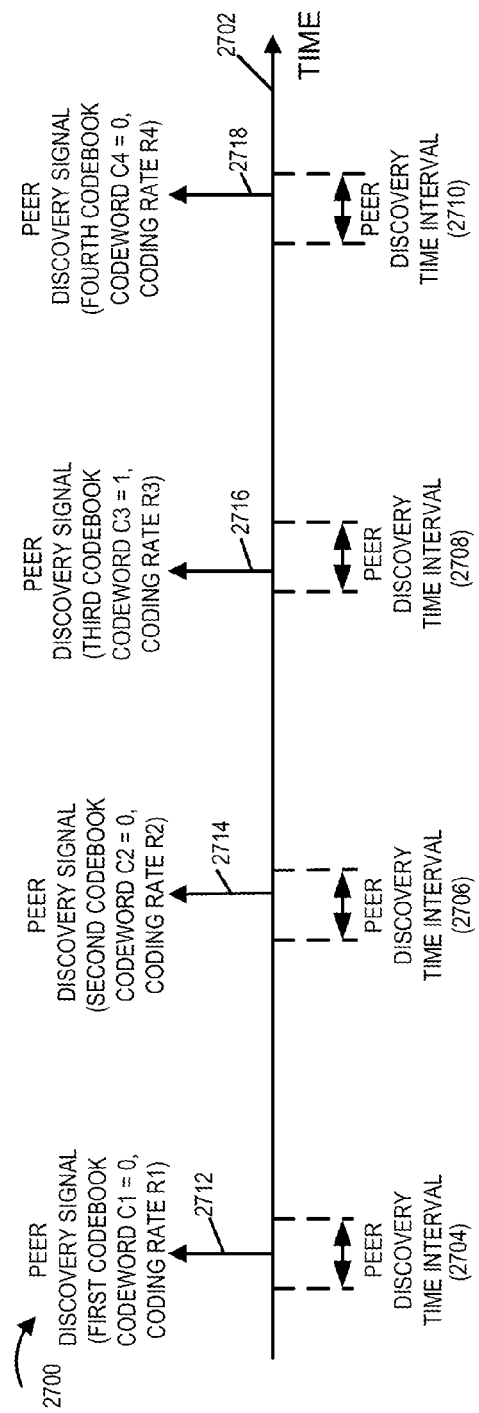

METHODS AND APPARATUS FOR ENCODING AND TRANSMITTING MOBILE DEVICE LOCATION INFORMATION

FIELD

Various embodiments relate to wireless communications, and more particularly, to methods and apparatus related to encoding and/or communicating mobile device location information.

BACKGROUND

A multitude of applications can be envisioned for a mobile device that can determine its own location in physical space. For example, by knowing its location relative to a map of the space it is in, the mobile device can determine locations of interest and how to reach them. But this implicitly assumes that these locations of interest are fixed in time and documented in the map. If, however, the mobile device is interested in interacting with other mobile devices whose locations are potentially changing, then it will need to periodically receive updates about the locations of those mobile devices. A wealth of social networking applications would be enabled if mobile devices could locate each other. The challenge is to design an efficient, low-latency location update protocol requiring minimal communication between devices and, consequently, minimal battery power consumption.

In view of the above, it should be appreciated that there is a need for methods and apparatus which allow for the communication of location information using relatively few communications resources. That is, there is a need for efficient methods of communicating location information using broadcast signals which include relatively few bits. It is desirable that in at least some embodiments that location information can be communicated using one or more peer discovery time periods which may be spaced apart from one another in time.

SUMMARY

Codewords, e.g., values or sets of bits, are selected from a codebook mapping different codewords to corresponding pieces of location information. A codeword may map to, e.g., a portion of a map, an office location, a conference room location, a water cooler location, etc. Different codeword codebooks (dictionaries) may be used with the codewords corresponding to different codebooks mapping to different types of location information.

In a first approach to communicating location information by using codewords from different codebooks to communicate information, the product of the communicated codewords, e.g., intersection of the location information, such as a map sector and office location, provides relatively detailed location information using relatively few bits.

In a second approach which can be used alone or in combination with the first approach, user specific codebooks are defined for individual users. The codewords in the codebook corresponding to a particular user map to locations the individual specific user is likely to frequent. This may be known from past behavior reported by the user, e.g., which locations were visited in the recent past. The user specific codebooks are distributed, e.g., based on a buddy list and stored by mobile devices for later use. When attempting to determine the location of a peer device from a received codeword, the receiving device uses the user specific codebook corresponding to the transmitting device to interpret the received codeword. Thus for different users the same codeword can have very different location meanings. However, through the use of user specific codebooks location information may be communicated by individual users with a high level of accuracy using relatively few bits for the vast majority or all of the locations likely to be visited by a user.

A third approach is similar to the first approach in that products of codewords are used to provide more location information than an individual codeword alone provides. In this approach different codewords may be transmitted during different peer discovery time intervals. Each received codeword provides some location information. Over time, as a device receives additional codewords it refines its understanding of the location of the device transmitting the codewords. The refinement is possible because the product of multiple codewords provides additional information allowing for refinement of the location information based on the intersection of the location information provided by different codewords. While multiple codewords can be used by a receiving device to precisely determine the location of the transmitting device, receipt of a codeword during a single peer discovery time interval still provides at least some location information which can be used by itself to determine, at least roughly, the location of the transmitting device.

Still another approach relates to the use of what may be considered multi-resolution codebooks. This approach is based on the idea that if you are close to a device you should be able to determine the transmitting device's location quickly and precisely while if you are further away a quick coarse location determination is desirable. In accordance with this approach, location detail information is transmitted in addition to coarse location information. The coarse and detail location information may be transmitted in the same discovery time interval. Devices far away receive and decode the coarse information which is transmitted at a lower coding rate and/or higher power level then the location detail information. This makes it possible to recover the coarse location information over a greater range than the location detail information. However nearby devices are able to receive the (low power/high rate) location detail information in addition to the coarse location information. By combining the location detail information with the coarse location information nearby devices are able to quickly and accurately determine the location of a peer device while distant devices are able to recover and quickly determine, at least coarsely, the location of the device. In such an embodiment, the distant device may not be able to recover the location detail information but given that the device is remote to the transmitting device, the level of location accuracy is normally less important than in the case of a nearby device.

Many aspects of the above four approaches to communicating location information may be used alone or in combination.

An exemplary method of operating a mobile wireless device, in accordance with some embodiments, comprises: selecting, based on a location of the device, a first codeword from a first codebook and selecting, based on the location of the device, a second codeword from a second codebook, wherein said first codeword corresponds to a first geographic area and the second codeword corresponds to a second geographic area. The exemplary method further comprises transmitting said first and second codewords. The intersection of the first and second areas to which the first and second codewords correspond indicates the location of the device. An exemplary mobile wireless device, in accordance with some embodiments, comprises: at least one processor configured to: select, based on a location of the device, a first codeword from a first codebook, said first codeword corresponding to a first geographic area; select, based on the location of the device, a second codeword from a second codebook, said second codeword corresponding to a second geographic area; and transmit said first and second codewords, the intersection of the first and second areas to which the first and second codewords correspond indicating the location of the device. The exemplary mobile wireless device further comprises memory coupled to said at least one processor.

An exemplary method of operating a first device to determine the location of a second device, in accordance with some embodiments, comprises: receiving a peer discovery signal from said second device providing a codeword communicating location information; selecting, based on a user identifier or device identifier associated with the received peer discovery signal, which one of a plurality of user specific sets of codeword to location mapping information to use in interpreting the received codeword; and determining a location of the second device indicated by the received codeword from the selected one of the user specific sets of codeword to location mapping information. An exemplary first device, in accordance with some embodiments, comprises: at least one processor configured to: receive a peer discovery signal from a second device providing a codeword communicating location information; select, based on a user identifier or device identifier associated with the received peer discovery signal, which one of a plurality of user specific sets of codeword to location mapping information to use in interpreting the received codeword; and determine a location of the second device indicated by the received codeword from the selected one of the user specific sets of codeword to location mapping information. The exemplary first device further comprises memory coupled to said at least one processor.

An exemplary method of operating a device to transmit location information, in accordance with some embodiments, comprises: determining, based on the location of said device, first location information to transmit; determining, based on the location of said device, second location information to transmit, said second location information indicating a second geographic area which intersects a first geographic area indicated by said first location information; transmitting the first location information at a first power level and at a first coding rate; and transmitting the second location information at a second power level and at a second coding rate, at least one of: the second power level being lower than said first power level and the second coding rate being higher than said first coding rate. An exemplary device, e.g., a mobile wireless device, in accordance with some embodiments, comprises at least one processor configured to: determine, based on the location of said device, first location information to transmit; determine, based on the location of said device, second location information to transmit, said second location information indicating a second geographic area which intersects a first geographic area indicated by said first location information; transmit the first location information at a first power level and at a first coding rate; and transmit the second location information at a second power level and at a second coding rate, at least one of: the second power level being lower than said first power level and the second coding rate being higher than said first coding rate. The exemplary device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 26 includes a drawing illustrating exemplary signaling in which signals communicating codewords from different codebooks are transmitted at different power levels, wherein the codewords communicate device location information.

FIG. 27 includes a drawing which illustrates exemplary signaling in which signals communicating codewords from different codebooks are transmitted, wherein different coding rates are used, wherein the codewords communicate location information.

DETAILED DESCRIPTION

Figure 1:
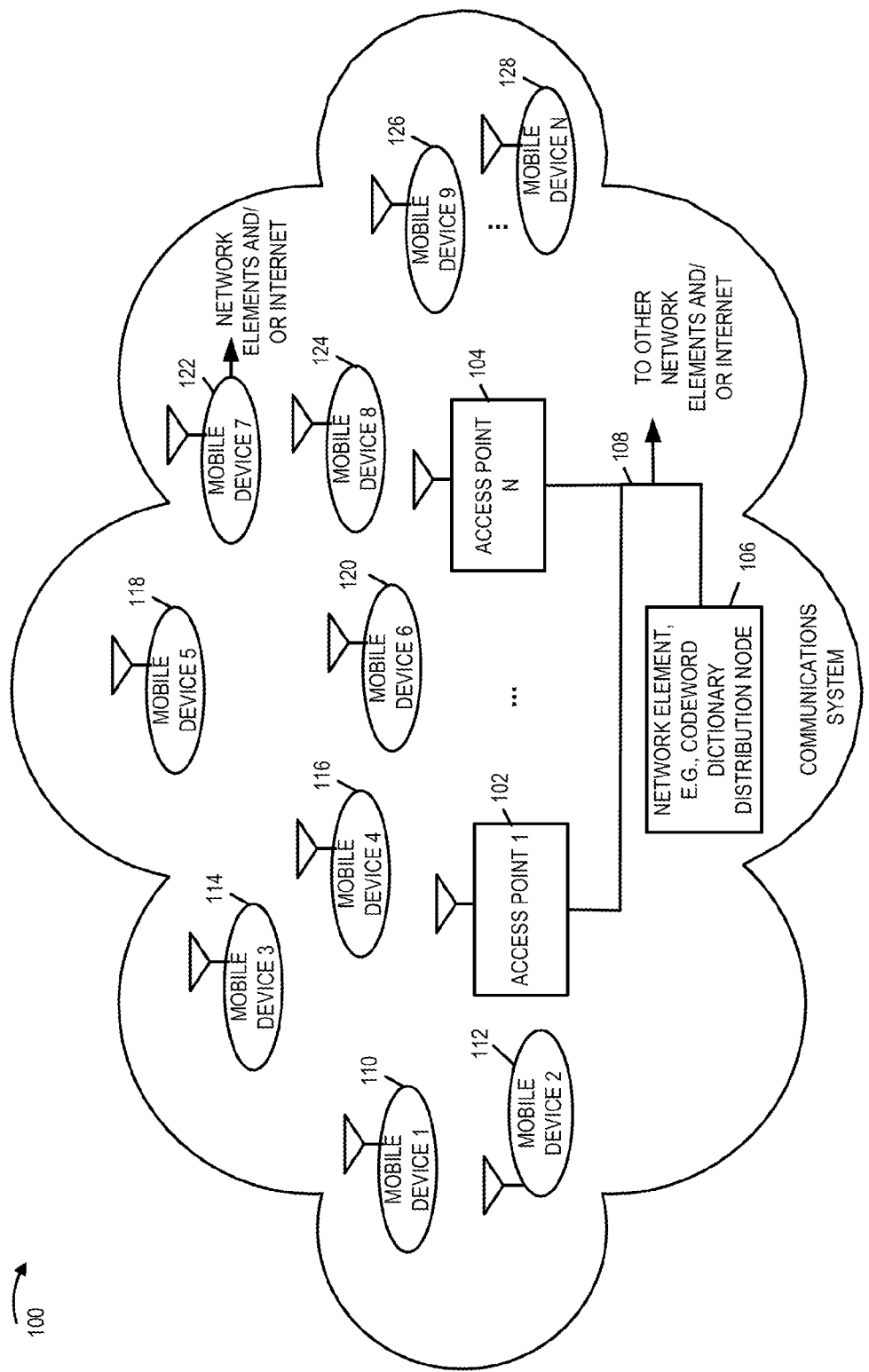
FIG. 1 is a drawing of an exemplary wireless communications system, in accordance with an exemplary embodiment.

FIG. 1 is a drawing of an exemplary wireless communications system 100, in accordance with an exemplary embodiment. Exemplary wireless communications system 100 includes a plurality of access points, e.g., base stations, (access point 1 102, . . . , access point N 104) coupled to one another and coupled to other network nodes including network element 106 via a backhual network 108. Network element 106 is, e.g., a codeword dictionary distribution node.

Wireless communications system 100 further includes a plurality of mobile wireless devices, e.g., mobile wireless terminals, (mobile device 1 110, mobile device 2 112, mobile device 3 114, mobile device 4 116, mobile device 5 118, mobile device 6 120, mobile device 7 122, mobile device 8 124, mobile device 9 126, . . . , mobile device N 128. The mobile wireless devices (110, 112, 114, 116, 118, 120, 122, 124, 126, . . . , 128) support communications via an access point and also support peer to peer communications, e.g., direct communications between mobile devices.

Mobile devices communicate device location information, e.g., via codewords corresponding codebooks associated with maps. In various embodiments, different codebooks associated with different mappings are used to transmit a mobile device's location. In some embodiments, the codewords communicating location information are transmitted during peer discovery time periods, e.g. in a recurring peer to peer timing structure. In various embodiments, user specific codeword dictionaries are generated, distributed, and utilized for encoding and recovering device location information. This approach facilitates tailoring a codeword dictionary to locations frequently visited by a particular device and supports efficient communication of location information.

In some embodiments, a mobile device transmits first location information indicating a first geographic area in which the device is located and second location information indicating a second geographic area in which the device is located. The intersection of the first and second geographic areas is used to communicate a more refined location indication. In some embodiments the first and second location information are transmitted using different power levels and/or different coding rates. In various embodiments, this approach facilitates different levels of accuracy of device location as a function of distance between devices and/or channel conditions between devices.

Figure 2:
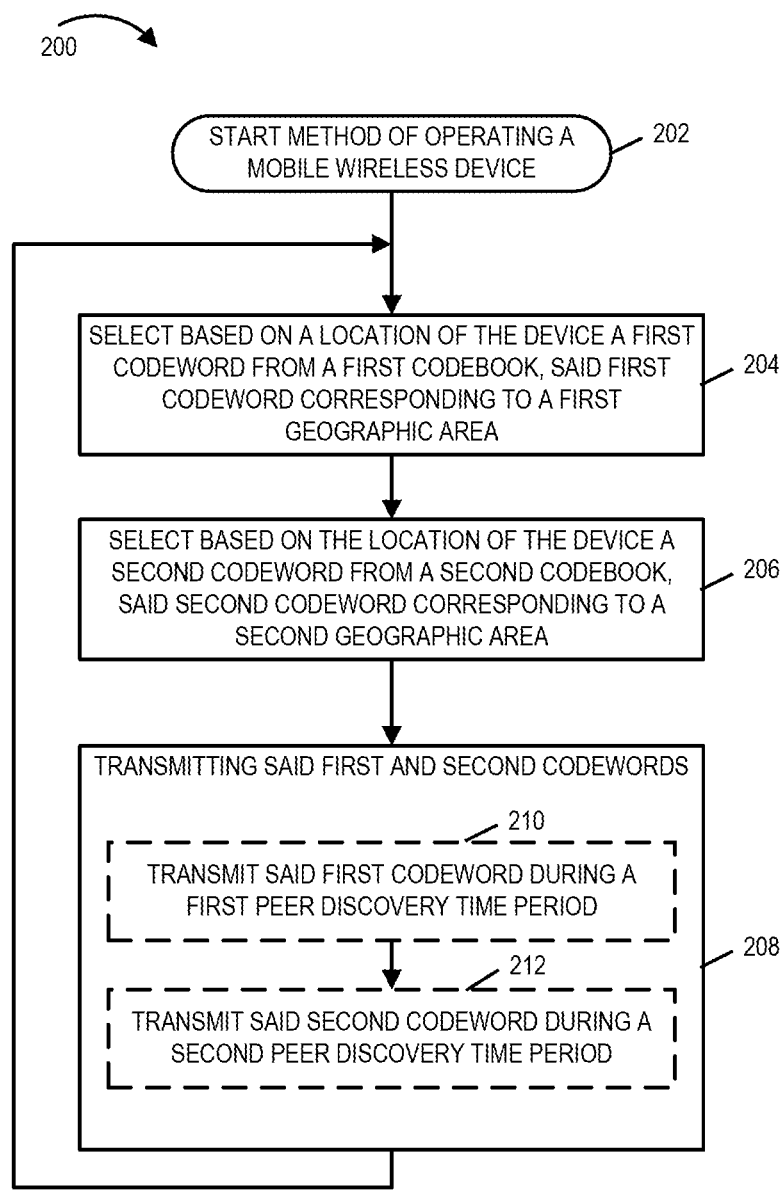
FIG. 2 is a flowchart illustrating exemplary methods of operating a mobile wireless device in accordance with various exemplary embodiments.

FIG. 2 is a flowchart 200 of an exemplary method of operating a mobile wireless device, e.g., a mobile wireless terminal, in accordance with various exemplary embodiments. The mobile wireless device is, e.g., a mobile wireless terminal supporting peer to peer communications. The exemplary method communicates the position of the device using codewords.

Operation starts in step 202, where the mobile wireless device is powered on and initialized and proceeds to step 204. In step 204 the mobile wireless device selects, based on a location of the device, a first codeword from a first codebook, said first codeword corresponding to a first geographic area. The first geographic area is, e.g., a tile of a first map including a plurality of tiles. In some embodiments, codewords of the first codebook correspond to different areas of a first map, e.g., different sectors of a first map. Operation proceeds from step 204 to step 206.

In step 206 the mobile wireless device selects, based on the location of the device, a second codeword from a second codebook, said second codeword corresponding to a second geographic area. The second geographic area is, e.g., a tile of a second map including a plurality of tiles, wherein the second map has different divisions from the first map. In some embodiments, the codewords of the second codebook correspond to different areas of a second map, e.g., different sectors of a second map. In some such embodiments, the second map has different tiling than the first map. In various embodiments, the codewords of the second codebook correspond to locations of different types, and an individual word in the second codebook indicates one of the different types. Two exemplary different types of locations include an office location type and a conference room location type. In some embodiments, the second codeword indicates a nearest office or conference room to the current location of the device. Operation proceeds from step 206 to step 208.

In step 208 the mobile wireless device transmits said first and second codewords. The intersection of the first and second areas to which the first and second codewords correspond indicates the location of the device. In some embodiments, step 208 includes steps 210 and 212. In step 210 the mobile wireless device transmits said first codeword during a first peer discovery time period, and during step 212 the mobile wireless device transmits said second codeword during a second peer discovery time operation. In some embodiments, the first and second codewords provide location information which can be used independently to coarsely determine the location of the device. In some such embodiments, the first and second codewords can be used in combination to determine the location of the device with greater accuracy than can be determined from a single one of said first and second codewords. Operation proceeds from step 208 to step 204.

In one exemplary embodiment, the first map is partitioned into a grid of sectors, each sector corresponding to a different codeword in the first codebook, and the second map is partitioned based on type, e.g., conference room type, hall type, cubicle type, etc., each type corresponding to a different codeword in the second codebook. In some such embodiments, an area corresponding to a codeword of the second codebook may, and sometimes does includes non-contiguous portions. In another exemplary embodiment, the first map is partitioned into a grid of sectors, each sector corresponding to a different codeword in the first codebook, and the second map is partitioned based on type, e.g., region near window, region where right hand turn can be made, straightaway region, etc., each type corresponding to a different codeword in the second codebook. In some such embodiments, an area corresponding to a codeword of the second codebook may, and sometimes does includes non-contiguous portions.

Figure 3:
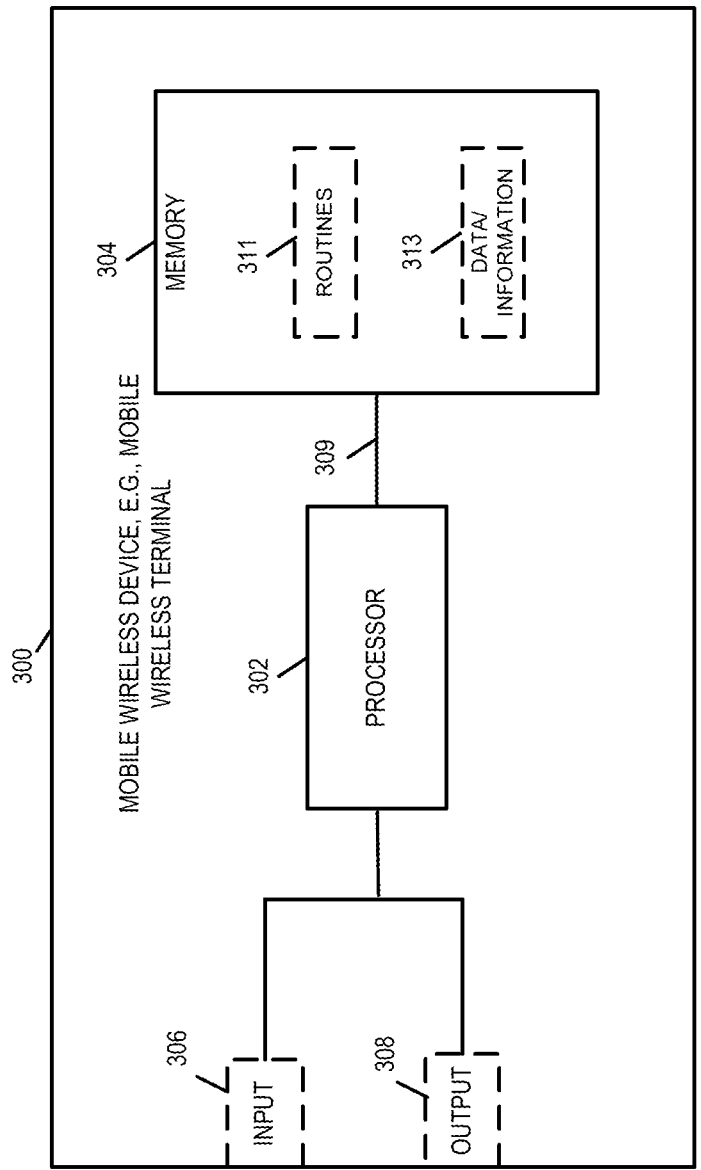
FIG. 3 is a drawing of an exemplary mobile wireless device in accordance with an exemplary embodiment.

FIG. 3 is a drawing of an exemplary mobile wireless device, e.g., a mobile wireless terminal, in accordance with an exemplary embodiment. Exemplary mobile device 300 is, e.g., one of the mobile devices of system 100 of FIG. 1. Exemplary mobile device 300 may, and sometimes does, implement a method in accordance with flowchart 200 of FIG. 2.

Mobile wireless device 300 includes a processor 302 and memory 304 coupled together via a bus 309 over which the various elements (302, 304) may interchange data and information. In some embodiments, memory 304 includes routines 311 and data/information 313. Mobile wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

In some embodiments, processor 302 is configured to: select, based on a location of the device, a first codeword from a first codebook, said first codeword corresponding to a first geographic area; select, based on the location of the device, a second codeword from a second codebook, said second codeword corresponding to a second geographic area; and transmit said first and second codewords, the intersection of the first and second areas to which the first and second codewords correspond indicating the location of the device.

In some embodiments, the codewords of the first codebook correspond to different areas of a first map. In various embodiments, codewords of the second codebook correspond to different areas of a second map. In some such embodiments codewords of the second codebook correspond to locations of different types, an individual word in said second codebook indicating one of said different types. In various embodiments, the second codeword indicates a nearest office or conference room to the current location of the device.

In various embodiments, processor 302 is further configured to transmit said first code word during a first peer discovery time period and transmitting said second codeword during a second peer discovery time period, as part of being configured to transmit said first and second codewords. In some such embodiments, said first and second codewords provide location information which can be used independently to coarsely determine said location of the device. In some embodiments, said first and second codewords can be used in combination to determine the location of the first device with greater accuracy than can be determined from a single one of said first and second codewords.

Figure 4:
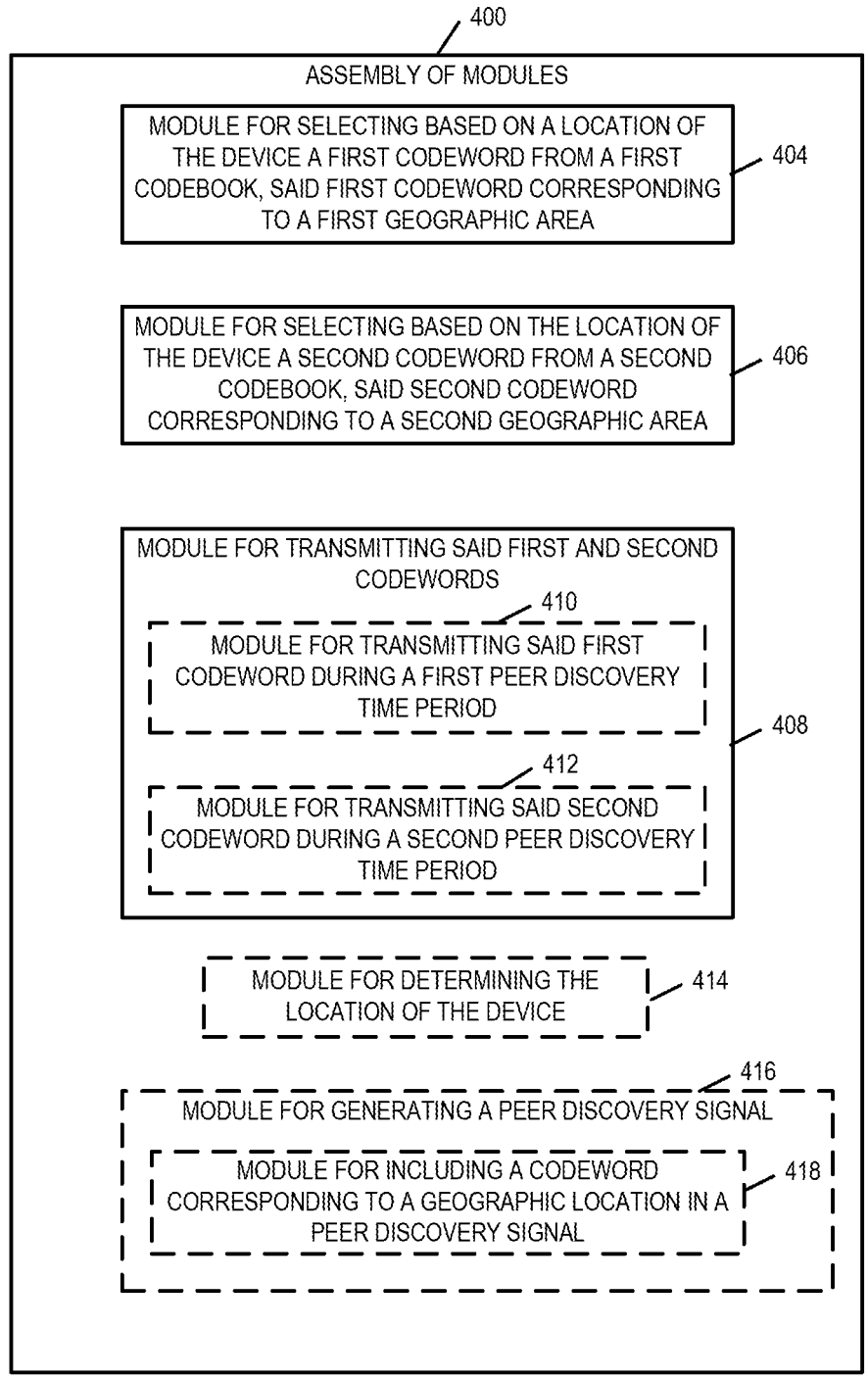
FIG. 4 is an assembly of modules which may be used in the exemplary mobile wireless device of FIG. 3.

FIG. 4 is an assembly of modules 400 which can, and in some embodiments is, used in the mobile wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the mobile wireless device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile device 300 or elements therein such as the processor 302, to perform the functions of the corresponding steps illustrated and/or described in the method of flowchart 200 of FIG. 2.

Assembly of modules 400 includes a module 404 for selecting, based on a location of the first device, a codeword form a first codebook, said first codeword corresponding to a first geographic location, a module 406 for selecting, based on the location of the device, a second codeword from a second codebook said second codebook corresponding to a second geographic location, and a module 408 for transmitting said first and second codewords. The intersection of the first and second areas to which the first and second codewords correspond indicates the location of the device.

In some embodiments, module 408 for transmitting said first and second codewords includes a module 410 for transmitting said first codeword during a first peer discovery time period and a module 412 for transmitting said second codeword during a second peer discovery time period. In some embodiments, the first and second codewords provide location information which can be used independently to coarsely determine the location of the device. In some such embodiments, the first and second codewords can be used in combination to determine the location of the first device with greater accuracy than can be determined from a single one of said first and second codewords.

In some embodiments, the codewords of the first codebook correspond to different areas of a first map. In some embodiments, the codewords of the second codebook correspond to different areas of a second map. In some such embodiments, the codewords of the second codebook correspond to locations of different types, an individual word in said second codebook indicating one of said different types. In one such embodiments, the second codeword indicates a nearest office or conference room to the current location of the device.

In various embodiments, assembly of modules 400 includes a module 414 for determining the location of the device. The determined location of the device from module 414 is used by modules 404 and module 406.

In some embodiments, assembly of modules 400 includes a module 416 for generating a peer discovery signal. In some such embodiments, module 416 includes a module 418 for including a codeword corresponding to a geographic location in a peer discovery signal. Module 416, when included, can be used to generate a first peer discovery signal communicating said first codeword, and a second peer discovery signal communicating said second codeword.

Figure 5:
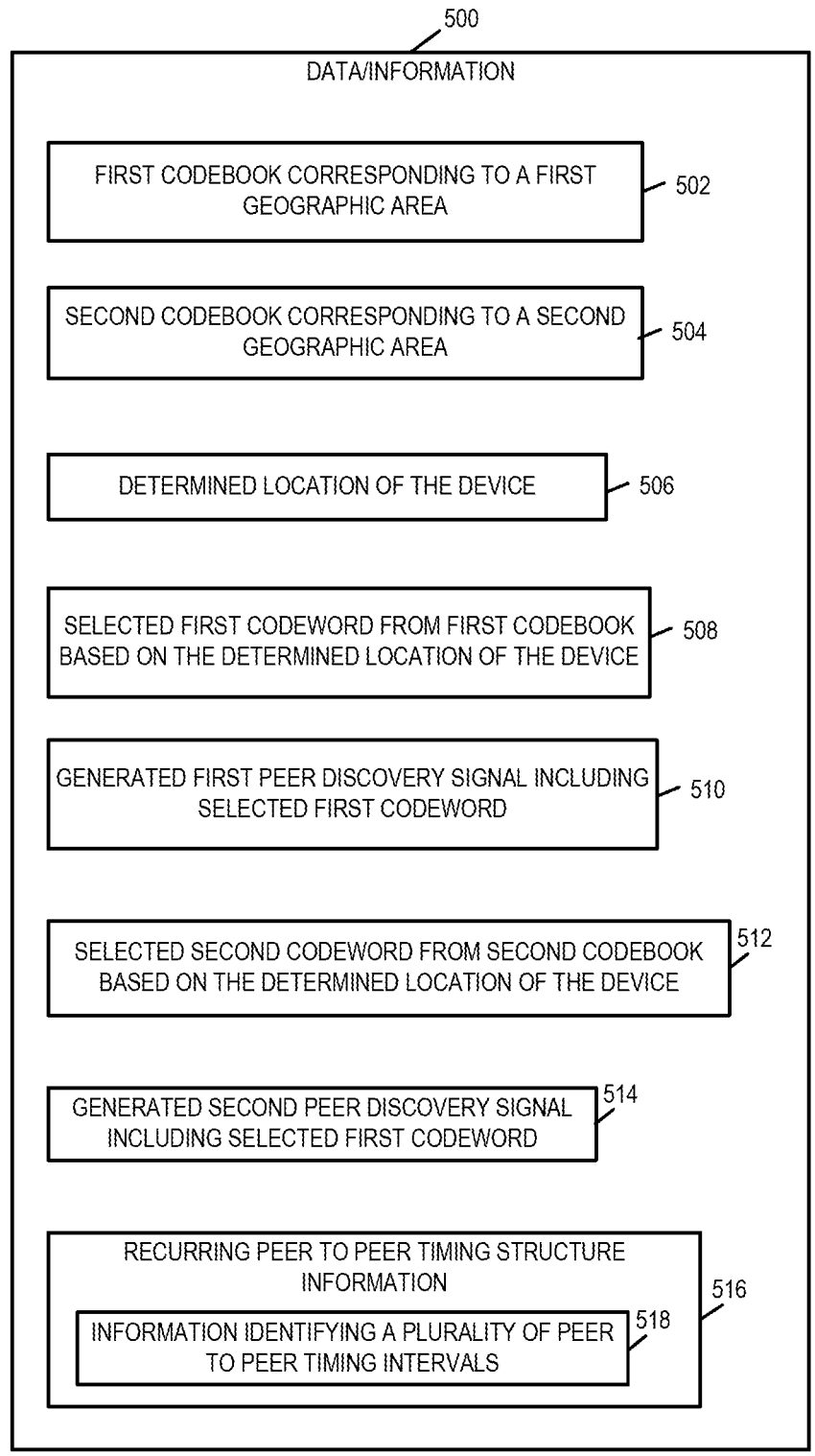
FIG. 5 is a drawing of exemplary data/information, which may be included in the memory of the device of FIG. 3.

Exemplary data/information 500 of FIG. 5 is, e.g., included in data/information 313 of memory 304 of device 300 of FIG. 3. Data/information 500 includes a first codebook corresponding to a first geographic area 502, a second codebook corresponding to a second geographic area 504, a determined location of the device 506, a selected first codeword from the first codebook based on the determined location of the device 508, a generated first peer discovery signal including the selected first codeword 510, a selected second codeword from the second codebook based on the determined location of the device 512, a generated second peer discovery signal including the selected first codeword 514 and recurring peer to peer timing structure information 516. The recurring peer to peer timing structure information includes information identifying a plurality of pee to peer timing intervals. The first codebook 502 and the determined location 506 are used as inputs by module 404 which selects first codeword 508 which is an output of module 404. The second codebook 504 and the determined location 506 are used as inputs by module 406 which selects second codeword 514 which is an output of module 406. Module 416 uses the selected first codeword 508 to generate a first peer discovery signal 510 which is transmitted by module 408. Module 410 uses the peer to peer timing information 516 including the information 518 identifying peer discovery time intervals to control the mobile wireless device to transmit the first peer discovery signal including the first codeword during a first peer discovery time interval. Module 416 uses the selected second codeword 512 to generate a second peer discovery signal 514 which is transmitted by module 408. Module 412 uses the peer to peer timing information 516 including the information 518 identifying peer discovery time intervals to control the mobile wireless device to transmit the second peer discovery signal including the second codeword during a second peer discovery time interval.

Figure 6:
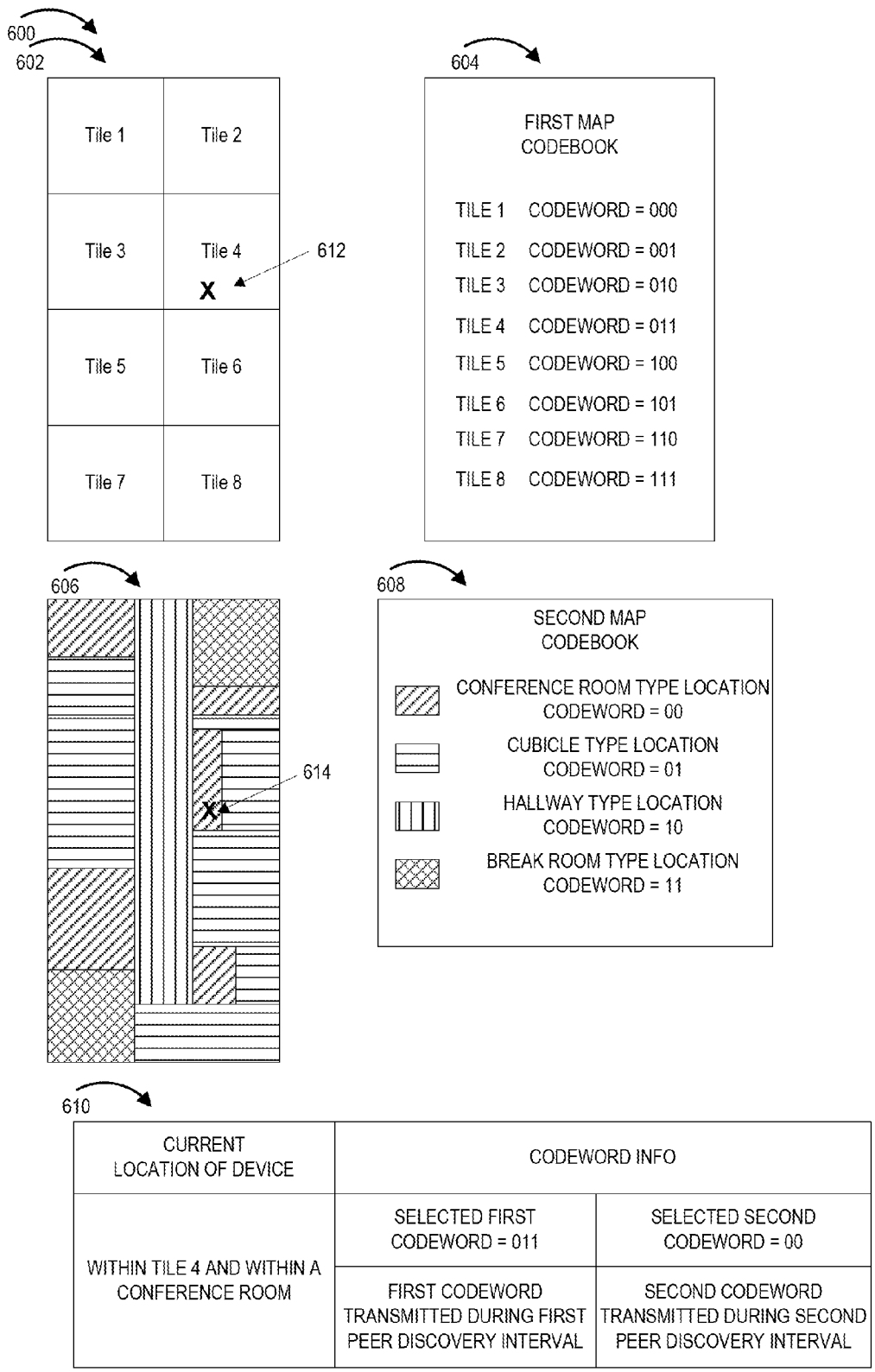
FIG. 6 is a drawing illustrating an exemplary first map, an exemplary first map codebook, an exemplary second map, an exemplary second map codebook, and a table illustrating an example of current device location being communicated by via two codewords, one codeword from each of the two codebooks.

FIG. 6 is a drawing 600 illustrating an exemplary first map 602, an exemplary corresponding first map codebook 604, an exemplary second map 606, an exemplary corresponding second map codebook 608, and a table 610 illustrating an example of current device location being communicated via two codewords, one codeword from each of the two codebooks.

In exemplary first map 602, the area of the map is partitioned into 8 tiles (tile 1, tile 2, tile 3, tile 4, tile 5, tile 6, tile 7, tile 8). In this example, each of the 8 tiles is the same size. In other embodiments, some tiles may be larger than others. First map codebook 604 includes information indicating: (i) that if the location of the device is in the geographic area designated by tile 1 the codeword to be used is 000; (ii) that if the location of the device is in the geographic area designated by tile 2 the codeword to be used is 001; (iii) that if the location of the device is in the geographic area designated by tile 3 the codeword to be used is 010; (iv) that if the location of the device is in the geographic area designated by tile 4 the codeword to be used is 011; (v) that if the location of the device is in the geographic area designated by tile 5 the codeword to be used is 100; (vi) that if the location of the device is in the geographic area designated by tile 6 the codeword to be used is 101; (vii) that if the location of the device is in the geographic area designated by tile 7 the codeword to be used is 110; and (viii) that if the location of the device is in the geographic area designated by tile 8 the codeword to be used is 111.

In the exemplary second map 606, the area of the map is divided up accordance to different types of locations. A conference room type location is indicated by diagonal line shading; a cubicle type location is indicated by horizontal line shading; a hallway type location is indicated by vertical line shading; and a break room type location is indicated by crosshatch shading. Second map codebook 608 includes information indicating: that if the location of the device is in the geographic area designated as a conference room type location, the codeword to be used is 00; (ii) that if the location of the device is in the geographic area designated as a cubicle type location, the codeword to be used is 01; (iii) that if the location of the device is in the geographic area designated as a hallway type location, the codeword to be used is 10; and (iv) that if the location of the device is in the geographic area designated as a break room type location, the codeword to be used is 11.

Further consider that the first map 602 and the second map 606 correspond to the same coverage area, e.g., the maps overlay one another. In the example, of table 610, consider that the location of the device is indicated by X 612 in first map 602 and X 614 in second map 606. The current location of the device is within tile 4; therefore, the selected first codeword from the first codebook 604 is 011. The first codeword is transmitted during a first peer discovery interval, e.g., as part of a first peer discovery signal. The current location of the device is within a conference room type location; therefore, the selected second codeword from the second codebook 608 is 00. The second codeword is transmitted during a second peer discovery interval, e.g., as part of a second peer discovery signal.

Figure 7:
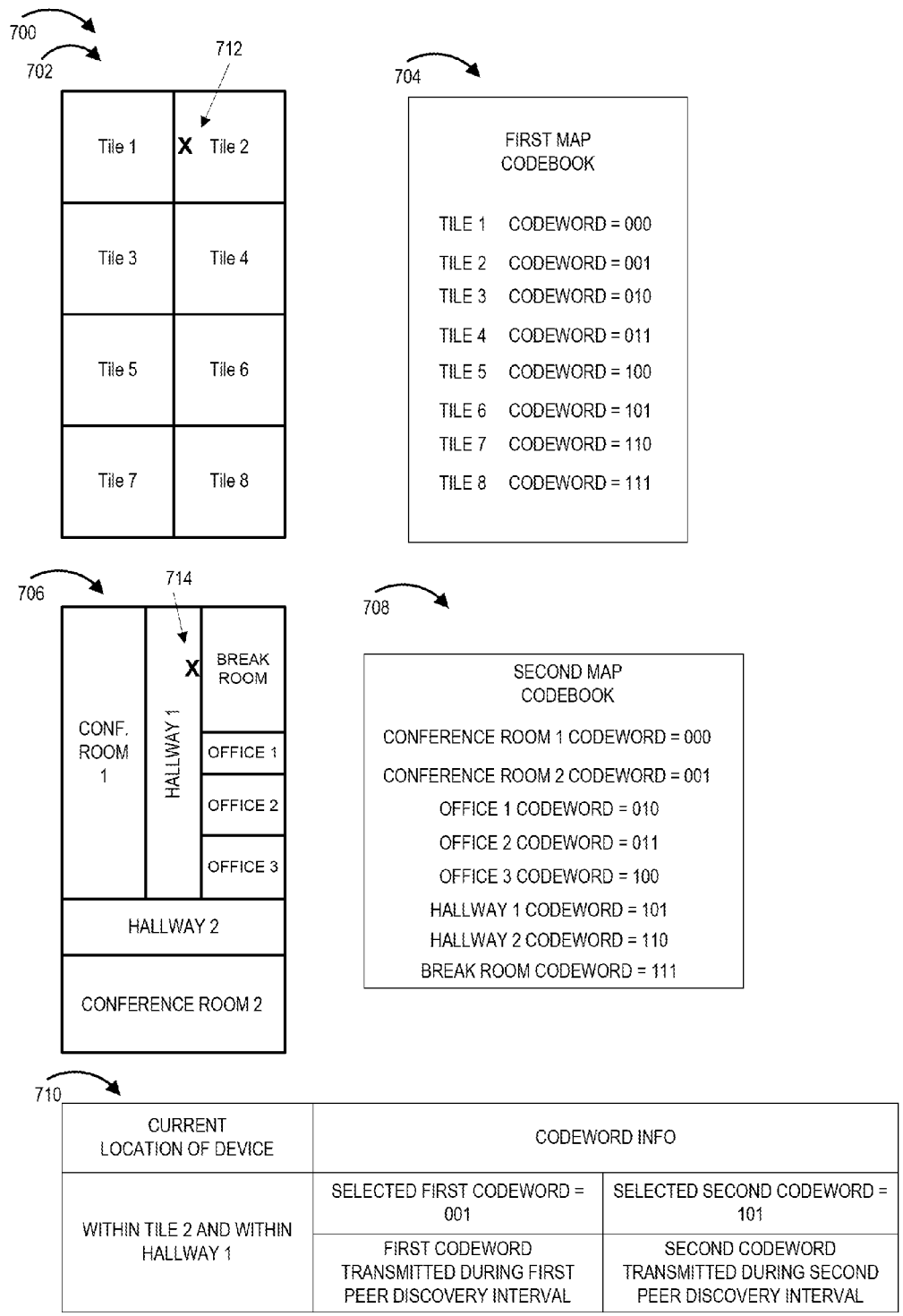
FIG. 7 is a drawing illustrating an exemplary first map, an exemplary first map codebook, an exemplary second map, an exemplary second map codebook, and a table illustrating an example of current device location being communicated by via two codewords, one codeword from each of the two codebooks.

FIG. 7 is a drawing 700 illustrating an exemplary first map 702, an exemplary corresponding first map codebook 704, an exemplary second map 706, an exemplary corresponding second map codebook 708, and a table 710 illustrating an example of current device location being communicated via two codewords, one codeword from each of the two codebooks.

In exemplary first map 702, the area of the map is partitioned into 8 tiles (tile 1, tile 2, tile 3, tile 4, tile 5, tile 6, tile 7, tile 8). In this example, each of the 8 tiles is the same size. In other embodiments, some tiles may be larger than others. First map codebook 704 includes information indicating: (i) that if the location of the device is in the geographic area designated by tile 1, the codeword to be used is 000; (ii) that if the location of the device is in the geographic area designated by tile 2, the codeword to be used is 001; (ii) that if the location of the device is in the geographic area designated by tile 3, the codeword to be used is 010; (iv) that if the location of the device is in the geographic area designated by tile 4, the codeword to be used is 011; (v) that if the location of the device is in the geographic area designated by tile 5, the codeword to be used is 100; (vi) that if the location of the device is in the geographic area designated by tile 6, the codeword to be used is 101; (vii) that if the location of the device is in the geographic area designated by tile 7, the codeword to be used is 110; and (viii) that if the location of the device is in the geographic area designated by tile 8, the codeword to be used is 111.

In the exemplary second map 706, the area of the map is divided up accordance to different locations, at least some of the different locations are different types of locations. The different locations include conference room 1, conference room 2, office 1, office 2, office 3, hallway 1, hallway 2, and the break room. Second map codebook 708 includes information indicating: that if the location of the device is in the geographic area designated as conference room 1 the codeword to be used is 000; (ii) that if the location of the device is in the geographic area designated as conference room 2, the codeword to be used is 001; (iii) that if the location of the device is in the geographic area designated as office 1, the codeword to be used is 010; (iv) that if the location of the device is in the geographic area designated as office 2, the codeword to be used is 011; (v) that if the location of the device is in the geographic area designated as office 3, the codeword to be used is 100; (vi) that if the location of the device is in the geographic area designated as hallway 1, the codeword to be used is 101; (vii) that if the location of the device is in the geographic area designated as hallway 2, the codeword to be used is 110; and (viii) that if the location of the device is in the geographic area designated as the break room, the codeword to be used is 111.

Further consider that the first map 702 and the second map 706 correspond to the same coverage area, e.g., the maps overlay one another. In the example of table 710, consider that the location of the device is indicated by X 712 in first map 702 and X 714 in second map 706. The current location of the device is within tile 2; therefore, the selected first codeword from the first codebook 704 is 001. The first codeword is transmitted during a first peer discovery interval, e.g., as part of a first peer discovery signal. The current location of the device is within hallway 1; therefore, the selected second codeword from the second codebook 708 is 101. The second codeword is transmitted during a second peer discovery interval, e.g., as part of a second peer discovery signal.

Figure 8:
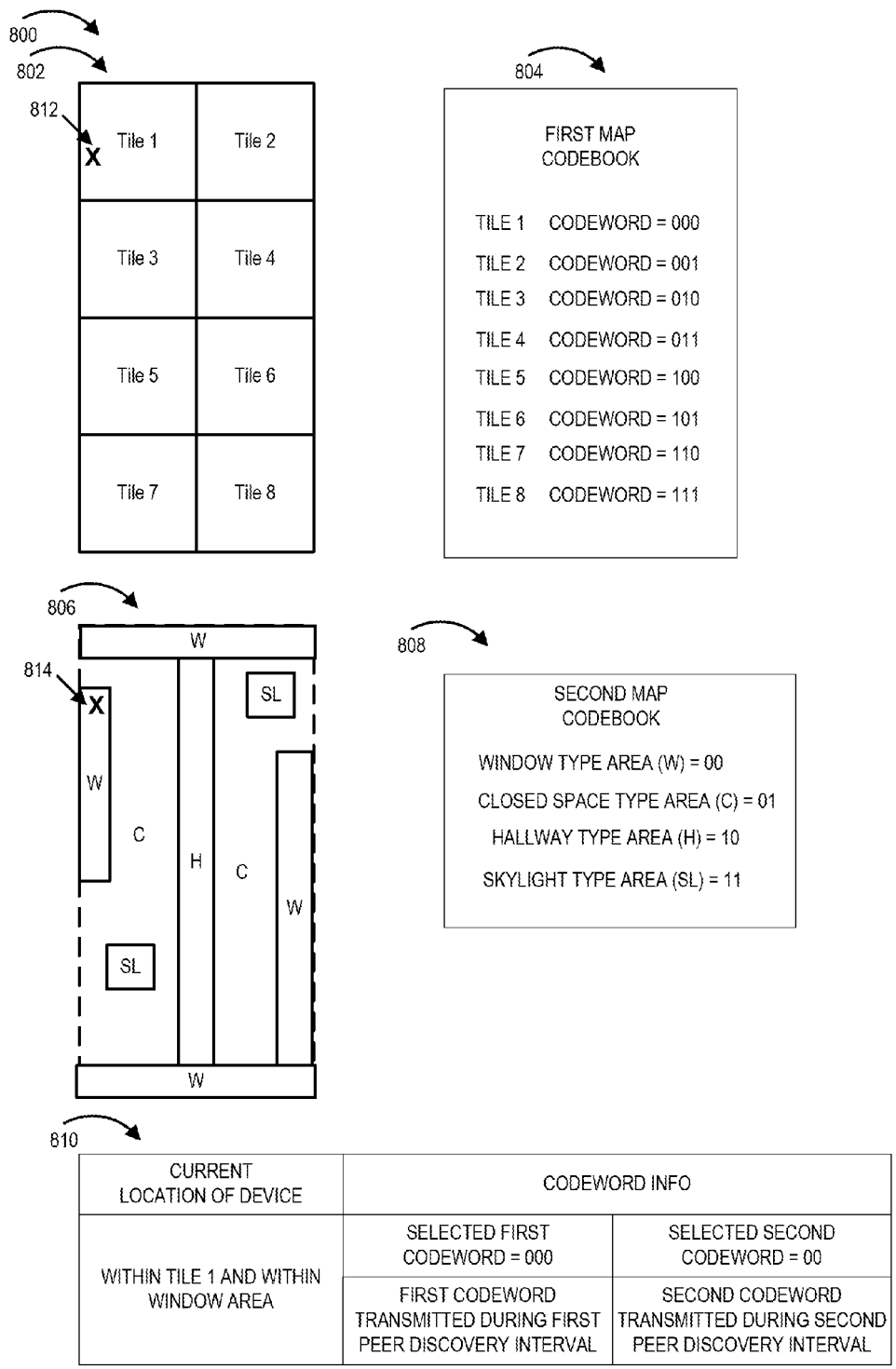
FIG. 8 is a drawing illustrating an exemplary first map, an exemplary first map codebook, an exemplary second map, an exemplary second map codebook, and a table illustrating an example of current device location being communicated by via two codewords, one codeword from each of the two codebooks.

FIG. 8 is a drawing 800 illustrating an exemplary first map 802, an exemplary corresponding first map codebook 804, an exemplary second map 806, an exemplary corresponding second map codebook 808, and a table 810 illustrating an example of current device location being communicated via two codewords, one codeword from each of the two codebooks.

In exemplary first map 802, the area of the map is partitioned into 8 tiles (tile 1, tile 2, tile 3, tile 4, tile 5, tile 6, tile 7, tile 8). In this example, each of the 8 tiles is the same size. In other embodiments, some tiles may be larger than others. First map codebook 804 includes information indicating: (i) that if the location of the device is in the geographic area designated by tile 1, the codeword to be used is 000; (ii) that if the location of the device is in the geographic area designated by tile 2, the codeword to be used is 001; (ii) that if the location of the device is in the geographic area designated by tile 3, the codeword to be used is 010; (iv) that if the location of the device is in the geographic area designated by tile 4, the codeword to be used is 011; (v) that if the location of the device is in the geographic area designated by tile 5, the codeword to be used is 100; (vi) that if the location of the device is in the geographic area designated by tile 6, the codeword to be used is 101; (vii) that if the location of the device is in the geographic area designated by tile 7, the codeword to be used is 110; and (viii) that if the location of the device is in the geographic area designated by tile 8, the codeword to be used is 111.

In the exemplary second map 806, the area of the map is divided up accordance to different types of locations. A window type area is designated by a W in the area; a closed space type area is designated by a C in the area; a hallway type area is designated by a H in the area; and a skylight type area is designated by a SL in the area. Second map codebook 808 includes information indicating: (i) that if the location of the device is in the geographic area designated as a window type area, the codeword to be used is 00; (ii) that if the location of the device is in the geographic area designated as a closed space type area, the codeword to be used is 01; (iii) that if the location of the device is in the geographic area designated as a hallway type area, the codeword to be used is 10; and (iv) that if the location of the device is in the geographic area designated as a skylight type area, the codeword to be used is 11.

Further consider that the first map 802 and the second map 806 correspond to the same coverage area, e.g., the maps overlay one another. In the example, of table 810, consider that the location of the device is indicated by X 812 in first map 802 and X 814 in second map 806. The current location of the device is within tile 1; therefore, the selected first codeword from the first codebook 804 is 000. The first codeword is transmitted during a first peer discovery interval, e.g., as part of a first peer discovery signal. The current location of the device is within a window type area; therefore, the selected second codeword from the second codebook 808 is 00. The second codeword is transmitted during a second peer discovery interval, e.g., as part of a second peer discovery signal.

Figure 9:
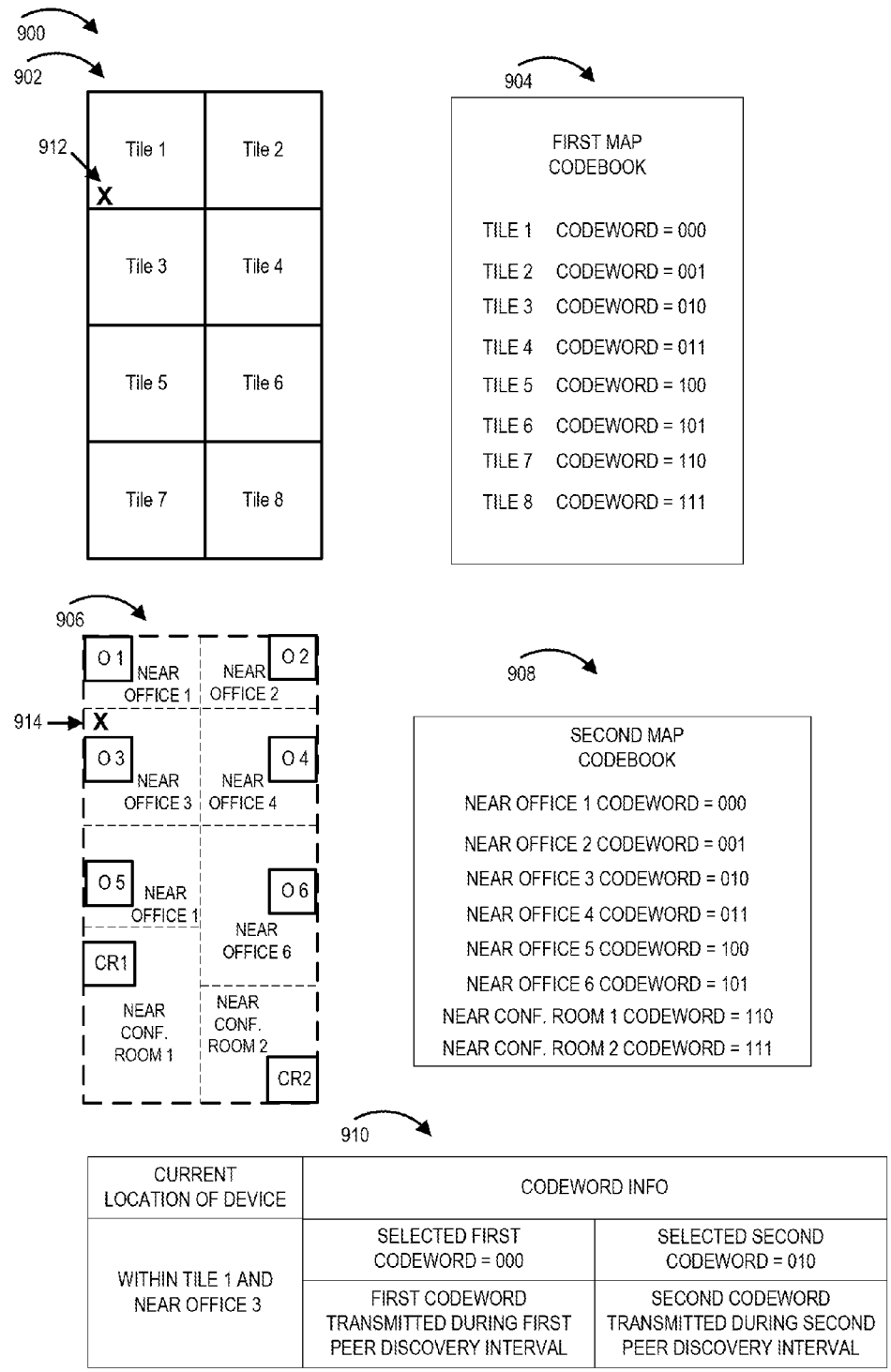
FIG. 9 is a drawing illustrating an exemplary first map, an exemplary first map codebook, an exemplary second map, an exemplary second map codebook, and a table illustrating an example of current device location being communicated by via two codewords, one codeword from each of the two codebooks.

FIG. 9 is a drawing 900 illustrating an exemplary first map 902, an exemplary corresponding first map codebook 904, an exemplary second map 906, an exemplary corresponding second map codebook 908, and a table 910 illustrating an example of current device location being communicated via two codewords, one codeword from each of the two codebooks.

In exemplary first map 902, the area of the map is partitioned into 8 tiles (tile 1, tile 2, tile 3, tile 4, tile 5, tile 6, tile 7, tile 8). In this example, each of the 8 tiles is the same size. In other embodiments, some tiles may be larger than others. First map codebook 904 includes information indicating: (i) that if the location of the device is in the geographic area designated by tile 1, the codeword to be used is 000; (ii) that if the location of the device is in the geographic area designated by tile 2, the codeword to be used is 001; (iii) that if the location of the device is in the geographic area designated by tile 3, the codeword to be used is 010; (iv) that if the location of the device is in the geographic area designated by tile 4, the codeword to be used is 011; (v) that if the location of the device is in the geographic area designated by tile 5, the codeword to be used is 100; (vi) that if the location of the device is in the geographic area designated by tile 6, the codeword to be used is 101; (vii) that if the location of the device is in the geographic area designated by tile 7, the codeword to be used is 110; and (viii) that if the location of the device is in the geographic area designated by tile 8, the codeword to be used is 111.

In the exemplary second map 906, eight locations of interest are shown (office 1 (O1), office 2 (O2), office 3 (O3), office 4 (O4), office 5 (O5), office 6 (O6), conference room 1 (CR1), and conference room 2 (CR2)). The area in the map is divided into predetermined areas in accordance with to proximity to a location of interest. The different portions of the map include: a region near office 1 which includes office 1, a region near office 2 which includes office 2, a region near office 3 which includes office 3, a region near office 4 which includes office 4, a region near office 5 which includes office 5, a region near office 6 which includes office 6, a region near conference room 1 which includes conference room 1, and a region near conference room 2 which includes conference room 2. Second map codebook 908 includes information indicating: that if the location of the device is in the geographic area designated as near office 1, the codeword to be used is 000; (ii) that if the location of the device is in the geographic area designated as near office 2, the codeword to be used is 001; (iii) that if the location of the device is in the geographic area designated as near office 3, the codeword to be used is 010; (iv) that if the location of the device is in the geographic area designated as near office 4, the codeword to be used is 011; (v) that if the location of the device is in the geographic area designated as near office 5, the codeword to be used is 100; (vi) that if the location of the device is in the geographic area designated as near office 6, the codeword to be used is 101; (vii) that if the location of the device is in the geographic area designated as near conference room 1, the codeword to be used is 110; and (viii) that if the location of the device is in the geographic area designated as near conference room 2 the codeword to be used is 111.

Further consider that the first map 902 and the second map 906 correspond to the same coverage area, e.g., the maps overlay one another. In the example of table 910, consider that the location of the device is indicated by X 912 in first map 902 and X 914 in second map 906. The current location of the device is within tile 1; therefore, the selected first codeword from the first codebook 904 is 000. The first codeword is transmitted during a first peer discovery interval, e.g., as part of a first peer discovery signal. The current location of the device is within the area designates as near office 3; therefore, the selected second codeword from the second codebook 908 is 010. The second codeword is transmitted during a second peer discovery interval, e.g., as part of a second peer discovery signal.

Figure 10:
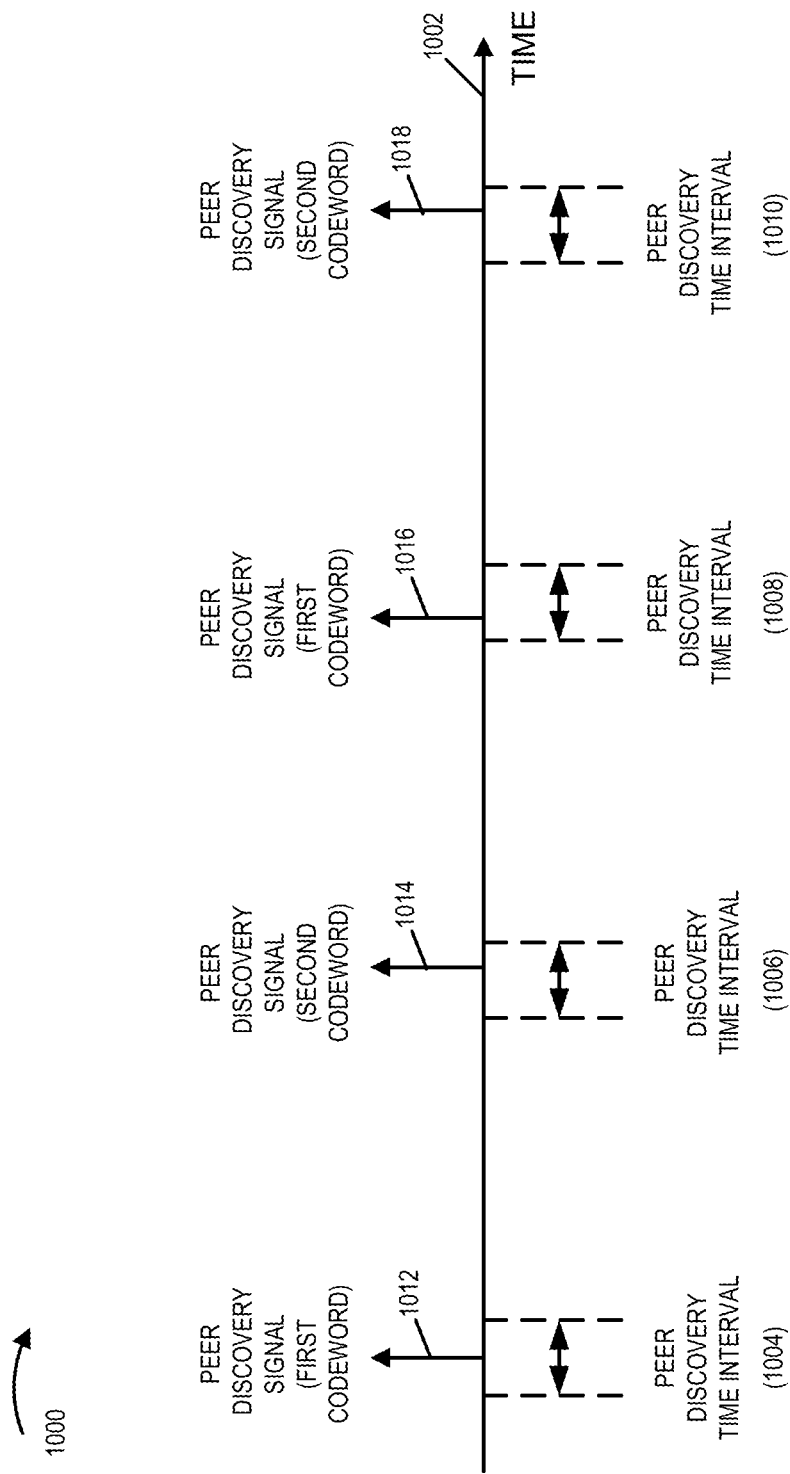
FIG. 10 is a drawing illustrating exemplary peer discovery signals communicating first and second codewords during different peer discovery time intervals.

FIG. 10 is a drawing 1000 illustrating exemplary peer discovery signals communicating first and second codewords during different peer discovery time intervals. Horizontal axis 1002 represents time. Consider that the mobile wireless device is following a recurring peer to peer timing structure including a plurality of indexed peer discovery time intervals. The recurring peer to peer discovery timing structure includes peer discovery time intervals (1004, 1006, 1008, 1010). During peer discovery time interval 1004, the mobile wireless device transmits peer discovery signal 1012 communicating a first codeword communicating the location of the device in accordance with a first codebook. During peer discovery time interval 1006, the mobile wireless device transmits peer discovery signal 1014 communicating a second codeword communicating the location of the device in accordance with a second codebook. During peer discovery time interval 1008, the mobile wireless device transmits peer discovery signal 1016 communicating a first codeword communicating the location of the device in accordance with the first codebook. During peer discovery time interval 1010, the mobile wireless device transmits peer discovery signal 1018 communicating a second codeword communicating the location of the device in accordance with the second codebook.

Figure 11:
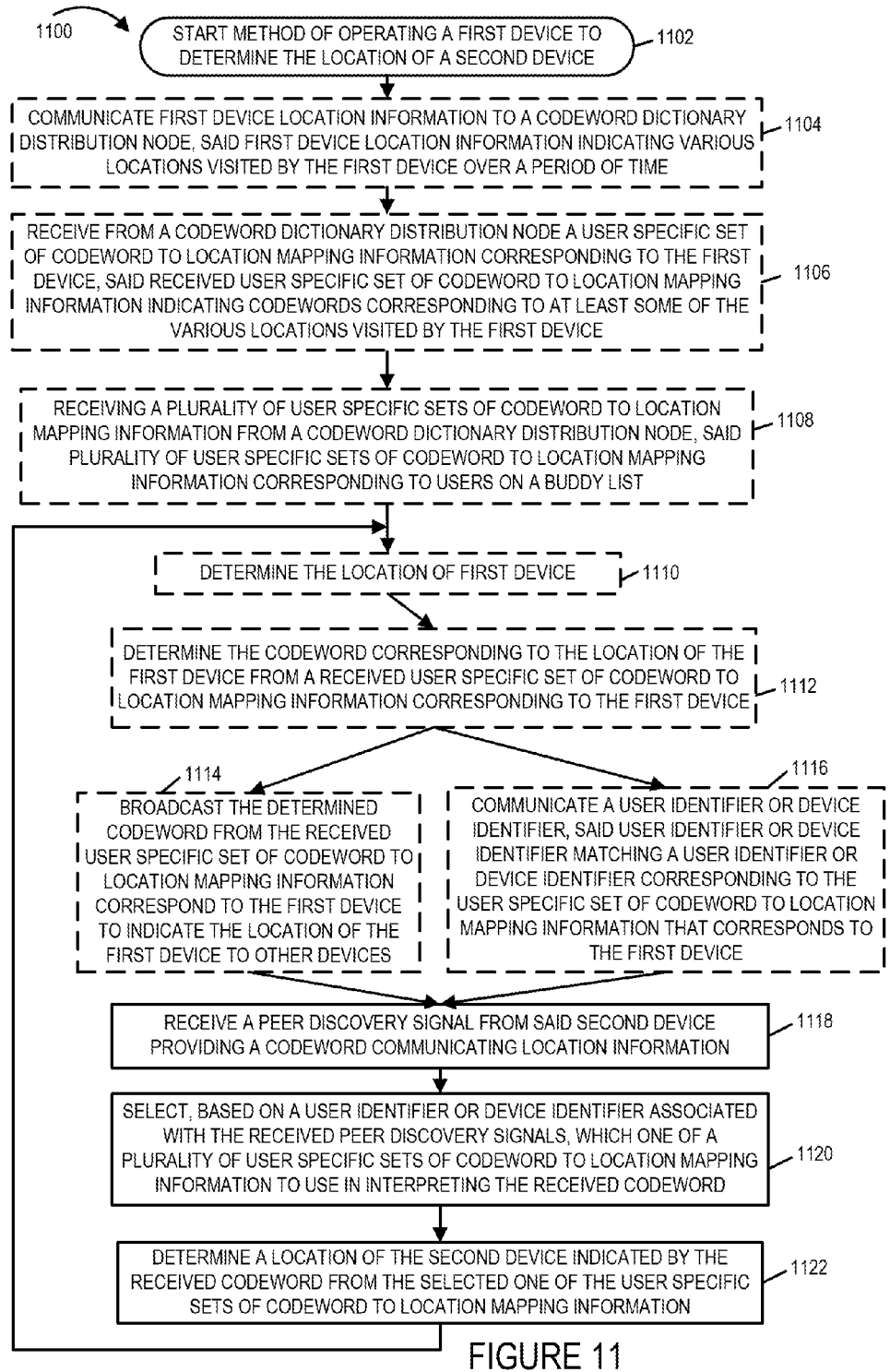
FIG. 11 is a flowchart of an exemplary method of operating a first device to determine the location of a second device in accordance with an exemplary embodiment.

FIG. 11 is a flowchart 1100 of an exemplary method of operating a first device to determine the location of a second device in accordance with an exemplary embodiment. The first and second device are, e.g., mobile wireless devices. The first and second devices are, e.g., mobile wireless terminals supporting peer to peer communications.

Operation of the exemplary method starts in step 1102, where the first device is powered on and initialized. Operation proceeds from start step 1102 to step 1104, in which the first device communicates first device location information to a codeword dictionary distribution node, said first device location information indication various locations visited by the first device over a period of time. In some embodiments, the first device also communicates corresponding time information along with the location information to the dictionary distribution node. The dictionary distribution node may use the communicated location information from the first device to build a user specific codeword to location mapping dictionary for the first device. Operation proceeds from step 1104 to step 1106.

In step 1106 the first device receives from the codeword dictionary distribution node a user specific set of codeword to location mapping information corresponding to the first device, said received user specific set of codeword to location mapping information indicating codewords corresponding to at least some of the various locations visited by the first device. In some embodiments, the first device receives multiple sets of user specific sets of codeword to location mapping information corresponding to the first device, e.g., different sets corresponding to different time information, e.g., different days of the week and/or different times of the day. Operation proceeds from step 1106 to step 1108. In step 1108 the first device receives a plurality of user specific sets of codeword to location mapping information from the codeword dictionary distribution node, said plurality of user specific sets of codeword to location mapping information corresponding to users on a buddy list. Operation proceeds from step 1108 to step 1110.

In step 1110 the first device determines the location of the first device. Then, in step 1112 the first device determines the codeword corresponding to the determined location of the first device from a received user specific set of codeword to location mapping information corresponding to the first device. In some embodiments, prior to determining the codeword, the first device selects one of a plurality of alternative codeword to location mapping information sets as a function of current time information. Operation proceeds from step 1112 to steps 1114 and 1116. In step 1114 the first device broadcasts the determined codeword from the received user specific set of codeword to location mapping information corresponding to the first device to indicate the location of the first device to other devices. In some embodiments, the broadcast signal which communicates the determined codeword is a peer discovery signal, e.g., in a peer to peer timing-frequency structure including air link resources dedicated to carry peer discovery signals. In step 1116 the first device communicates, e.g., transmits, a user identifier or device identifier, said user identifier or device identifier matching a user identifier or device identifier corresponding to the user specific set of codeword to location mapping information the corresponds to the first device. In some embodiments, the communicated user or device identifier of step 1116 is communicated along with the broadcast determined codeword of step 1114, e.g., in the same signal. In some embodiments, the communicated user or device identifier of step 1116 is communicated by the selection of the air link resource used to carry the broadcast determined codeword of step 1114, e.g., there is a predetermined mapping between identifiers and air link resources.

Operation proceeds from steps 1114 and step 1116 to step 1118. In step 1118 the first device receives a peer discovery signal from the second device providing a codeword communicating location information. Operation proceeds from step 1118 to step 1120, in which the first device selects, based on a user identifier or device identifier associated with the received peer discovery signals, which one of a plurality of user specific sets of codeword to location mapping information to use in interpreting the received codeword. In various embodiments, the users specific sets of codeword to location mapping information are user specific codeword dictionaries. In some embodiments, the plurality of user specific sets of codeword to location mapping information includes multiple dictionaries corresponding to an individual user, different dictionaries include in multiple codeword dictionaries corresponding to an individual user being valid for different times. For example, different codeword dictionaries corresponding to an individual user may be valid for different times of day or days of the week or days of the month. In some embodiments at least some of the different dictionaries may be based on a calendar of scheduled events and/or meetings. In some such embodiments, the selection of step 1120 is also based on current time information. In some embodiments, the user identifier corresponds to an individual user. In some embodiments, the user identifier corresponds to a group of users. Operation proceeds from step 1120 to step 1122.

In step 1122 the first device determines a location of the second device indicated by the received codeword from the selected one of the user specific sets of codeword to location mapping information. Operation proceeds from step 1122 to step 1110, where the first device again determines its current location.

Steps 1104, 1106, 1108, 1110, 1112, 1114 and 1116 are optional steps. One or more of all of optional steps 1104, 1106, 1108, 1110, 1112, 1114 and 1116 may be included in a particular embodiment. Flowchart 1100 has been described above for an embodiment in which each of the optional steps are included. In an embodiment, where an optional step is omitted, the step is bypassed in the flow.

Figure 12:
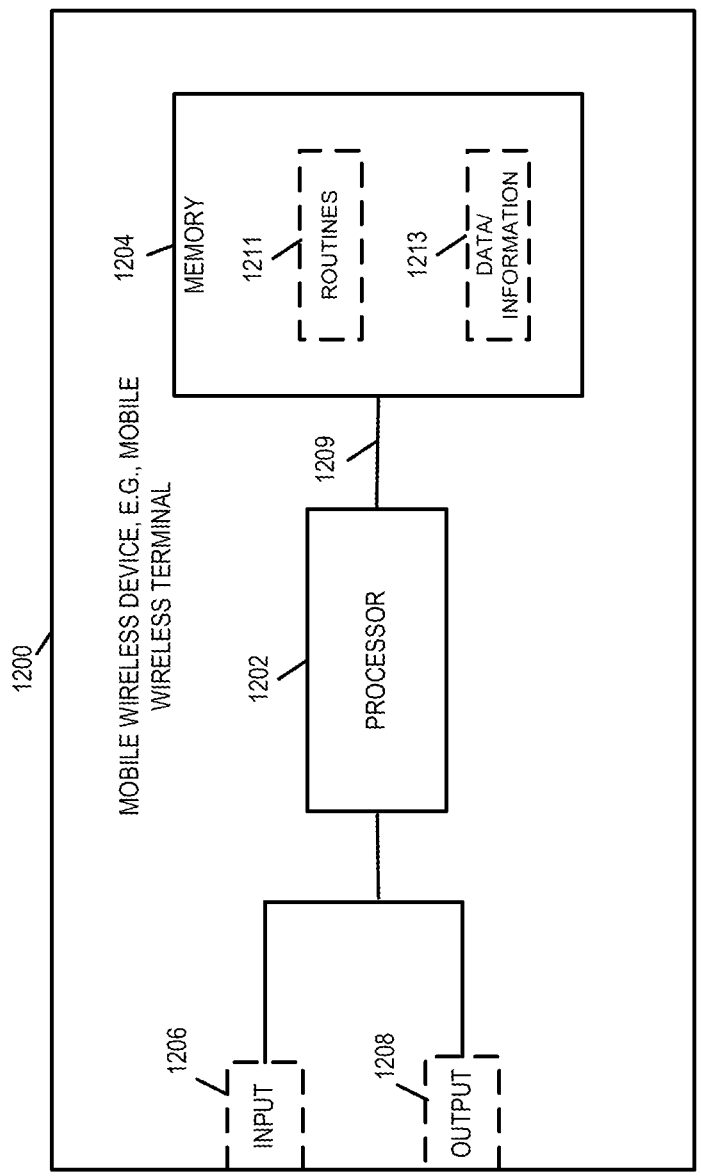
FIG. 12 is a drawing of an exemplary mobile wireless device in accordance with an exemplary embodiment.

FIG. 12 is a drawing of an exemplary mobile wireless device, e.g., a mobile wireless terminal, in accordance with an exemplary embodiment. Exemplary mobile device 1200 is, e.g., one of the mobile devices of system 100 of FIG. 1. Exemplary mobile device 1200 may, and sometimes does, implement a method in accordance with flowchart 1100 of FIG. 11.

Mobile wireless device 1200 includes a processor 1202 and memory 1204 coupled together via a bus 1209 over which the various elements (1202, 1204) may interchange data and information. In some embodiments, memory 1204 includes routines 1211 and data/information 1213. Mobile wireless device 1200 further includes an input module 1206 and an output module 1208 which may be coupled to processor 1202 as shown. However, in some embodiments, the input module 1206 and output module 1208 are located internal to the processor 1202. Input module 1206 can receive input signals. Input module 1206 can, and in some embodiments does, include a wireless receiver and/or a wired or optical input interface for receiving input. Output module 1208 may include, and in some embodiments does include, a wireless transmitter and/or a wired or optical output interface for transmitting output.

In some embodiments, processor 1202 is configured to: receive a peer discovery signal from a second device providing a codeword communicating location information; select, based on a user identifier or device identifier associated with the received peer discovery signal, which one of a plurality of user specific sets of codeword to location mapping information to use in interpreting the received codeword; and determine a location of the second device indicated by the received codeword from the selected one of the user specific sets of codeword to location mapping information.

In some embodiments, user identifier may and sometimes does, correspond to an individual user. In some embodiments, the user identifier may and sometimes does, correspond to a group of users.

In various embodiments, processor 1202 is further configured to: receive said plurality of user specific sets of codeword to location mapping information from a codeword dictionary distribution node, said plurality of user specific sets of codeword to location mapping information corresponding to users on a buddy list. In some embodiments, the plurality of user specific sets of codewords to location mapping information includes multiple codeword dictionaries corresponding to an individual user, different dictionaries included in multiple codeword dictionaries corresponding to an individual user being valid for different times.

In various embodiments, processor 1202 is further configured to: communicate first device location information to a codeword dictionary distribution node, said first device location information indicating various locations visited by said first device over a period of time; and receive from the codeword dictionary distribution node a user specific set of codeword to location mapping information corresponding to the first device, said received user specific set of codeword to location mapping information indicating codewords corresponding to at least some of the various locations visited by the first device. In some such embodiments, processor 1202 is further configured to: broadcast a codeword from the received user specific set of codeword to location mapping information corresponding to the first device to indicate the location of the first device to other devices. In some such embodiments, processor 1202 is further configured to: communicate a user identifier or device identifier, said user identifier or device identifier matching a user identifier or device identifier corresponding to the user specific set of codeword to location mapping information that corresponds to the user of the first device.

Figure 13:
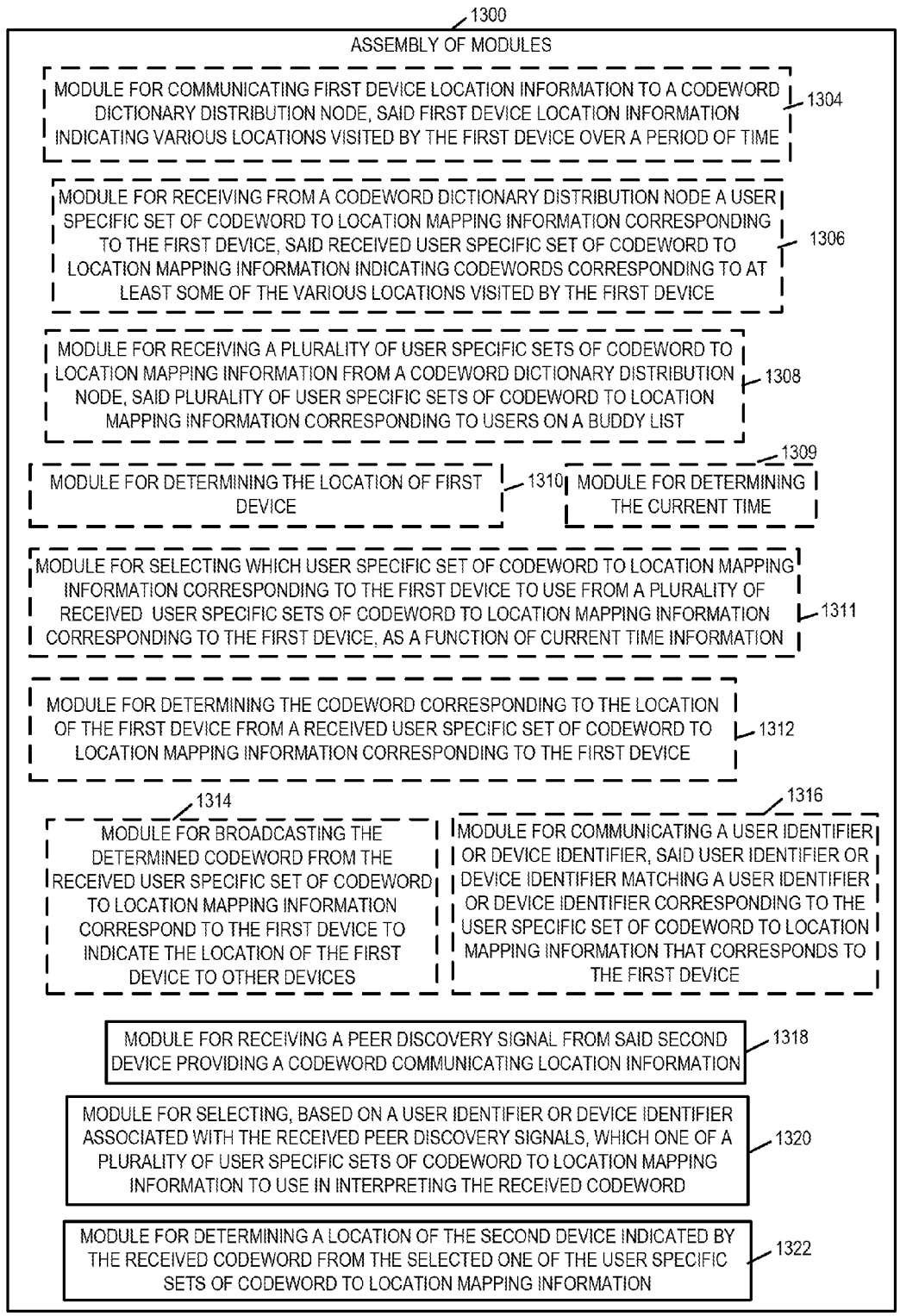
FIG. 13 is an assembly of modules which can, and in some embodiments is, used in the mobile wireless device illustrated in FIG. 12.

FIG. 13 is an assembly of modules 1300 which can, and in some embodiments is, used in the mobile wireless device 1200 illustrated in FIG. 12. The modules in the assembly 1300 can be implemented in hardware within the processor 1202 of FIG. 12, e.g., as individual circuits. Alternatively, the modules may be implemented in software and stored in the memory 1204 of the mobile wireless device 1200 shown in FIG. 12. In some such embodiments, the assembly of modules 1300 is included in routines 1211 of memory 1204 of device 1200 of FIG. 12. While shown in the FIG. 12 embodiment as a single processor, e.g., computer, it should be appreciated that the processor 1202 may be implemented as one or more processors, e.g., computers. When implemented in software the modules include code, which when executed by the processor, configure the processor, e.g., computer, 1202 to implement the function corresponding to the module. In some embodiments, processor 1202 is configured to implement each of the modules of the assembly of modules 1300. In embodiments where the assembly of modules 1300 is stored in the memory 1204, the memory 1204 is a computer program product comprising a computer readable medium, e.g., a non-transitory computer readable medium, comprising code, e.g., individual code for each module, for causing at least one computer, e.g., processor 1202, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 13 control and/or configure the mobile device 1200 or elements therein such as the processor 1202, to perform the functions of the corresponding steps illustrated and/or described in the method of flowchart 1100 of FIG. 11.

Assembly of modules 1300 includes a module 1318 for receiving a peer discovery signal from said second device providing a codeword communicating location information, a module 1320 for selecting, based on a user or device identifier associated with the received peer discovery signals, which one of a plurality of user specific sets of codeword to location mapping information to use in interpreting the received codeword, and a module 1322 for determining a location of the second device indicated by the received codeword from the selected one of the user specific sets of codeword to location mapping information. In some embodiments, there are multiple sets of user specific codeword to location mapping information corresponding to same user identifier or device identifier and different ones of said multiple sets are valid for different times, e.g., different times of the day, different days of the week, different days of the month, etc. In some such embodiments, module 1320 further uses current time information to make its selection.

In some embodiments, the user identifier corresponds to an individual user. In some embodiments, the user identifier corresponds to a group of users.

In various embodiments, assembly of modules 1300 further includes one or more or all of: a module 1304 for communicating first device location information to a codeword dictionary distribution node, said first device location information indicating various locations visited by the first device, a module 1306 for receiving from a codeword dictionary distribution node a user specific set of codeword to location mapping information corresponding to the first device, said received user specific set of codeword to location mapping information indicting codewords corresponding to at least some of the various locations visited by the first device, and a module 1308 for receiving a plurality of user specific sets of codeword to location mapping information from a codeword dictionary distribution node, said plurality of user specific sets of codeword to location mapping information corresponding to users on a buddy list. In some embodiments, module 1304 further communicates time information corresponding to the various locations visited by the first device. In some embodiments, module 1306 receives a plurality of user specific sets of codeword to location mapping information corresponding to the first device and different sets correspond to different time information, e.g., different days and/or different times of the time. For example a first received set may correspond to the first device during a weekday between 9 AM and 5 PM, and a second received set may correspond to the first device during a weekday between 5 PM and 11 PM, and a third received set may correspond to the first device during a Saturday or Sunday.

In some embodiments, the assembly of modules further includes one or more of all of: a module 1310 for determining the location of the first device, a module 1309 for determining the current time, a module 1311 for selecting which user specific set of codeword to location mapping information corresponding to the first device to use from a plurality of received user specific sets of codeword to location mapping information corresponding to the first device as a function of current time information, a module 1312 for determining the codeword corresponding to the location of the first device from a received user specific set of codeword to location mapping information corresponding to the first device, a module 1314 for broadcasting the determined codeword from the received user specific set of codeword to location mapping information corresponding to the first device to indicate the location of the first device to other devices, and a module 1316 for communicating, e.g., transmitting, a user identifier or device identifier, said user identifier or device identifier matching a user identifier or device identifier corresponding to the user specific set of codeword to location matching information that corresponds to the first device.

Figure 14:
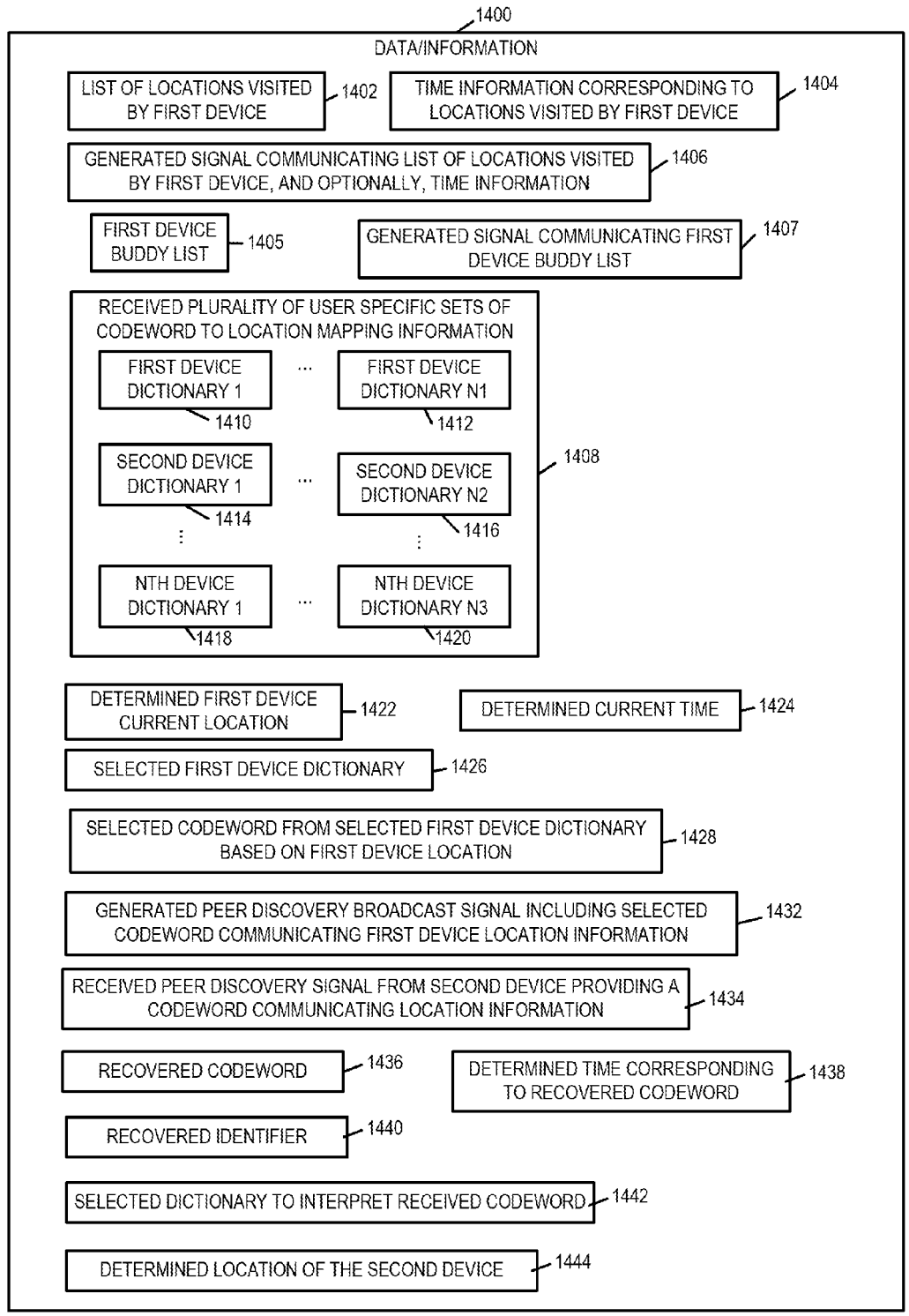
FIG. 14 is a drawing of exemplary data/information which may be included in the memory of the device of FIG. 12.

Exemplary data/information 1400 of FIG. 14 is, e.g., included in data/information 1213 of memory 1204 of device 1200 of FIG. 12. Data/information 1400 includes a list of locations visited by the first device 1402, time information corresponding to the locations visited by the first device 1404 and a generated signal communicating the list of locations visited by the first device, and optionally corresponding time information 1406. Data/information 1400 further includes a first device buddy list 1405 and a generated signal communicating the first device buddy list 1407. Data/information 1408 further includes a received plurality of user specific sets of codeword to location mapping information 1408. Information 1408 includes a plurality of user specific sets of codeword to location mapping dictionaries corresponding to the first device (first device dictionary 1 1410, . . . , first device dictionary N1 1412). Information 1408 also includes a plurality of user specific sets of codeword to location mapping dictionaries corresponding to the different devices on the first device's buddy list ((second device dictionary 1 1414, . . . , second device dictionary N2 1416), . . . (Nth device dictionary 1 1418, . . . Nth. device dictionary N3 1420)). Different user specific dictionaries corresponding to the same device and same user correspond to different times, e.g., different days of the week, different days of the month, and/or different times of the day.

Data/information 1400 further includes a determined first device current location 1422, a determined current time 1424, a selected first device dictionary 1426, a selected codeword from the selected first device dictionary based on the first device location 1428, and a generated peer discovery signal broadcast signal including the selected codeword communicating the first device location information 1432. Data information 1400 further includes a received peer discovery broadcast signal from a second device providing a codeword communicating location information 1434, a recovered codeword 1436, a recovered identifier 1440 corresponding to the recovered codeword 1436, a determined time corresponding to the recovered codeword 1438, a selected dictionary to interpret the received codeword 1442, and a determined location of the second device 1444.

Figure 15:
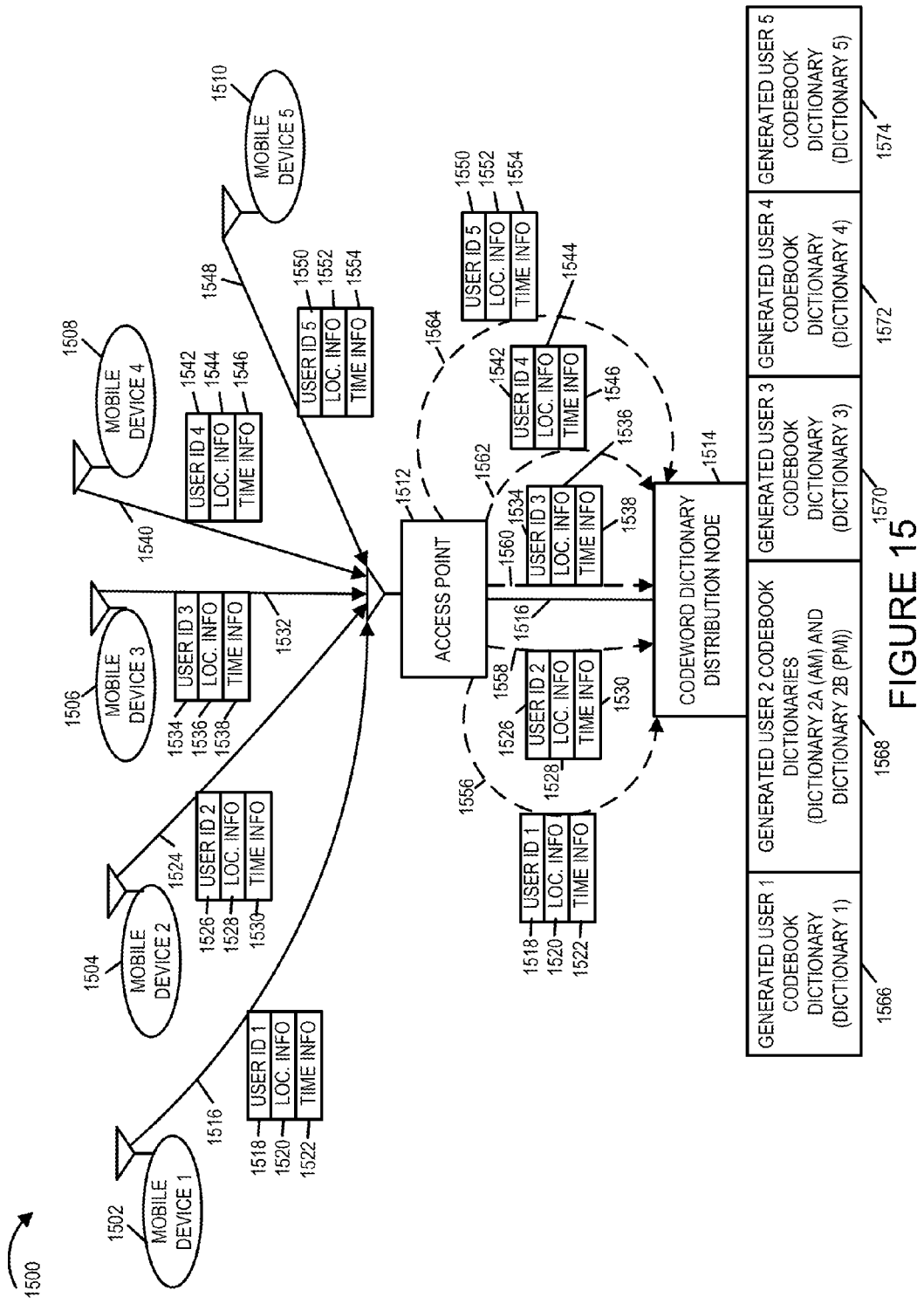
FIG. 15 is a first drawing in a sequence which illustrates an example in which a mobile wireless device uses user specific sets of codeword to location mapping information to communicate its location and determine the location of other mobile wireless devices.
Figure 16:
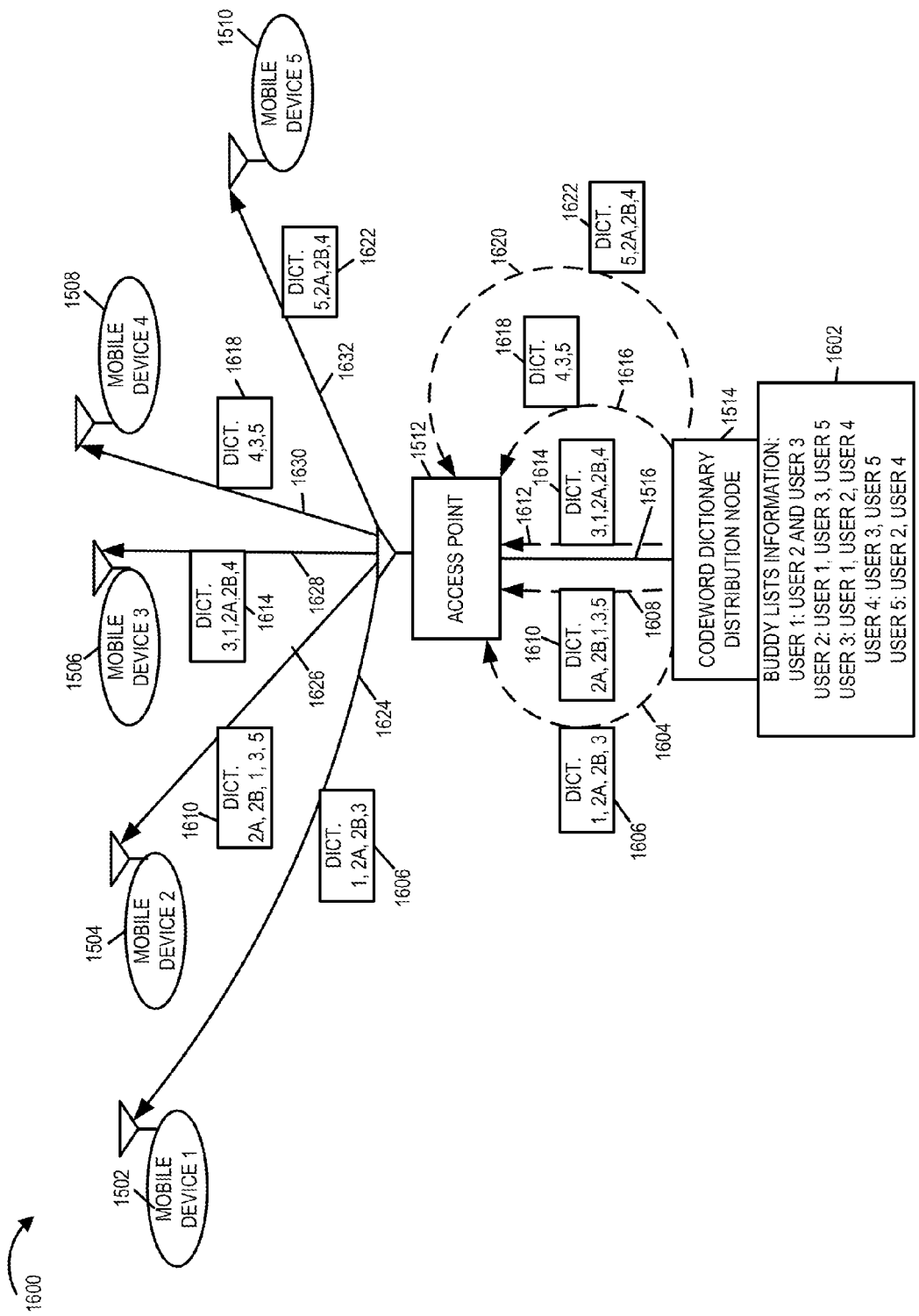
FIG. 16 is a second drawing in a sequence which illustrates an example in which a mobile wireless device uses user specific sets of codeword to location mapping information to communicate its location and determine the location of other mobile wireless devices.
Figure 17:
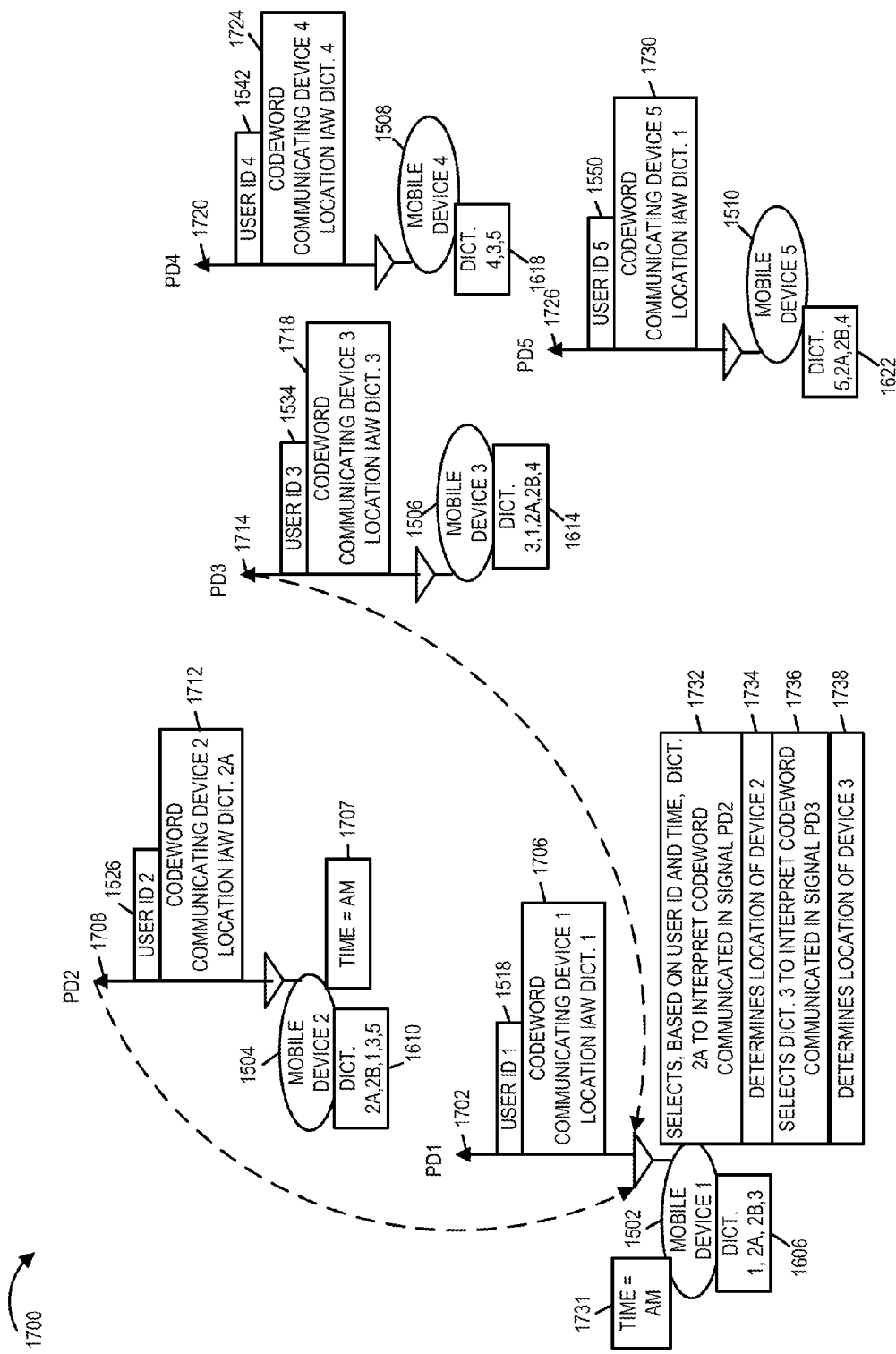
FIG. 17 is a third drawing in a sequence which illustrates an example in which a mobile wireless device uses user specific sets of codeword to location mapping information to communicate its location and determine the location of other mobile wireless devices.

FIGS. 15-17 illustrate an example in which a mobile wireless device uses user specific sets of codeword to location mapping information to communicate its location and determine the location of other mobile wireless devices. In drawing 1500 of FIG. 15 there are five exemplary mobile wireless devices (mobile device 1 1502, mobile device 2 1504, mobile device 3 1506, mobile device 4 1508, mobile device 5 1510), an exemplary access point 1512, and a codeword dictionary distribution node 1514. The access point 1512 and the codeword dictionary distribution node 1514 are coupled together via a backhaul network 1516.

Each of the mobile wireless devices (1502, 1504, 1506, 1508, 1510) has visited various locations and generated a record, e.g., a log, of the different locations which were visited and corresponding time information corresponding to the different locations. Mobile device 1 1502 generates and transmits signals 1516 communicating: its user ID information, user ID 1 1518, location information 1520 identifying locations visited by mobile wireless device 1, and time information 1522 indicating time information, e.g., day and/or time of day, corresponding to each of the identified locations visited by mobile wireless device 1. The information in signals 1516 is being communicated to codeword dictionary distribution node 1514. Access point 1512 receives wireless signals 1516 and generates and transmits signals 1556 which forward information (1518, 1520, 1522) to the codeword dictionary distribution node 1514.

Mobile device 2 1504 generates and transmits signals 1524 communicating: its user ID information, user ID 2 1526, location information 1528 identifying locations visited by mobile wireless device 2, and time information 1530 indicating time information, e.g., day and/or time of day, corresponding to each of the identified locations visited by mobile wireless device 2. The information in signals 1524 is being communicated to codeword dictionary distribution node 1514. Access point 1512 receives wireless signals 1524 and generates and transmits signals 1558 which forwards information (1526, 1528, 1530) to the codeword dictionary distribution node 1514.

Mobile device 3 1506 generates and transmits signals 1532 communicating: its user ID information, user ID 3 1534, location information 1536 identifying locations visited by mobile wireless device 3, and time information 1538 indicating time information, e.g., day and/or time of day, corresponding to each of the identified locations visited by mobile wireless device 3. The information in signals 1532 is being communicated to codeword dictionary distribution node 1514. Access point 1512 receives wireless signals 1532 and generates and transmits signals 1560 which forwards information (1534, 1536, 1538) to the codeword dictionary distribution node 1514.

Mobile device 4 1508 generates and transmits signals 1540 communicating: its user ID information, user ID 4 1542, location information 1544 identifying locations visited by mobile wireless device 4, and time information 1546 indicating time information, e.g., day and/or time of day, corresponding to each of the identified locations visited by mobile wireless device 4. The information in signals 1540 is being communicated to codeword dictionary distribution node 1514. Access point 1512 receives wireless signals 1540 and generates and transmits signals 1562 which forwards information (1542, 1544, 1546) to the codeword dictionary distribution node 1514.

Mobile device 5 1510 generates and transmits signals 1548 communicating: its user ID information, user ID 5 1550, location information 1552 identifying locations visited by mobile wireless device 5, and time information 1554 indicating time information, e.g., day and/or time of day, corresponding to each of the identified locations visited by mobile wireless device 5. The information in signals 1548 is being communicated to codeword dictionary distribution node 1514. Access point 1512 receives wireless signals 1548 and generates and transmits signals 1564 which forwards information (1550, 1552, 1554) to the codeword dictionary distribution node 1514.

Codeword dictionary distribution node 1514 receives the information communicated in signals 1556 and generates a user 1 codebook dictionary 1566, designated dictionary 1, which includes codeword to location mapping for at least some of the locations communicated in signals 1556. Codeword dictionary distribution node 1514 receives the information communicated in signals 1558 and generates two user 2 codebook dictionaries 1568 corresponding to different times, user 2 codebook dictionary 2A for the AM which includes codeword to location mapping for at least some of the locations communicated in signals 1558 and user 2 codebook dictionary 2B for the PM which includes codeword to location mapping for at least some of the locations communicated in signals 1558. Codeword dictionary distribution node 1514 receives the information communicated in signals 1560 and generates a user 3 codebook dictionary 1570, designated dictionary 3, which includes codeword to location mapping for at least some of the locations communicated in signals 1560. Codeword dictionary distribution node 1514 receives the information communicated in signals 1562 and generates a user 4 codebook dictionary 1572, designated dictionary 4, which includes codeword to location mapping for at least some of the locations communicated in signals 1562. Codeword dictionary distribution node 1514 receives the information communicated in signals 1564 and generates a user 5 codebook dictionary 1574, designated dictionary 5, which includes codeword to location mapping for at least some of the locations communicated in signals 1564.

In drawing 1600 of FIG. 16, the codeword dictionary distribution node 1514 has a buddy list 1602. The buddy list, in some embodiments, is stored in codeword dictionary distribution node 1514, e.g., as part of a configuration operation. In some embodiments, buddy list 1602 is generated and/or updated based on information communicated from the mobile wireless devices (1502, 1504, 1506, 1508, 1510) to codeword dictionary distribution node. For example, an individual mobile wireless device may communicate its buddy list to node 1514 and/or may communicate updates, e.g., additions and/or deletions to its buddy list to node 1514. In some embodiments, at least some mobile wireless devices have different buddy lists corresponding to different times, e.g., different days and/or different times of a day.

In this example buddy list 1602 indicates buddies corresponding to each of the mobile wireless devices. User 1's buddies are user 2 and user 3. User 2's buddies are user 1, user 3 and user 5. User 3's buddies are user 1, user 2 and user 4. User 4's buddies are user 3 and user 5. User 5 buddies are user 2 and user 4.

Codeword dictionary distribution nodes selects and sends a set of user specific codeword dictionaries to each of the mobile devices, so that a mobile device may broadcast its own location information in accordance with one of its user specific codeword dictionaries and may recover location information transmitted from its buddies which may be using different user specific codeword dictionaries. The selection of user specific codeword dictionaries to be sent to a particular mobile wireless device is based on the buddy list information 1602.

Codeword dictionary distribution node 1514 generates and sends signals 1604, which communicate the set 1606 of dictionaries 1, 2A, 2B and 3 to access point 1512, which generates signals 1624 which forward the set of dictionaries 1606 to mobile wireless device 1 1502. Mobile wireless device 1 1502 receives and stores the set 1606 of codeword dictionaries 1, 2A, 2B and 3.

Codeword dictionary distribution node 1514 generates and sends signals 1608, which communicate the set 1610 of dictionaries 2A, 2B, 1, 3 and 5 to access point 1512, which generates signals 1626 which forward the set of dictionaries 1610 to mobile wireless device 2 1504. Mobile wireless device 2 1504 receives and stores the set 1610 of codeword dictionaries 2A, 2B, 1, 3 and 5.

Codeword dictionary distribution node 1514 generates and sends signals 1612, which communicate the set 1614 of dictionaries 3, 1, 2A, 2B, and 4 to access point 1512, which generates signals 1628 which forward the set of dictionaries 1614 to mobile wireless device 3 1506. Mobile wireless device 3 1506 receives and stores the set 1614 of codeword dictionaries 3, 1, 2A, 2B and 4.

Codeword dictionary distribution node 1514 generates and sends signals 1616, which communicate the set 1618 of dictionaries 4, 3 and 5 to access point 1512, which generates signals 1630 which forward the set of dictionaries 1618 to mobile wireless device 4 1508. Mobile wireless device 4 1508 receives and stores the set 1618 of codeword dictionaries 4, 3 and 5.

Codeword dictionary distribution node 1514 generates and sends signals 1620, which communicate the set 1622 of dictionaries 5, 2A, 2B and 4 to access point 1512, which generates signals 1632 which forward the set of dictionaries 1622 to mobile wireless device 5 1510. Mobile wireless device 5 1510 receives and stores the set 1622 of codeword dictionaries 5, 2A, 2B and 4.

In drawing 1700 of FIG. 17, each of the mobile wireless devices determines its location, determines a codeword in accordance with a user specific dictionary corresponding to its user, generates a peer discovery signal including the determined codeword, and broadcasts the generated peer discovery signal. Mobile device 1 1502 determines its current location, and generates peer discovery signal 1 1702 which includes user ID 1 1518 and codeword 1706 communicating device 1's location in accordance with dictionary 1. Mobile device 1 1502 transmits broadcast peer discovery signal 1 1702.

Mobile device 2 1504 determines its current location and current time. Mobile device 2 determines that the current time is during the AM time interval; therefore, mobile device 2 1504 selects to use dictionary 2A to encode its location. Mobile device 2 1504 generates peer discovery signal 2 1708 which includes user ID 2 1526 and codeword 1712 communicating device 2's location in accordance with dictionary 2A. Mobile device 2 1504 transmits broadcast peer discovery signal 2 1708.

Mobile device 3 1506 determines its current location, and generates peer discovery signal 3 1714 which includes user ID 3 1534 and codeword 1718 communicating device 3's location in accordance with dictionary 3. Mobile device 3 1506 transmits broadcast peer discovery signal 3 1714.

Mobile device 4 1508 determines its current location, and generates peer discovery signal 4 1720 which includes user ID 4 1542 and codeword 1724 communicating device 4's location in accordance with dictionary 4. Mobile device 4 1508 transmits broadcast peer discovery signal 4 1720.

Mobile device 5 1510 determines its current location, and generates peer discovery signal 5 1726 which includes user ID 5 1550 and codeword 1730 communicating device 5's location in accordance with dictionary 5. Mobile device 5 1510 transmits broadcast peer discovery signal 5 1726.

A mobile wireless device monitors for and detects peer discovery signals from other devices on interest, e.g., the devices on its buddy list. Detection and discovery of signals will be described for mobile wireless device 1 1502. The other wireless devices perform similar operations in accordance with their buddy lists.

Mobile wireless device 1 1502 detects peer discovery signal 2 1708 from mobile wireless device 2 1504. Mobile wireless device 1 1502 determines, based on the communicated user ID 2 1526, that it should use one of dictionary 2A and dictionary 2B to interpret the received codeword 1712. Mobile wireless device 1 1502 determines that the current time is during the AM as indicated by block 1731. Based on the current time, device 1 selects dictionary 2A. Thus, based on the received user ID information 1526 and time 1731, mobile device 1 1502 selects dictionary 2A to interpret the codeword 1712 communicated in peer discovery signal 1708, as indicated by block 1734. Mobile device 1 1502 determines the location of device 2 indicated by the received codeword 1712 using user specific dictionary 2A, as indicted by block 1734.

Mobile wireless device 1 1502 detects peer discovery signal 3 1714 from mobile wireless device 3 1506. Mobile wireless device 1 1502 determines, based on the communicated user ID 3 1534, that it should use dictionary 3 to interpret the received codeword 1718. Thus, based on the received user ID information 1534, mobile device 1 1502 selects dictionary 3 to interpret the codeword 1718 communicated in peer discovery signal 1714, as indicated by block 1736. Mobile device 1 1502 determines the location of device 3 indicated by the received codeword 1718 using user specific dictionary 3, as indicted by block 1738.

Figure 18:
FIG. 18 is a drawing of exemplary user specific codeword dictionaries, which may be the user specific codeword dictionaries referred to in FIGS. 15-17.

FIG. 18 is a drawing of exemplary user specific codeword dictionaries, which may be the user specific codeword dictionaries referred to in FIGS. 15-17. Device 1 user 1 codebook dictionary 1802 indicates that: codeword 000 corresponds to user 1's office, codeword 001 corresponds to supervisor 1's office, codeword 010 corresponds to break room 1, codeword 011 corresponds to the cafeteria, codeword 100 corresponds to hallway 1, codeword 101 corresponds to conference room 1, codeword 110 corresponds to conference room 2, and codeword 111 corresponds to remainder 1 of building 1. Device 2 user 2 codebook dictionary 2A 1804 for AM time periods indicates that: codeword 000 corresponds to user 2's office, codeword 001 corresponds to supervisor 1's office, codeword 010 corresponds to break room 1, codeword 011 corresponds to the cafeteria, codeword 100 corresponds to hallway 1, codeword 101 corresponds to conference room 1, codeword 110 corresponds to conference room 2, and codeword 111 corresponds to remainder 2 of building 1. Device 2 user 2 codebook dictionary 2B 1806 for PM time periods indicates that: codeword 000 corresponds to user 2's office, codeword 001 corresponds to supervisor 1's office, codeword 010 corresponds to break room 2, codeword 011 corresponds to the cafeteria, codeword 100 corresponds to hallway 1, codeword 101 corresponds to hallway 2, codeword 110 corresponds to lab 1, and codeword 111 corresponds to remainder 3 of building 1.

Device 3 user 3 codebook dictionary 3 1808 indicates that: codeword 000 corresponds to user 3's office, codeword 001 corresponds to supervisor 2's office, codeword 010 corresponds to break room 2, codeword 011 corresponds to the cafeteria, codeword 100 corresponds to hallway 2, codeword 101 corresponds to conference room 3, codeword 110 corresponds to lab 2, and codeword 111 corresponds to remainder 4 of building 1. Device 4 user 4 codebook dictionary 4 1810 indicates that: codeword 000 corresponds to user 4's office, codeword 001 corresponds to supervisor 2's office, codeword 010 corresponds to break room 2, codeword 011 corresponds to the cafeteria, codeword 100 corresponds to hallway 2, codeword 101 corresponds to lab 2, codeword 110 corresponds to conference room 3, and codeword 111 corresponds to remainder 5 of building 1. Device 5 user 5 codebook dictionary 5 1812 indicates that: codeword 000 corresponds to user 5's office, codeword 001 corresponds to user 2's office, codeword 010 corresponds to user 4's office, codeword 011 corresponds to the cafeteria, codeword 100 corresponds to hallway 1, codeword 101 corresponds to break room 1, codeword 110 corresponds to conference room 1, and codeword 111 corresponds to remainder 6 of building 1.

Figure 19:
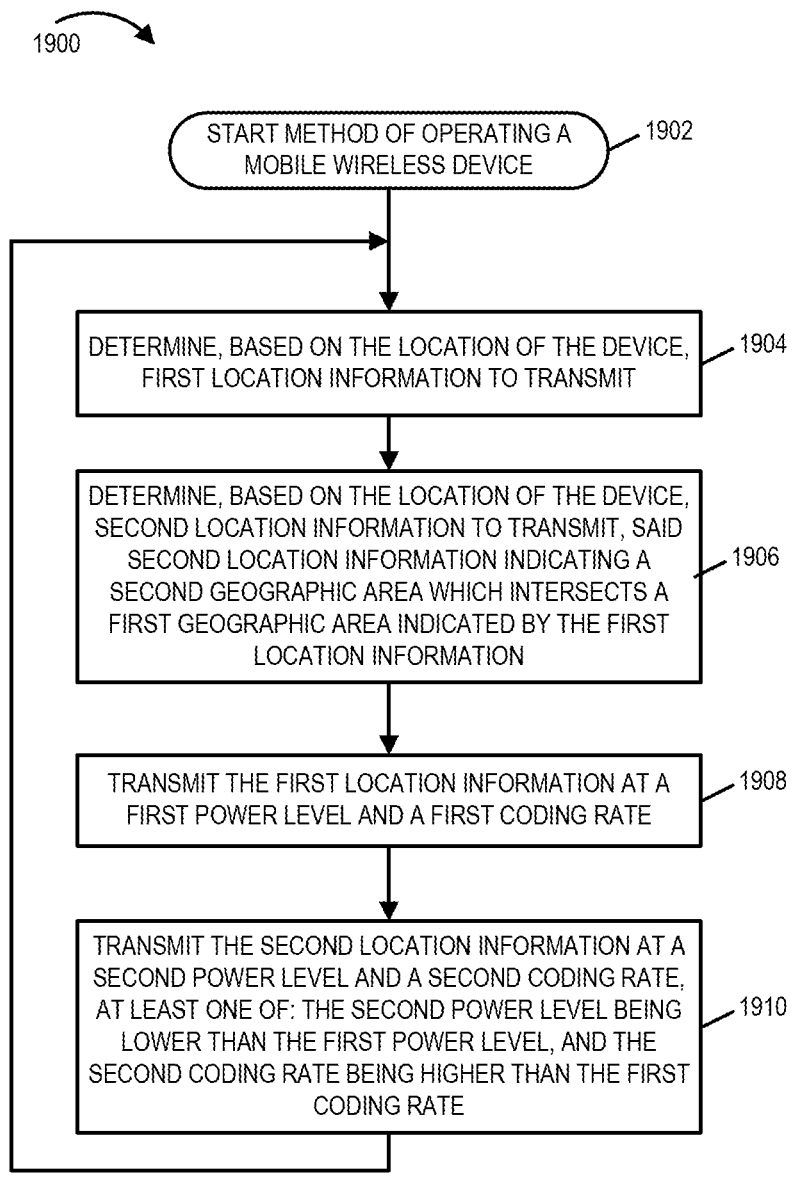
FIG. 19 is a flowchart of an exemplary method of operating a mobile wireless device to transmit location information in accordance with an exemplary embodiment.

FIG. 19 is a flowchart 1900 of an exemplary method of operating a mobile wireless device to transmit location information in accordance with an exemplary embodiment. Operation starts in step 1902, where the mobile wireless device is powered on and initialized and proceeds to step 1904.

In step 1904 the mobile wireless device determines, based on the location of the device, first location information to transmit. Operation proceeds from step 1904 to step 1906, in which the mobile wireless device, determines, based on the location of the device, second location information to transmit, said second location information indicating a second geographic area which intersects with a first geographic area indicated by the first location information. Operation proceeds from step 1906 to step 1908.

In step 1908 the mobile wireless device transmits the first location information at a first power level and a first coding rate. Operation proceeds from step 1908 to step 1910. In step 1910 the mobile wireless device transmits the second location information at a second power level and a second coding rate, at least one of: the second power level being lower than the first power level and the second coding rate being higher than the first coding rate. Thus, in general, the second location information is harder to recover than the first location information, and the second location information is communicated over a shorter range than the first location information. Operation proceeds from step 1910 to step 1904.

In various embodiments, the transmission range of the first location information is greater than the transmission range of the second location information. In some such embodiments, the transmission rate of the second location information is higher than the transmission rate of the first location information.

Steps 1908 and 1910 have been shown in series. In some embodiments steps 1908 and 1910 are performed in parallel. In some embodiments, the first location information and the second location information are transmitted during the same peer discovery time interval. In some such embodiments, the second location information is transmitted as a superimposed signal on the first location information. In some such embodiments, the first location information is transmitted using BPSK or QPSK and the second location information is transmitted using BPSK or QPSK.

In some embodiments, the second location information is chosen based on the first location information. In some such embodiments, the second location information is such that the second geographic area has a smaller intersection with the first geographic area over a set of available choices of the second location information.

Figure 20:
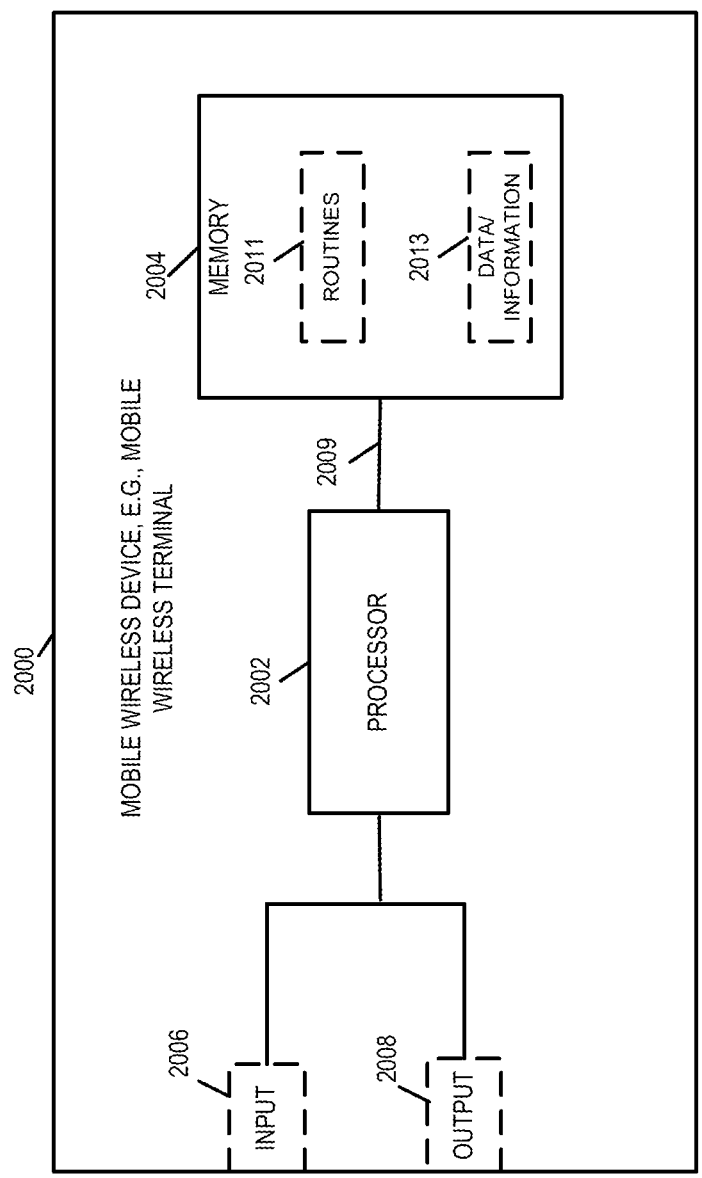
FIG. 20 is a drawing of an exemplary mobile wireless device, e.g., a mobile wireless terminal, in accordance with an exemplary embodiment.

FIG. 20 is a drawing of an exemplary mobile wireless device 2000, e.g., a mobile wireless terminal, in accordance with an exemplary embodiment. Exemplary mobile device 2000 is, e.g., one of the mobile devices of system 100 of FIG. 1. Exemplary mobile device 2000 may, and sometimes does, implement a method in accordance with flowchart 1900 of FIG. 19.

Mobile wireless device 2000 includes a processor 2002 and memory 2004 coupled together via a bus 2009 over which the various elements (2002, 2004) may interchange data and information. In some embodiments, memory 2004 includes routines 2011 and data/information 2013. Mobile wireless device 2000 further includes an input module 2006 and an output module 2008 which may be coupled to processor 2002 as shown. However, in some embodiments, the input module 2006 and output module 2008 are located internal to the processor 2002. Input module 2006 can receive input signals. Input module 2006 can, and in some embodiments does, include a wireless receiver and/or a wired or optical input interface for receiving input. Output module 2008 may include, and in some embodiments does include, a wireless transmitter and/or a wired or optical output interface for transmitting output.

In some embodiments, processor 2002 is configured to: determine, based on the location of said device, first location information to transmit; determine, based on the location of said device, second location information to transmit, said second location information indicating a second geographic area which intersects a first geographic area indicated by said first location information; transmit the first location information at a first power level and at a first coding rate; and transmit the second location information at a second power level and at a second coding rate, at least one of: the second power level being lower than said first power level and the second coding rate being higher than said first coding rate.

In various embodiments, processor 2002 is configured such that the transmission range of the first location information is greater than the transmission range of the second location information. In some embodiments processor 2002 is configured such that the transmission rate of the second location information is higher than the transmission rate of the first location information.

In some embodiments, processor 2002 is further configured to transmit said first location information and the second location information during the same peer discovery transmission time interval. In various embodiments, processor 2002 is further configured to transmit said second location information as a superimposed signal on the first location information. In some such embodiments, processor 2002 is further configured to use BPSK or QPSK when transmitting said first location information and to use BPSK or QPSK when transmitting said second location information.

In various embodiments, processor 2002 is further configured to choose the second location information based on the first location information. In some such embodiments, the second location information is such that the second geographic area has a smallest intersection with the first geographic area over a set of available choices of the second location information.

Figure 21:
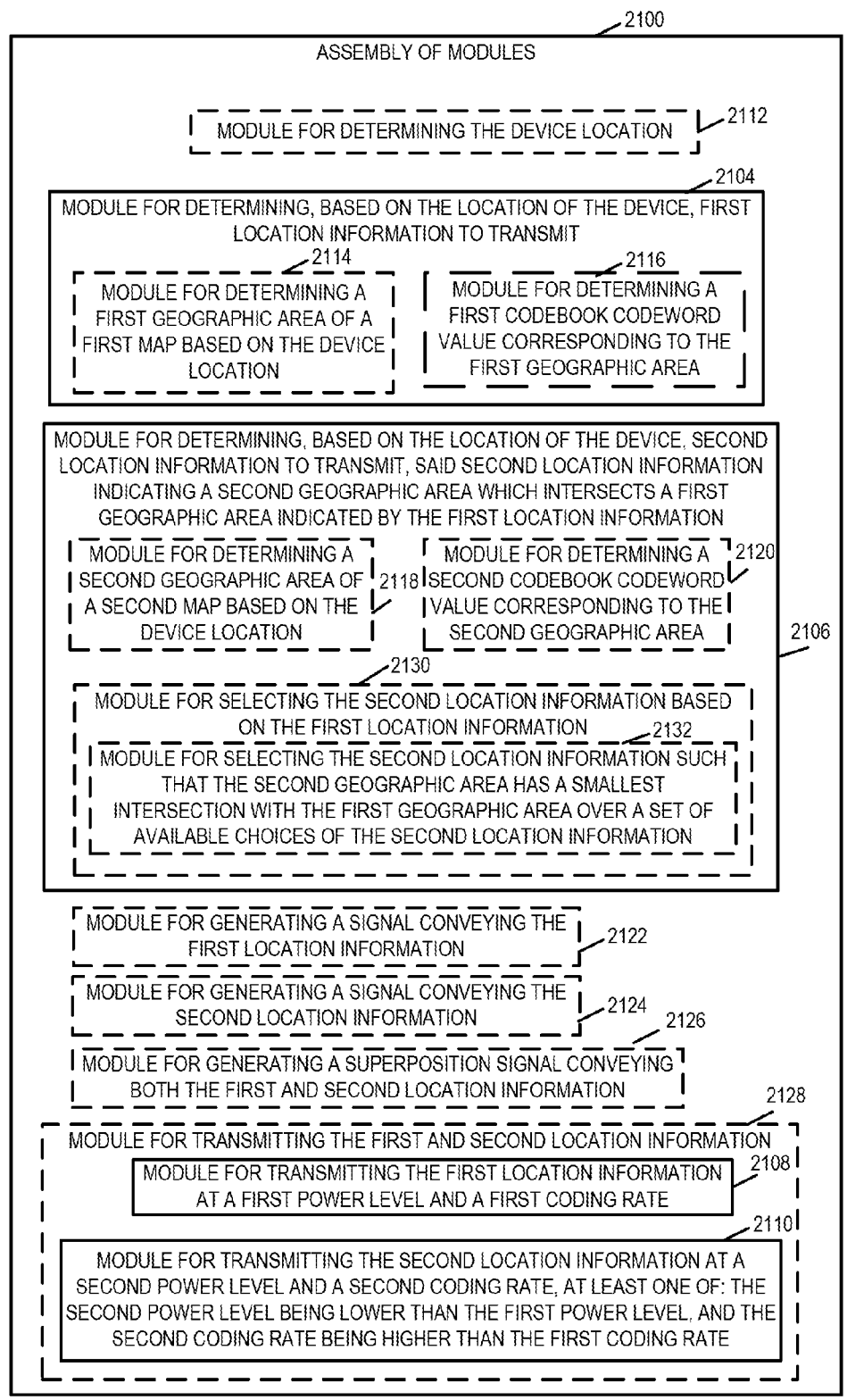
FIG. 21 is an assembly of modules which can, and in some embodiments is, used in the mobile wireless device illustrated in FIG. 20.

FIG. 21 is an assembly of modules 2100 which can, and in some embodiments is, used in the mobile wireless device 2000 illustrated in FIG. 20. The modules in the assembly 2100 can be implemented in hardware within the processor 2002 of FIG. 20, e.g., as individual circuits. Alternatively, the modules may be implemented in software and stored in the memory 2004 of the mobile wireless device 2000 shown in FIG. 20. In some such embodiments, the assembly of modules 2100 is included in routines 2011 of memory 2004 of device 2000 of FIG. 20. While shown in the FIG. 20 embodiment as a single processor, e.g., computer, it should be appreciated that the processor 2002 may be implemented as one or more processors, e.g., computers. When implemented in software the modules include code, which when executed by the processor, configure the processor, e.g., computer, 2002 to implement the function corresponding to the module. In some embodiments, processor 2002 is configured to implement each of the modules of the assembly of modules 2100. In embodiments where the assembly of modules 2100 is stored in the memory 2004, the memory 2004 is a computer program product comprising a computer readable medium, e.g., a non-transitory computer readable medium, comprising code, e.g., individual code for each module, for causing at least one computer, e.g., processor 2002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 21 control and/or configure the mobile device 2000 or elements therein such as the processor 2002, to perform the functions of the corresponding steps illustrated and/or described in the method of flowchart 1900 of FIG. 19.

Assembly of modules 2100 includes a module 2104 for determining, based on the location of the first device, first location information to transmit, a module 2106 for determining, based on the location of the device, second location information to transmit, said second location information indicating a second geographic area which intersects a first geographic area indicated by the first location information, a module 2108 for transmitting the first location information at a first power level and a first coding rate and a module 2110 for transmitting the second location information at second power level and a second coding rate, at least one of: the second power level being lower than the first power level and the second coding rate being higher than the first coding rate.

In some embodiments, the transmission range of the first location information is greater than the transmission range of the second location information. In some embodiments, the transmission rate of the second location information is higher than the transmission rate of the first location information.

In various embodiments, the first location information and the second location information are transmitted during the same peer discovery transmission time interval. In some such embodiments, the second location information is transmitted as a superimposed signal on the first location information. In some such embodiments, the first location information is transmitted using BPSK or QPSK and said second location information is transmitted using BPSK and QPSK.

In some embodiments, the second location information is chosen based on the first location information. In some such embodiments, the second location information is chosen such that the second geographic area has a smallest intersection with the first geographic area over a set of available choices of the second location information.

In some embodiments, assembly of modules 2100 includes one or more or all of: a module 2112 for determining the device's location, a module 2122 for generating a signal conveying first location information, a module 2124 for generating a signal conveying second location information, and a module 2126 for generating a superposition signal conveying both the first and second location information. In some embodiments, module 2108 and module 2110 are included as part of a module 2128 for transmitting first and second location information. In other embodiments, module 2108 and 2110 are standalone modules.

In various embodiments, module 2104 for determining first location information to transmit includes one or both of: a module 2114 for determining a first geographic area of a first map based on the device location and a module 2116 for determining a first codebook codeword value corresponding to the first geographic area.

In some embodiments, module 2106 for determining second location information to transmit includes one or more or all of: a module 2118 for determining a second geographic area of a second map based on the device location, a module 2120 for determining a second codebook codeword value corresponding to the second geographic area and a module 2130 for selecting the second location information based on the first location information. In some embodiments including module 2130, module 2130 includes a module 2132 for selecting the second location information such that the second geographic area has a smallest intersection with the first geographic area over a set of available choices of the second location information.

Figure 22:
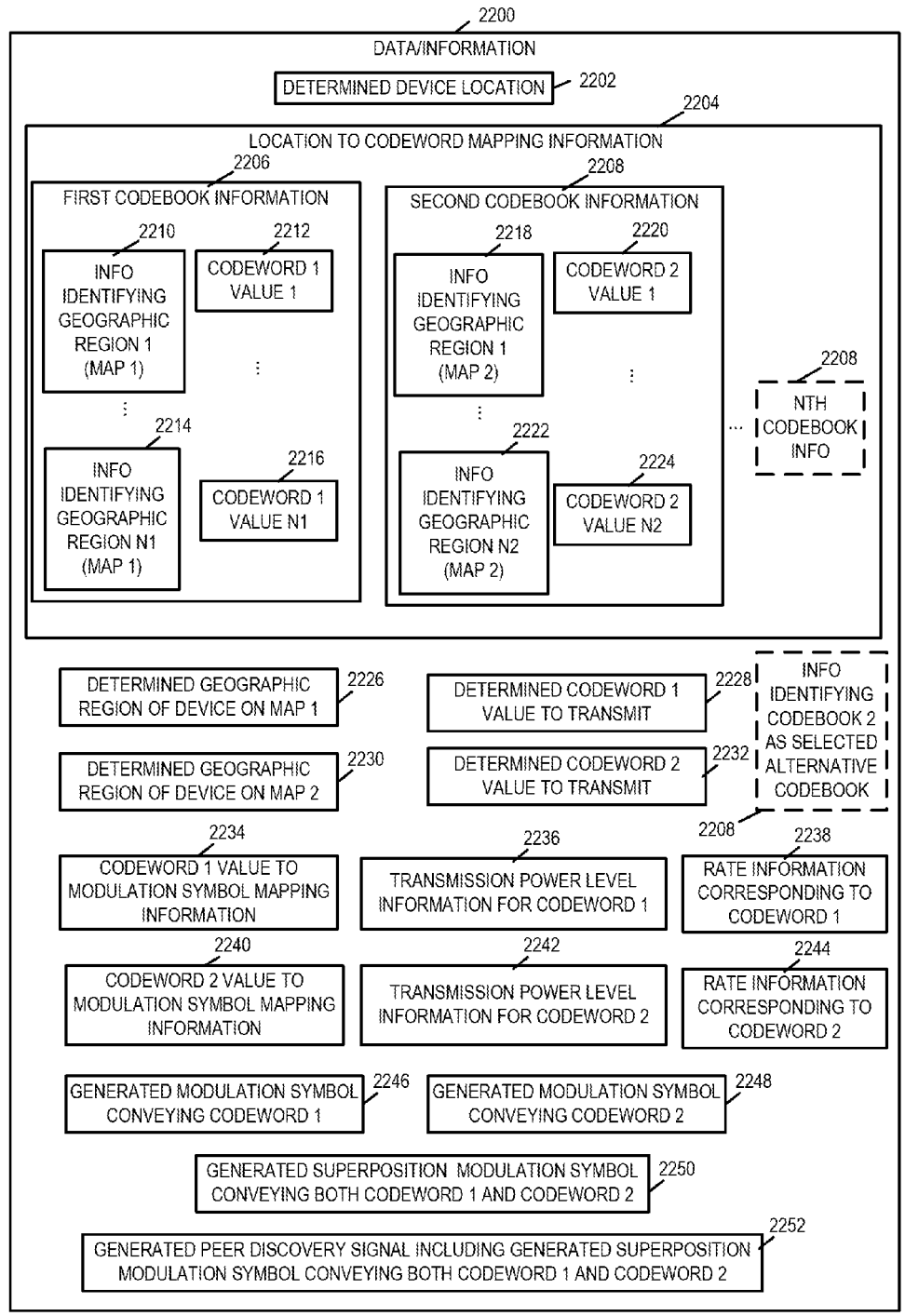
FIG. 22 is a drawing of exemplary data/information which may be included in the memory of the device of FIG. 20.

Exemplary data/information 2200 of FIG. 22 is, e.g., included in data/information 2013 of memory 2004 of device 2000 of FIG. 20. Data/information 2200 includes a determined device location 2202, location to codeword mapping information 2204, a determined geographic region of the device on map 1 2226, a determined codeword 1 value to transmit 2228, a determined geographic region of the device on map 2 2230, a determined codeword 2 value to transmit 2232, codeword 1 value to modulation symbol mapping information 2234, transmission power level information for codeword 1 2236, rate information, e.g., coding rate and/or information rate, corresponding to transmitting codeword 1 2238, codeword 2 value to modulation symbol mapping information 2240, transmission power level information for codeword 2 2242, rate information, e.g., coding rate and/or information rate, corresponding to codeword 2 2244, generated modulation symbol conveying codeword 1 2246, generated modulation symbol conveying codeword 2 2248, generated superposition modulation symbol conveying both codeword 1 and codeword 2 2250, and a generated peer discovery signal including the generated superposition modulation symbol conveying both codeword 1 and codeword 2.

Location to codeword mapping information 2204 includes a plurality of sets of codebook information. Information 2204 includes first codebook information 2206 and second codebook information 2208. First codebook information 2206 includes information identifying a plurality of different geographic regions on map 1 and a plurality of different corresponding codeword 1 values ((information identifying geographic region 1 of map 1 2210, corresponding codeword 1 value 1 2212), . . . (information identifying geographic region N1 of map 1 2214, corresponding codeword 1 value N1 2216)). In some embodiments, N1=2 and codeword 1 value 1=0 and codeword 1 value 2=1. In some embodiments, N1=4 and codeword 1 value 1=0o; codeword 1 value 2=01; codeword 1 value 3=10; codeword 1 value 4=11. Second codebook information 2208 includes information identifying a plurality of different geographic regions on map 2 and a plurality of different corresponding codeword 2 values ((information identifying geographic region 1 of map 2 2218, corresponding codeword 2 value 1 2220), . . . (information identifying geographic region N2 of map 2 2222, corresponding codeword 2 value N2 2224)). In some embodiments, N2=2 and codeword 2 value 1=0 and codeword 2 value 2=1. In some embodiments, N2=4 and codeword 2 value 1=00; codeword 2 value 2=01; codeword 2 value 3=10; codeword 2 value 4=11.

In some embodiments, location to codebook mapping information includes more than 2 codebook information sets, e.g., the location to codeword mapping information 2204 includes N codebook information sets including Nth codebook information 2208, where N is an integer greater than or equal to 3. The information in Nth codebook information 2208 is similar to the information in codebooks 2206 and 2208, e.g., except corresponding to a different map, e.g., map N with at least some different geographic regions than in at least one other map in the set of maps. In various embodiments, including more than 2 codebook information sets, assembly of modules 2204 further includes information identifying a selected codebook to be used to communicated second location information, e.g., information 2208 identifying codebook 2 from among the plurality of alternative codebooks (second codebook, . . . , Nth codebook) as the codebook which has been selected to communicate second location information. For example, the device may choose to use the codebook from among the alternatives (codebook 2, . . . N) which in combination with first codebook provides the most precise estimate of device location, e.g., the smallest amount of intersection between the two regions identified by the two codewords which are communicated corresponding to the device location.

Figure 23:
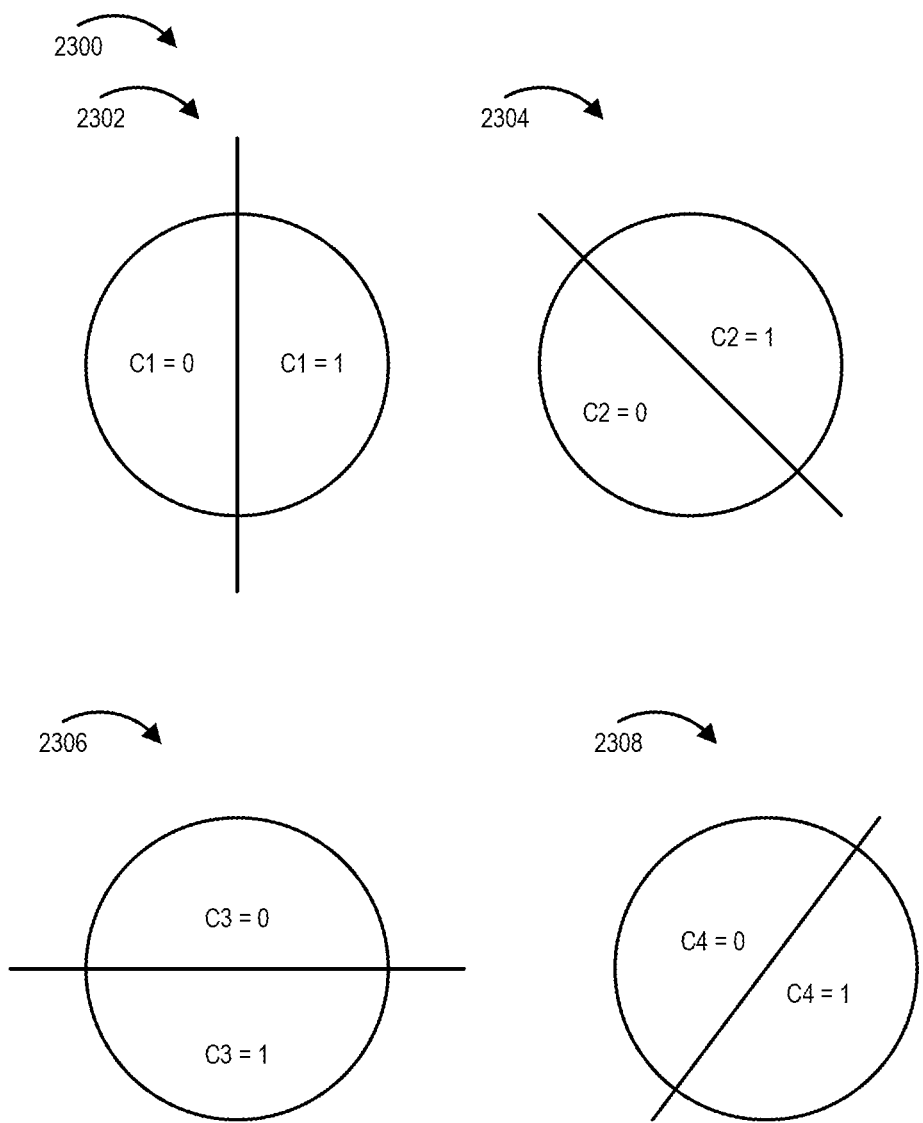
FIG. 23 illustrates an example in which an area is represented by four different codebooks, which map device location to codewords.

Drawing 2300 of FIG. 23 illustrates an example in which an area is represented by four different codebooks, which map device location to codewords. Drawing 2302, which corresponds to a first codebook, indicates the geographic area represented by the left half of the circle corresponds to codeword C1=0 and the geographic area represented by the right half of the circle corresponds to codeword C1=1. Drawing 2304, which corresponds to a second codebook, indicates the geographic area represented by the portion the circle above the diagonal line corresponds to codeword C2=1 and the geographic area represented by the portion of the circle below the diagonal line corresponds to codeword C2=0. Drawing 2306, which corresponds to a third codebook, indicates the geographic area represented by the portion the circle above the horizontal line corresponds to codeword C3=0 and the geographic area represented by the portion of the circle below the horizontal line corresponds to codeword C3=1. Drawing 2308, which corresponds to a fourth codebook, indicates the geographic area represented by the portion of the circle above the diagonal line corresponds to codeword C4=0 and the geographic area represented by the portion of the circle below the diagonal line corresponds to codeword C4=1.

Figure 24:
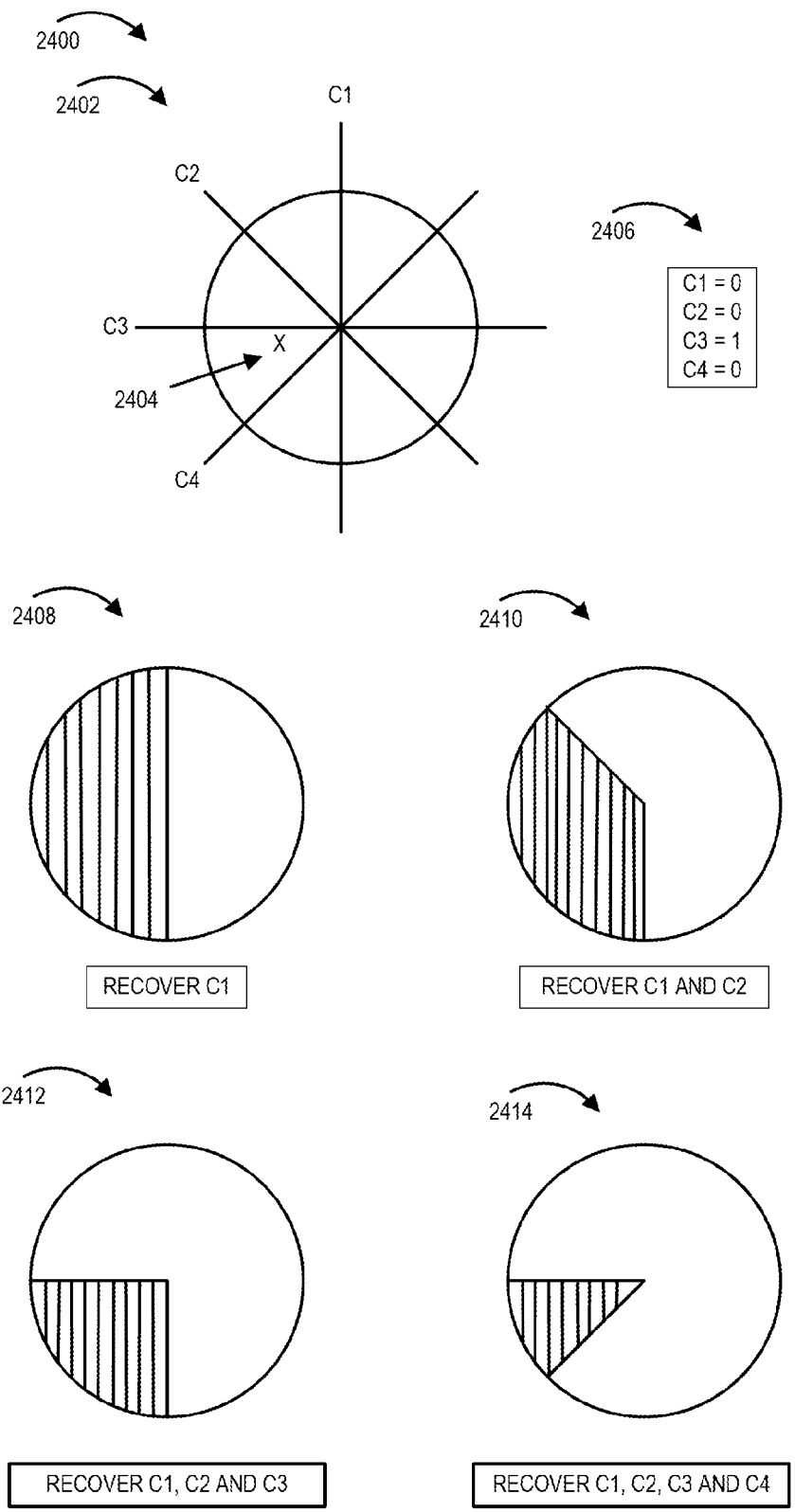
FIG. 24 illustrates an example, in which a first mobile wireless device uses the multiple codebooks of FIG. 23 to communicate its location information, and a second device recovers the information and determines first device location including successive refinements of first device location determination.

Drawing 2400 of FIG. 24 illustrates an example, in which a first mobile wireless terminal uses the multiple codebooks of FIG. 23 to communicate its location information. Drawing 2402 illustrates a composite of the FIG. 23 drawings in which the various representations (2302, 2304, 2306, 2408) are overlaying one another. Consider that the first mobile wireless device is located at the point indicated by X 2404. Based on location X 2404 and using the first codebook, the first mobile wireless device determines that codeword C1=0. Based on location X 2404 and using the second codebook, the first mobile wireless device determines that codeword C2=0. Based on location X 2404 and using the third codebook, the first mobile wireless device determines that codeword C3=1. Based on location X 2404 and using the fourth codebook, the first mobile wireless device determines that codeword C4=0.

It may be observed that: (i) the geographic area represented by C1=0 intersects the geographic area represented by C2=0; (ii) the geographic area represented by C1=0 intersects the geographic area represented by C3=1; and (iii) the geographic area represented by C1=0 intersects the geographic area represented by C4=0. In this example, each geographic area that can be represented by a codeword from one dictionary partially overlaps with each geographic area that can be represented by a codeword from a different dictionary.

Consider that an exemplary first mobile wireless device transmits the determined codewords from each of the four codebooks. In this example, the first mobile wireless device transmits the set of information 2406 including codeword C1=0 from the first codebook, codeword C2=0 from the second codebook, codeword C3=1 from the third codebook and codeword C4=0 from the fourth codebook.

Consider that a second wireless device receives a signal communicating codeword C1=0 and successfully recovers the codeword. The second wireless terminal, uses the first codebook and received codeword C1=0, to determine that the first mobile wireless device is in the area represented by vertical line shading in drawing 2408.

Further consider that the second wireless device receives a signal communicating codeword C2=0 and successfully recovers the codeword. The second wireless terminal, uses the second codebook and received codeword C2=0 in addition to using the first codebook and received codeword=1, to determine that the first mobile wireless device is in the area represented by vertical line shading in drawing 2410.

Further consider that the second wireless device receives a signal communicating codeword C3=1 and successfully recovers the codeword. The second wireless terminal, uses the third codebook and the received codeword C3=1 in addition to using the second codebook and received codeword C2=0 and the first codebook and received codeword=1, to determine that the first mobile wireless device is in the area represented by vertical line shading in drawing 2412.

Further consider that the second wireless device receives a signal communicating codeword C4=0 and successfully recovers the codeword. The second wireless terminal, uses the fourth codebook and the received codeword C4=0 in addition to using the third codebook and received codeword C3=1, and the second codebook and received codeword C2=0, and the first codebook and received codeword=1, to determine that the first mobile wireless device is in the area represented by vertical line shading in drawing 2414.

In this example, each recovered codeword from a different codebook has communicated information which allowed the second mobile wireless device to successively refine the location determination of the first wireless device.

Figure 25:
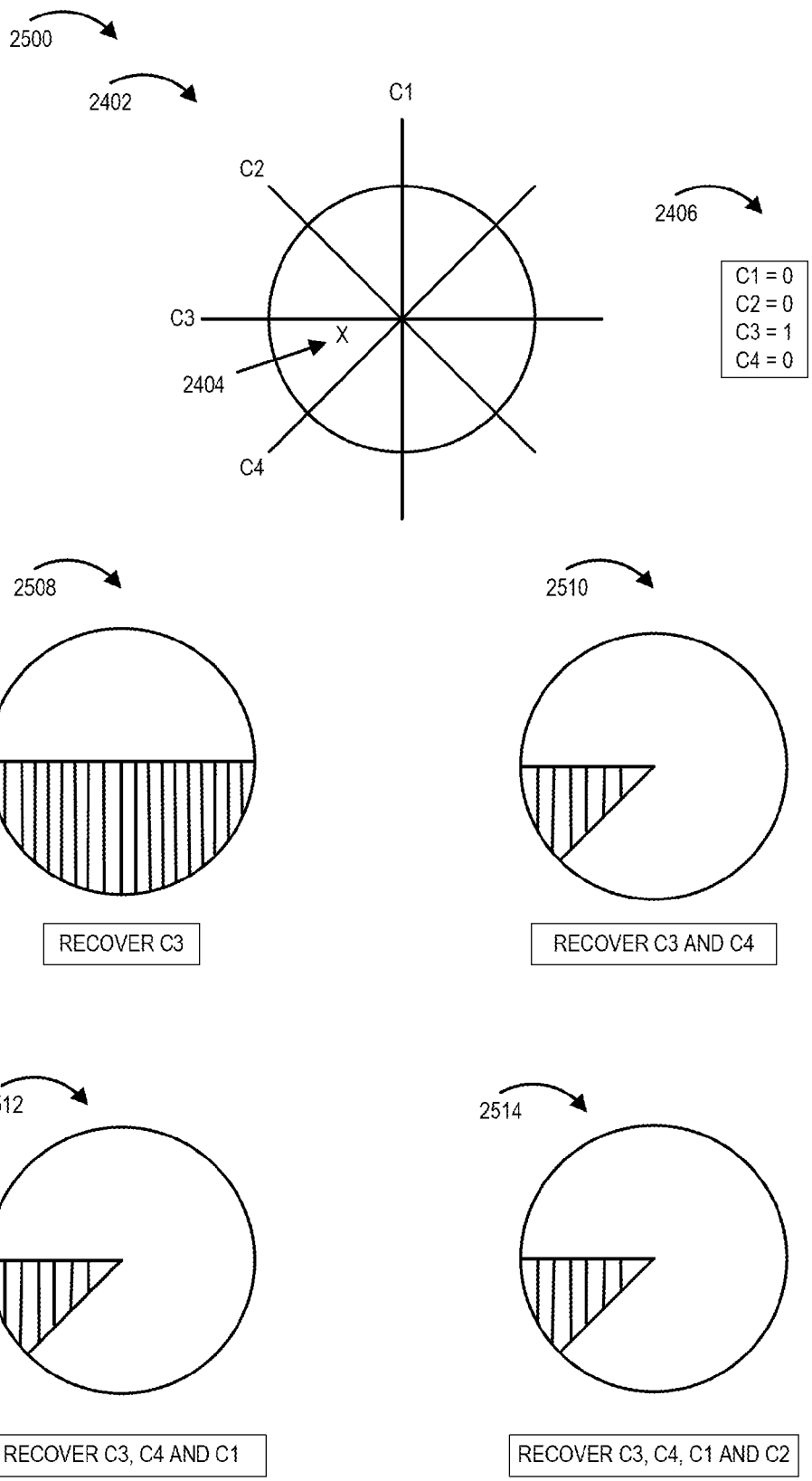
FIG. 25 illustrates an example, in which the first mobile wireless device transmits the same set of codewords as shown in FIG. 24; however, the order of reception by the second device is different resulting in a faster convergence to the minimum area solution.

Drawing 2500 of FIG. 25 illustrates an example, in which the first mobile wireless device is again located at location 2404 on drawing 2400 and transmits the same set of codewords {C1=0, C2=0; C3=1; C4=0}. Consider that the transmissions are in successive order and then repeat.

In this example, consider that the second mobile wireless device starts monitoring at a point in time that it first receives and successfully recovers codeword C3=1. The second wireless terminal, uses the third codebook and received codeword C3=1, to determine that the first mobile wireless device is in the area represented by vertical line shading in drawing 2508.

Further consider that the second wireless device receives a signal communicating codeword C4=0 and successfully recovers the codeword. The second wireless terminal, uses the fourth codebook and received codeword C4=0 in addition to using the third codebook and received codeword C3=1, to determine that the first mobile wireless device is in the area represented by vertical line shading in drawing 2510.

In this example, the second mobile wireless device has converged to a minimum possible location area after recovering and interpreting two codewords. In this example, further recovery of codeword C1 and C2 does not provide additional refinement of the location determination as indicated by drawings 2512 and 2514.

Depending upon the location of the first wireless device, the order of codewords transmitted and the starting point for recovery of codewords, the amount of recovered codewords to complete the convergence varies. In the examples, of FIGS. 24 and 25 the detection and successful recovery of one codeword provides some location information regarding the location of the first mobile wireless device. The detections and successful recovery of one or more additional codewords provides a refinement of the location determination.

FIG. 26 includes a drawing 2600 which illustrates exemplary signaling in which signals communicating codewords from different codebooks are transmitted at different power levels. The codewords communicated in the example of FIG. 26, are, e.g., the same codewords described with respect to FIGS. 24 and 25.

Horizontal axis 2602 represents time in a recurring peer to peer timing structure which includes a plurality of peer discovery time intervals (2604, 2606, 2608, 2610). The first mobile wireless device transmits peer discovery signal 2612 during peer discovery time interval 2604. Peer discovery signal 2612, which is transmitted at power level P1, includes first codebook codeword C1=0. The first mobile wireless device transmits peer discovery signal 2614 during peer discovery time interval 2606. Peer discovery signal 2614, which is transmitted at power level P2, includes second codebook codeword C2=0. The first mobile wireless device transmits peer discovery signal 2616 during peer discovery time interval 2608. Peer discovery signal 2616, which is transmitted at power level P3, includes third codebook codeword C3=1. The first mobile wireless device transmits peer discovery signal 2618 during peer discovery time interval 26010. Peer discovery signal 2618, which is transmitted at power level P4, includes fourth codebook codeword C4=0. In this example, P1>P2>P3>P4.

Different mobile wireless devices, at different distances from the first mobile wireless device and/or having different channel conditions with respect to the first mobile wireless device may be able to recover different codewords. For example, a mobile wireless device very close to the first mobile wireless device may be able to successfully recover each of the four codewords C1, C2, C3 and C4 and thus obtain a refined location determination; however, a wireless mobile device very far away from the first mobile device may be able to recover codeword C1 but not codewords C2, C3, and C4 and thus obtains a coarse location determination.

FIG. 27 includes a drawing 2700 which illustrates exemplary signaling in which signals communicating codewords from different codebooks are transmitted, wherein different coding rates are used. The codewords communicated in the example of FIG. 27, are, e.g., the same codewords described with respect to FIGS. 24 and 25.

Horizontal axis 2702 represents time in a recurring peer to peer timing structure which includes a plurality of peer discovery time intervals (2704, 2706, 2708, 2710). The first mobile wireless device transmits peer discovery signal 2712 during peer discovery time interval 2704. Peer discovery signal 2712 communicates first codebook codeword C1=0 and uses coding rate R1. The first mobile wireless device transmits peer discovery signal 2714 during peer discovery time interval 2706. Peer discovery signal 2714 communicates second codebook codeword C2=0 and uses coding rate R2. The first mobile wireless device transmits peer discovery signal 2716 during peer discovery time interval 2708. Peer discovery signal 2716 communicates third codebook codeword C3=1 and uses coding rate R3. The first mobile wireless device transmits peer discovery signal 2718 during peer discovery time interval 2710. Peer discovery signal 2718 communicates fourth codebook codeword C4=0 and uses coding rate R4.

In some embodiments, R1<R2<R3<R4. Different mobile wireless devices, at different distances from the first mobile wireless device and/or having different channel conditions with respect to the first mobile wireless device may be able to recover different codewords, e.g. because of the different coding rates used.

Figure 28:
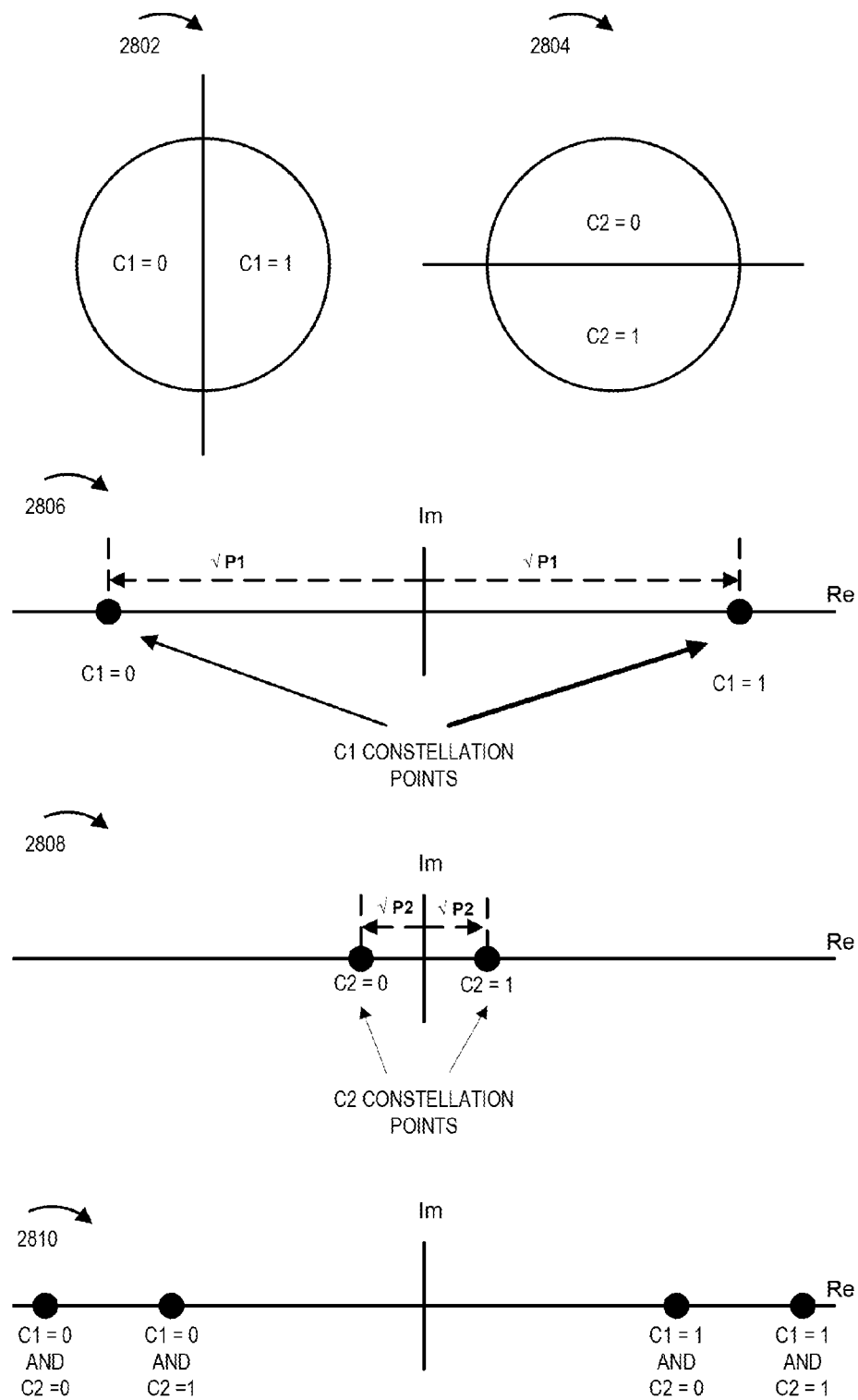
FIG. 28 is a first part of an example in which a first mobile wireless device communicates location information using codewords from multiple codebooks using superposition.
Figure 29:
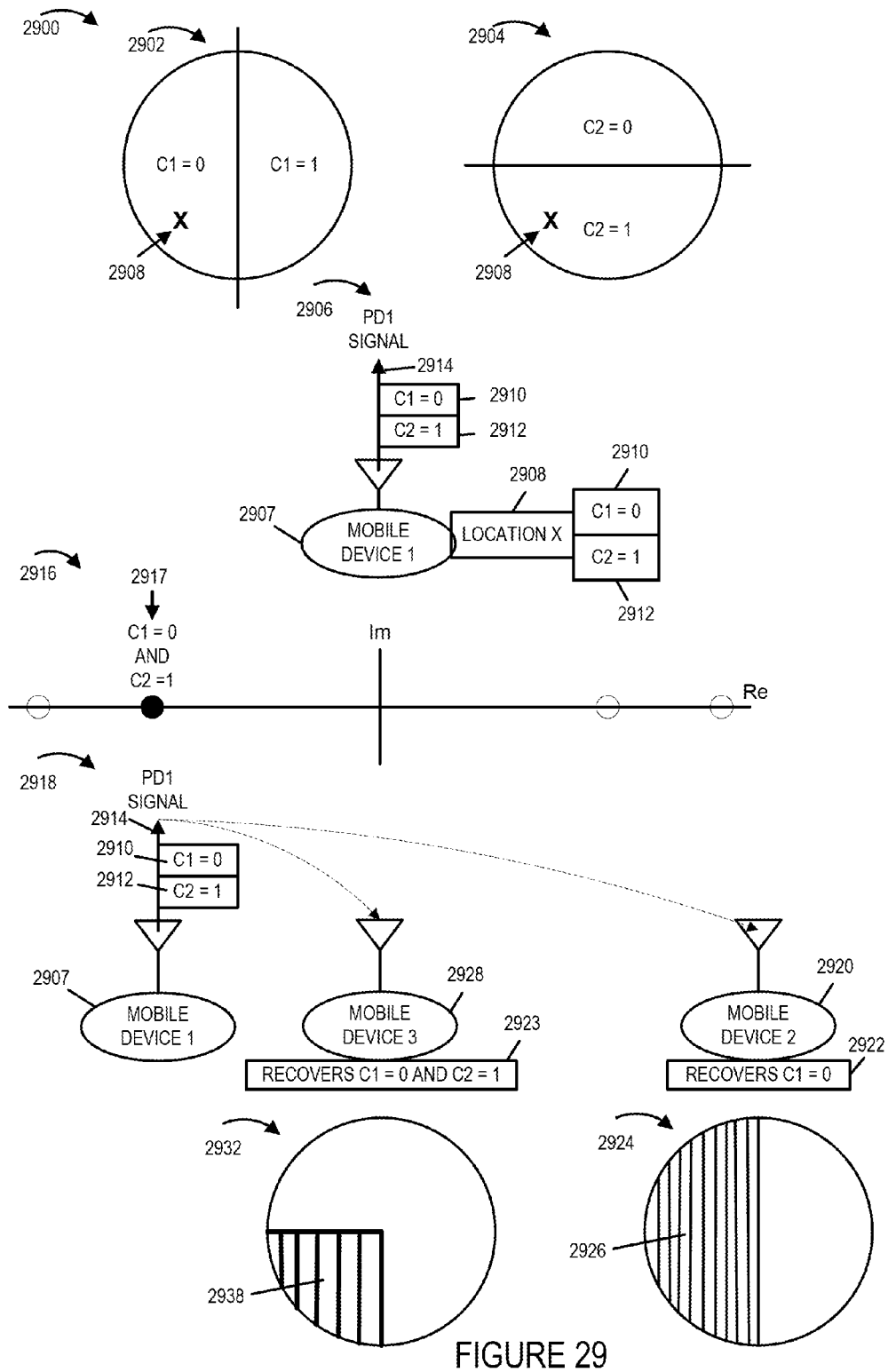
FIG. 29 is a first second of an example in which a first mobile wireless device communicates location information using codewords from multiple codebooks using superposition and using BPSK.

FIG. 28 and FIG. 29 illustrate an example in which a first mobile wireless device communicates location information using codewords from multiple codebooks using superposition. FIG. 28 illustrates an example in which an area is represented by two different codebooks, which map device location to codewords. Drawing 2802, which corresponds to a first codebook, indicates the geographic area represented by the left half of the circle corresponds to codeword C1=0 and the geographic area represented by the right half of the circle corresponds to codeword C1=1. Drawing 2804, which corresponds to a second codebook, indicates the geographic area represented by the upper half of the circle corresponds to codeword C2=0 and the geographic area represented by the lower half of the circle corresponds to codeword C2 1.

Drawing 2806 illustrates the BPSK constellation points corresponding to codebook 1 codeword C1. A modulation symbol at power level $\sqrt{P1}$ and phase angle 0 is used to represent codeword C1=1. A modulation symbol at power level $\sqrt{P1}$ and phase angle 180 is used to represent codeword C1=0. Drawing 2808 illustrates the BPSK constellation points corresponding to codebook 2 codeword C2. A modulation symbol at power level $\sqrt{P2}$ and phase angle 0 is used to represent codeword C2=1. A modulation symbol at power level $\sqrt{P2}$ and phase angle 180 is used to represent codeword C2=0.

In this exemplary embodiment, the first mobile wireless device determines its location, determines a first codeword from the first codebook based on the location and determines the modulation symbol corresponding to the first codeword. In addition, the first mobile wireless device determines a second codeword from the second codebook based on its determined location and determines a modulation symbol corresponding the second codeword. The first mobile wireless device generates a superimposed signal communicating both codewords concurrently. Drawing 2810 illustrates the four alternatives which may be transmitted to communicate the pair of codewords concurrently. A modulation symbol at power level $\sqrt{P1}+\sqrt{P2}$ and phase angle 0 is used to represent codewords C1=1 and C2=1. A modulation symbol at power level $\sqrt{P1}-\sqrt{P2}$ and phase angle 0 is used to represent codewords C1=1 and C2=0. A modulation symbol at power level $\sqrt{P1}+\sqrt{P2}$ and phase angle 180 is used to represent codewords C1=0 and C2=0. A modulation symbol at power level $\sqrt{P1}-\sqrt{P2}$ and phase angle 180 is used to represent codewords C1=0 and C2=1.

Drawing 2902 of FIG. 29 illustrates that the first mobile wireless device is located in the geographic area represented by first codebook codeword C1=0, as indicated by the X mark. Drawing 2904 of FIG. 29 illustrates that the first mobile wireless device is located in the geographic area represented by second codebook codeword C2=0, as indicated by the X mark.

Drawing 2906 of FIG. 29 indicates that the first mobile wireless device 2907 which is at location X 2908 determines that codeword C1=0 2910 and that codeword C2=1 2912. First device 2907 generates peer discovery signal 1 2914 which includes codeword C1=0 2910 and codeword C2=1 2912. Drawing 2916 indicates that the information codeword C1=0 and codeword C2=1 is communicated by modulation symbol 2917 which is included in peer discovery signal 1 2914.

Drawing 2918 of FIG. 29 illustrates exemplary broadcasting of location information from the first mobile wireless communication device, and different levels of first device location determinations by different devices which are different distances from the first mobile wireless device. Mobile device 1 2907 broadcasts peer discovery signal 1 2914 communicating C1=0 and C2=1 using a superimposed signal. Mobile device 2 2920 which is far away from mobile device 1 is able to recover codeword C1=0, which was communicated using high power; however, it is unable to recover codeword C2 which was communicated using lower power. Thus, mobile device 2 2920 determines that mobile device 1 in geographic half circle area 2926 of drawing 2924 which corresponds to C1=0. Mobile device 3 2928 which is close to mobile device 1 is able to recover both codeword C1=0 and codeword C2=1. Thus mobile device 3 2928 determines that mobile device 1 is in the geographic quarter circle area 2938 of drawing 2932 which corresponds to the intersection between the area corresponding to C1=0 and the area corresponding to C2=1.

Figure 30:
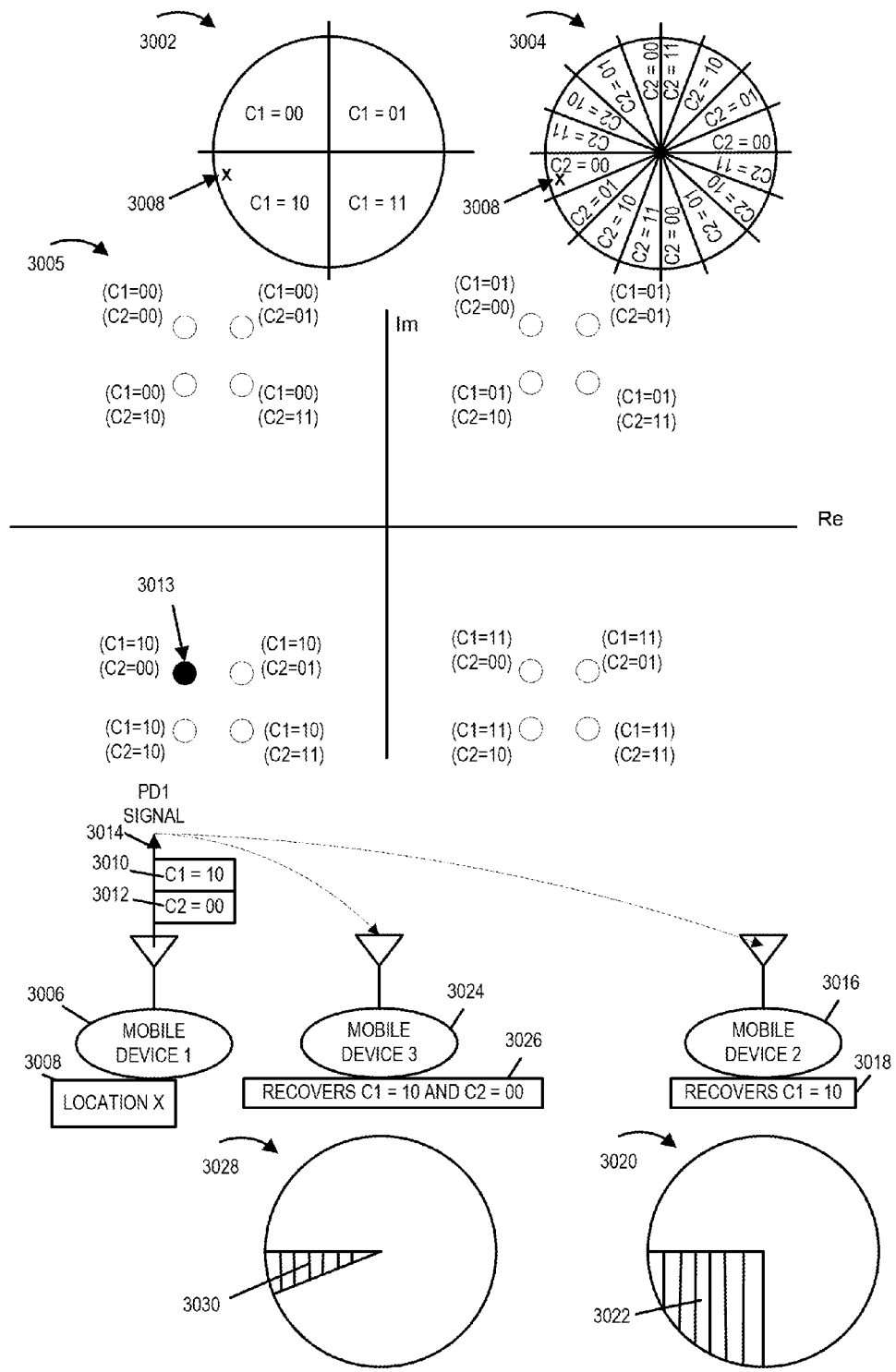
FIG. 30 illustrate an example in which a first mobile wireless device communicates location information using codewords from multiple codebooks using superposition and using QPSK.

FIG. 30 illustrate an example in which a first mobile wireless device 3006 communicates location information using codewords from multiple codebooks using superposition. Drawing 3002, which corresponds to a first codebook, indicates four geographic areas corresponding to four different codewords in a first codebook (C1=00, C1=01, C1=10, and C1=11. Drawing 2304, which corresponds to a second codebook, indicates four different geographic areas corresponding to four different codewords in a second codebook (C2=00, C2=01, C2=10, and C2=11).

In this example, consider that mobile wireless device 1 3006 determines its location to be location X 3008, determines a first codeword from the first codebook to be C1=10 3010, based on the location, and determines a second codeword from the second codebook to be C2=00 3012, based on the location.

Drawing 3005 illustrates the 16 alternative modulation symbols, corresponding to the sixteen possible codeword pair combinations. In this example, the first codeword is communicated using a first signal, which is a high power signal in a high power QPSK constellation, and the second codeword is communicated using a second signal which is a low power signal in a low power QPSK constellation. The first and second signals are superimposed such that the first and second codewords are communicated concurrently.

In this example, the first codeword C1=10 and the second codeword C2=00 map to modulation symbol 3013 in drawing 3005. Mobile device 1 3006 generates modulation symbol 3013 which is included in generated peer discovery signal 1 3014.

Mobile device 1 3006 broadcasts peer discovery signal 1 3014 communicating C1=10 and C2=00 using a superimposed signal. Mobile device 2 3016, which is far away from mobile device 1 3006, is able to recover codeword C1=10 3018, which was communicated using high power; however, it is unable to recover codeword C2 which was communicated using lower power. Thus mobile device 2 3016 determines that mobile device 1 in geographic quarter circle area 3022 of drawing 3020 which corresponds to C1=10. Mobile device 3 3024, which is close to mobile device 1 3006, is able to recover both codeword C1=10 and codeword C2=00, as indicated by block 3026. Thus mobile device 3 3024 determines that mobile device 1 3006 is in the geographic sixteenth circle area 3030 of drawing 3028 which corresponds to the intersection between the area corresponding to C1=10 and the area corresponding to C2=00.

Figure 31:
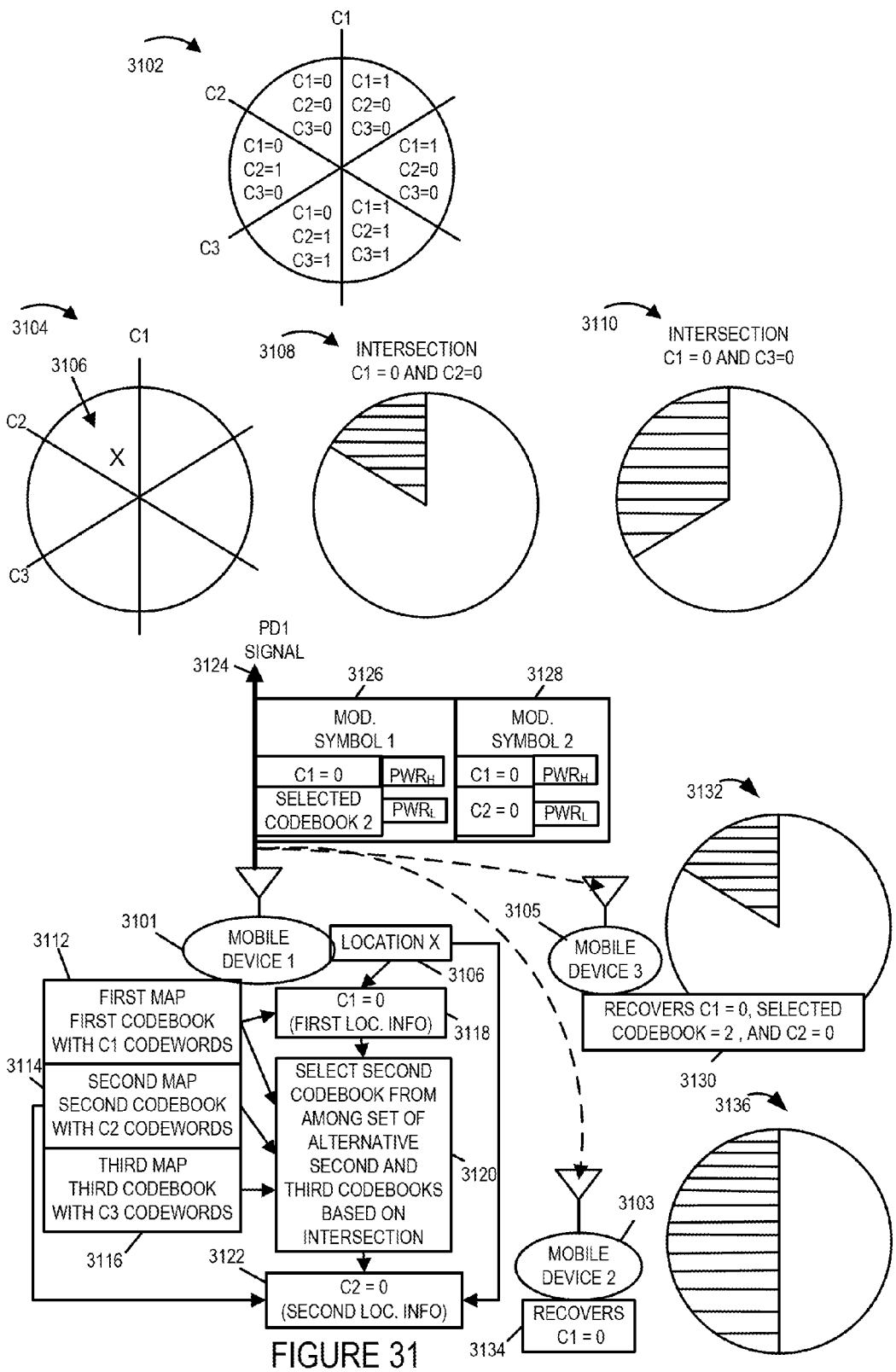
FIG. 31 illustrates an example in which a first mobile wireless device communicates location information using codewords from multiple codebooks using superposition, wherein at least one of the codebooks is selected from a set of alternative codebooks.

FIG. 31 illustrates an example in which a first mobile wireless device 3101 communicates location information using codewords from multiple codebooks using superposition. Drawing 3102, illustrates an exemplary area which is represented by three different codebooks. The first codebook includes two entries corresponding to codeword C1, C1=0 and C1=1, each corresponding to half of the circle. The second codebook includes two entries corresponding to codeword C2, C2=0 and C2=1, each corresponding to half of the circle. The third codebook includes two entries corresponding to codeword C3, C3=0 and C3=1, each corresponding to half of the circle.

Drawing 3104 illustrates the mobile device 1 3101 is at location X 3106. If codebook 1 is used to communicate location X 3106, C1=0 is communicated. If codebook 2 is used to communicate location X 3106, C2=0 is communicated. If codebook 3 is used to communicate location X 3106, C3=0 is communicated.

Drawing 3108 illustrates, via horizontal line shading, the intersection of the geographic area represented by codeword C1=0 and the geographic area represented by codeword C2=0. Drawing 3110 illustrates, via horizontal line shading, the intersection of the geographic area represented by codeword C1=0 and the geographic area represented by codeword C3=0.

In this example, consider that mobile wireless device 1 3101 includes: first map information and a corresponding first codebook with C1 codewords 3112, second map information and a corresponding second codebook with C2 codewords 3114, and third map information and a corresponding third codebook with C3 codewords 3116. Further consider that mobile wireless device 1 3101 determines its location to be location X 3106, and determines a first codeword from the first codebook to be C1=0 3118, based on the location. Codeword C1=0 is first location information to be communicated. Mobile device 1 3101 selects the second codebook to communicate second location information from among the set of alternative second and third codebooks based on the amount of intersection as observed in drawing 3108 and 3010 as indicated by block 3120, e.g., selects the alternative giving the smallest intersection, which in this case is codebook 2. Mobile wireless device 1 3101 determines a codeword from the second codebook to be C2=0 3118, based on the location X 3106. Codeword C2=0 represents second location information to be communicated as indicated by block 3122.

In this example, mobile device 1 3101 generates and transmits broadcast peer discovery signal 1 3124 to communicate the first location information C1=0 and second location information C2=0. Further consider that peer discovery signal 3124 includes two modulation symbols. Also consider that each modulation symbol represents the superposition of a high power BPSK symbol with a low power BPSK symbol. In modulation symbol 1 3126 C1=0 is conveyed by the high power BPSK component and the selection of codebook 2 is conveyed by the low power BPSK component. In modulation symbol 2 3126 C1=0 is conveyed by the high power BPSK component and C2=0 is conveyed by the low power BPSK component.

Mobile wireless device 2 3103, which is far away from mobile device 1 3101 and does not have a very good channel with respect to mobile device 1 3101, is able to recover the information communicated by the high power components of the superposition modulation symbols; however, device 2

3103 is unable to recover the information communicated by the low power components of the modulation symbols. Thus, device 2 3103 is able to recover codeword C1=0, as indicated by block 3134. Device 2 3103, uses recovered codeword C1=0, codebook 1 and corresponding map 1 information to identify that mobile device 1 3101 is located in the half circle area represented with horizontal line shading in drawing 3136.

Mobile wireless device 3 3105, which is close to mobile device 1 3101 and has a good channel with respect to mobile device 1 3101, is able to the recover the information communicated by both the high power components of the superposition modulation symbols and the information communicated by the low power components of the modulation symbols. Thus, device 3 3105 is able to recover codeword C1=0, selected codebook=2, and codeword C2=0, as indicated by block 3130. Device 3 3105, uses recovered codeword C1=0, codebook 1 and corresponding map 1 information, recovered codeword C2=0, codebook 2 and corresponding map 2 information to identify that mobile device 1 3101 is located in the sixth circle area represented with horizontal line shading in drawing 3132.

Various aspects of some, but not necessarily all embodiments, will now be discussed further.

A typical characteristic of wireless networks is that, at regular time intervals, devices may broadcast identifiers in order to be mutually discovered. The device identifiers are typically encoded in broadcast signals such as SSID/BSSID signals in WiFi, and peer discovery signals in some peer to peer communications protocols. Furthermore, in some peer to peer communications protocols, the device identifiers may only be determinable by buddy devices (or peers) which know the hash function used to encode the identifier. These broadcast signals are transmitted periodically and are designed to be short in duration and infrequent in repetition while ensuring reasonable latency of discovery. Various embodiments use an efficient method of encoding location information and transmitting it alongside the device identifier which is broadcast by the mobile in the form of its peer discovery signal.

In general, broadcasting is not the most appropriate means for frequently transmitting high-precision location information in a wireless network. For instance, it would be a poor utilization of communication resources indeed if every mobile were to broadcast its location to within one meter, every few seconds, if none of the device's buddy peers was in the neighborhood. Hence, various exemplary described methods are aimed at providing a light-weight protocol for transmitting approximate location information that would be sufficiently useful for enabling location-based applications. Once a mobile detects the presence of another buddy peer and determines its approximate location, more precise location information can be obtained by paging that device and setting up a data traffic link. The benefit of using SSID/peer discovery signals is that, by virtue of being broadcast, these signals may simultaneously inform a multitude of listening buddy peers about the (approximate) location of the broadcasting mobile.

Some features of various embodiments are listed below and described. The order in which the ideas are discussed below may differ from the order in which some of the ideas have been discussed above.

1. Quantization of the area map using meta-information
2. Design of user-specific location codebooks
3. Successive refinement of location information
4. Multi-resolution location codebooks Map quantization using meta-information and product codebooks will now be described. Location information is relevant in the context of a map of the area in which a mobile is located. Consider that the mobile wishing to discover the locations of other mobiles has obtained this map by some means including, for example, downloading it from an access point, base-station or another device. In some embodiments, the map is quantized, a priori, into a set of regions and with each region in this set a location codeword is associated. For the given map, the set of each of the location codewords constitutes a location codebook. A mobile that has determined its position transmits a location codeword corresponding to the region that is the closest, according to some metric, to the determined position. The codebook associated with a given map may be downloaded from a network device along with the map by the mobile device before it begins to broadcast its location.

The map may be quantized according to the features and the content that is deemed most relevant for positioning purposes. Consider, for example, the case of an office building. The information about locations of the offices and conference rooms are very relevant for positioning since that is where the mobile devices are typically located. Hence, in one embodiment, the codewords may describe whether a device is in a conference room, an office or a cubicle, or even in which particular room it is located. In another embodiment, the map may be straightforwardly quantized without taking into account any particular features by simply breaking it up into well-defined regions, or tiles, which can be square, hexagonal, etc, and which cover the map. To each region a unique codeword is assigned. In some embodiments, however, a combination of the two quantization methods may be used so that the basic tiles are augmented with additional "meta-information" regarding the "type" of the mobile's location. Such an encoding scheme can be used with a relatively coarse basic tiling because the additional feature information can compensate for a loss in position accuracy due to the size of the tiles. One example of where this can be useful is in the situation when a mobile determines that it is located in a tile that happens to cover a conference room, a cubicle and part of an office hallway. In addition to encoding and broadcasting the codeword corresponding to this tile, the mobile device need simply select and broadcast one of three possible "meta-quantization levels"—representing conference rooms, cubicles or office hallways—in order to improve the accuracy of the location information.

The above example of combining tile information with meta-information can be viewed as a special embodiment of a more general method, used in some embodiments, of conveying location information using a product codebook. An element of a product codebook is called a product codeword, which can be defined as a set of sub-codewords from the individual sub-codebooks that constitute the product codebook. The term "product" is used here because the product codeword lies in the product (sub)space of the sub-codebooks. The key property of a product codebook is that each sub-codeword in a given sub-codebook represents a region which has a non-zero area of intersection with at least one sub-codeword from each of the other sub-codebooks. The geographic region represented by a product codeword is determined by intersecting the regions represented by each of the sub-codewords in the list. To encode its location, the mobile selects a set of sub-codewords, one from each of the sub-codebooks comprising the product codebook, such that each sub-codeword in the set represents a region that contains the mobile's location.

Another important property of such a product codebook is that the product codeword may be partially decoded at the receiver even when the set of received sub-codewords is only a subset of the set of sub-codewords selected by the transmitter. In other words, a region containing the location of the mobile may be determined by intersecting the regions represented by whichever of the sub-codewords has been received. The more sub-codewords are received, the smaller the area of the region formed by their intersection, hence the more accurate the determined location of the transmitting mobile. An example of such partial decoding is given in the section discussing "Successive refinement of location" below.

User-specific location codebooks will now be discussed. In some embodiments, each mobile device may have its own unique location codebook. The codebook may be designed based on the locations that the mobile most frequently visits. For instance, in an office building, a given user is typically either in his/her office or in a subset of the conference rooms in the building. The user's location, therefore, can be described with very few bits most of the time. A given user's location codebook may be a priori downloaded from a central server along with the corresponding map by each of the users that have the given user on their buddy list and wish to discover his/her location. The location codebook is linked to the mobile's identifier which is also broadcast in the peer discovery signal. The listening mobile first decodes the identifier from the peer discovery signal, based on which it determines which codebook to use, and then decodes the location information using that codebook. In some situations the mobile device may use one of a set of codebooks to encode its location information. In this case, it would indicate this selection in its peer discovery signal. For example, if the mobile determines that it is not in one of the locations that may be described by its user-specific codebook, it may choose to use a public codebook to encode its position. The public codebook might be of the type described in the previous section.

The benefit of using a user-specific codebook is that it allows for rapid broadcasting of location information. Note that, just as in the case of user-specific codebook, the privacy of the broadcasting mobile's location can also be protected in case it uses the public codebook. One way to do this would be to permute or scramble the codewords in the public codebook according to the mobile's ID. The permutation or scrambling function can be time-varying and only known to the users that are on the transmitting user's buddy list. Another way may be to prevent the location information bits from being decoded in hardware if the discovered mobile's ID is not decodable (i.e., if it does not hash into one of the entries of the buddy list). In general, one of the strengths of this approach is the control of location information bits at the PHY/MAC layer, as opposed to the application layer. In this way, the privacy and security of the broadcast information can be guaranteed at the hardware level.

In another embodiment, the location codebook may be selected based on other information that is shared by the mobiles in the network. For example, it may be based on the current time, relative to some common start time that the mobiles share. This may be useful when the typical locations of the users exhibit a multimodal distribution: the set of likely locations changes with time in a predictable fashion. In yet another embodiment, the codebook may be group-specific, rather than user-specific. For instance, a user may belong to group representing his/her workplace colleagues or school/college peers which share similar daily schedules.

The user-specific codebook may be learned, over time, based on the history and associated times of the mobile's locations. For instance, if the network determines the mobile's location over time it may also determine the set of locations that the mobile is most likely to occupy in the future, hence defining the user-specific codebook for that user. This codebook may then be sent, by the network, to the mobile device as well as to its peer buddy devices that may have previously informed the network of their interest in discovering the mobile's location. To ensure privacy, the mobile may inform the network about whether it wants to participate in the network's codebook optimization program and also which of its buddy peers may be able to obtain its location codebook.

In another embodiment, the mobile itself determines its location by running a positioning algorithm. In this case, the mobile device may autonomously keep track of the history of locations (and the time stamps) based on which it may perform optimization of the user's location codebook. The mobile may then send its location codebook to the network or directly to its buddy peers.

Successive refinement of location will be discussed. In general, the greater the number of quantization levels, the greater the accuracy of the mobile's reported location. The number of bits in the codeword, however, increases with the increase in the number of quantization levels. In a network where multiple mobiles are not only broadcasting their location but are also participating in delay-sensitive data traffic communication, having longer codewords intended for broadcast means incurring a greater latency of communicating them. If the broadcast message is too long for an individual broadcast signal burst, as dictated by latency and overhead requirements, then it may be fragmented and transmitted over multiple broadcast intervals. For instance, in an exemplary peer to peer protocol, it takes eight individual peer-discovery bursts, occurring over a period of 8 seconds, to convey the unique identifier of a given mobile device.

Though this fundamental tradeoff between location accuracy and location report latency cannot be avoided, in some exemplary embodiments, an approach is used which incrementally broadcasts location information so that the longer a mobile device listens to the stream of location information coming from another mobile device, the more accurately it will be able to determine that device's location. In one embodiment, e.g., an exemplary peer to peer signaling protocol embodiment, the location codeword may be broken up into groups of bits that are broadcast in a sequence along with the peer discovery identification. In order to decode the location information, the receiver assembles the groups of codeword bits in the correct order. To do this, additional information may be, and sometimes is, supplied by the transmitter in the form of header bits.

In another embodiment, a product codebook, as described in the map quantization section above, may be used in order to facilitate the successive refinement of location. In this context, the mobile device may transmit, during each peer discovery signal burst, a sub-codeword drawn from the set of sub-codebooks constituting the product codebook. During each peer discovery burst, then, the listening mobile obtains coarse information about the position of the transmitting mobile by determining the region represented by the received sub-codeword. In addition, the listening device may form the intersection of the regions represented by the received codewords in order to obtain a finer estimate of the location of the transmitting mobile. On the one hand the benefit of this scheme is that, since coarse location is constantly transmitted, the listening device may immediately determine the coarse location no matter which of the sub-codewords it decodes. On the other hand, the "code rate" may be significantly reduced because of the inherent redundancy built into the product codebook as well as the additional and recurring bits that would be required to inform the listening mobile about which sub-codebook is used in each peer discovery signal burst.

In another embodiment, the refinement of location information can be transmitted "on demand". For instance, a mobile that typically only transmits coarse location information in every peer discovery burst (e.g. as described above) may transmit finer location information if it detects a peer that may be interested in learning its coordinates with greater precision. This peer may actively indicate its desire to learn more about the discovered mobile in its own peer discovery signals or the mobile itself may unilaterally decide to occasionally transmit more precise location information because it has detected the presence of the buddy peer. In another embodiment, the mobile device may be sending a sequence of sub-codewords from coarse location sub-codebooks drawn from a product codebook. In this case, the mobile may send (upon request or unilaterally) a coarse location sub-codeword that helps refine the location estimate of another buddy peer that it has discovered. In this way, relatively precise location information can be exchanged relatively quickly over peer discovery signals without the need for dedicated data traffic links.

Multi-resolution location codebooks will now be described. In another embodiment, a multi-resolution codebook may be used to convey more precise location information to receivers that have a good signal-to-noise-ratio (SNR) with respect to the transmitting mobile, while still allowing the listening devices with poor SNRs to decode the coarse position information. For instance, the mobile device may transmit codewords drawn from two codebooks, one intended for coarse location information (the coarse codebook) and the other for fine location information (the fine codebook). The mobile may transmit a superposition (e.g. addition) of two codewords, one drawn from the coarse codebook and the other from the fine codebook. If the receiver has a good SNR, it decodes both of the codewords. If the receiver has a relatively poor SNR, it may decode only the codeword that was drawn from the coarse codebook.

The two codebooks may be product codebooks, as described in the previous section. In this way, the latency of location determination using successive refinement can be decreased by transmitting, e.g. during each peer discovery signal burst, a superposition of two sub-codewords: one from the coarse product codebook and the other from the fine product codebook. One of the benefits of this scheme is that the listening devices that are near the transmitting mobile can relatively quickly obtain the mobile's location with relatively high precision, as compared to the far away receivers. This suits the general mode of operation of a typical location-based application in that meaningful device-to-device interactions at short distances are expected to require a higher precision of location information and a lower latency of obtaining it, as compared to interactions at long-distances.

In various embodiments a mobile wireless device, e.g., mobile wireless device 300 of FIG. 3 or mobile wireless device 1200 of FIG. 12 or mobile wireless device 2000 of FIG. 20, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/ or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of communicating the position of a device using codewords, the method comprising:
    selecting, based on a location of the device, a first codeword from a first codebook, said first codeword corresponding to a first geographic area;
    selecting, based on the location of the device, a second codeword from a second codebook, said second codeword corresponding to a second geographic area; and
    transmitting said first and second codewords, the intersection of the first and second areas to which the first and second codewords correspond indicating the location of the device.
2. The method of claim 1,
    wherein codewords of the first codebook correspond to different areas of a first map.
3. The method of claim 2,
    wherein codewords of the second codebook correspond to locations of different types, an individual word in said second codebook indicating one of said different types.
4. The method of claim 2, wherein said second codeword indicates a nearest office or conference room to the current location of the device.

5. The method of claim 1, wherein transmitting said first and second codewords including transmitting said first code word during a first peer discovery time period and transmitting said second codeword during a second peer discovery time period.
6. A mobile wireless device comprising:
    means for selecting based on a location of the device a first codeword from a first codebook, said first codeword corresponding to a first geographic area;
    means for selecting based on the location of the device a second codeword from a second codebook, said second codeword corresponding to a second geographic area; and
    means for transmitting said first and second codewords, the intersection of the first and second areas to which the first and second codewords correspond indicating the location of the device.
7. The mobile wireless device of claim 6,
    wherein codewords of the first codebook correspond to different areas of a first map.
8. The mobile wireless device of claim 7,
    wherein codewords of the second codebook correspond to locations of different types, an individual word in said second codebook indicating one of said different types.
9. The mobile wireless device of claim 7, wherein said second codeword indicates a nearest office or conference room to the current location of the device.
10. The mobile wireless device of claim 6, wherein said means for transmitting said first and second codewords includes means for transmitting said first code word during a first peer discovery time period and means for transmitting said second codeword during a second peer discovery time period.
11. A computer program product for use in a mobile wireless device, the computer program product comprising:
    a non-transitory computer readable medium comprising:
        code for causing at least one computer to select, based on a location of the device, a first codeword from a first codebook, said first codeword corresponding to a first geographic area;
        code for causing said at least one computer to select, based on the location of the device, a second codeword from a second codebook, said second codeword corresponding to a second geographic area; and
        code for causing said at least one computer to transmit said first and second codewords, the intersection of the first and second areas to which the first and second codewords correspond indicating the location of the device.
12. A mobile wireless device comprising:
    at least one processor configured to:
        select, based on a location of the device, a first codeword from a first codebook, said first codeword corresponding to a first geographic area;
        select, based on the location of the device, a second codeword from a second codebook, said second codeword corresponding to a second geographic area; and
        transmit said first and second codewords, the intersection of the first and second areas to which the first and second codewords correspond indicating the location of the device; and
    memory coupled to said at least one processor.
13. The mobile wireless device of claim 12,
    wherein codewords of the first codebook correspond to different areas of a first map.

14. The mobile wireless device of claim 13, wherein codewords of the second codebook correspond to locations of different types, an individual word in said second codebook indicating one of said different types.

15. The mobile wireless device of claim 13, wherein said second codeword indicates a nearest office or conference room to the current location of the device.

16. A method of operating a first device to determine the location of a second device, comprising:
receiving a peer discovery signal from said second device providing a codeword communicating location information;
selecting, based on a user identifier or device identifier associated with the received peer discovery signal, which one of a plurality of user specific sets of codeword to location mapping information to use in interpreting the received codeword; and
determining a location of the second device indicated by the received codeword from the selected one of the user specific sets of codeword to location mapping information.

17. The method of claim 16, further comprising:
receiving said plurality of user specific sets of codeword to location mapping information from a codeword dictionary distribution node, said plurality of user specific sets of codeword to location mapping information corresponding to users on a buddy list.

18. The method of claim 16, further comprising:
communicating first device location information to a codeword dictionary distribution node, said first device location information indicating various locations visited by said first device over a period of time; and
receiving from the codeword dictionary distribution node a user specific set of codeword to location mapping information corresponding to the first device, said received user specific set of codeword to location mapping information indicating codewords corresponding to at least some of the various locations visited by the first device.

19. The method of claim 18, further comprising:
broadcasting a codeword from the received user specific set of codeword to location mapping information corresponding to the first device to indicate the location of the first device to other devices.

20. The method of claim 19, further comprising:
communicating a user identifier or device identifier, said user identifier or device identifier matching a user identifier or device identifier corresponding to the user specific set of codeword to location mapping information that corresponds to the user of the first device.

21. A first device comprising:
means for receiving a peer discovery signal from a second device providing a codeword communicating location information;
means for selecting, based on a user identifier or device identifier associated with the received peer discovery signal, which one of a plurality of user specific sets of codeword to location mapping information to use in interpreting the received codeword; and
means for determining a location of the second device indicated by the received codeword from the selected one of the user specific sets of codeword to location mapping information.

22. The first device of claim 21, further comprising:
means for receiving said plurality of user specific sets of codeword to location mapping information from a codeword dictionary distribution node, said plurality of user specific sets of codeword to location mapping information corresponding to users on a buddy list.

23. The first device of claim 21, further comprising:
means for communicating first device location information to a codeword dictionary distribution node, said first device location information indicating various locations visited by said first device over a period of time; and
means for receiving from the codeword dictionary distribution node a user specific set of codeword to location mapping information corresponding to the first device, said received user specific set of codeword to location mapping information indicating codewords corresponding to at least some of the various locations visited by the first device.

24. The first device of claim 23, further comprising:
means for broadcasting a codeword from the received user specific set of codeword to location mapping information corresponding to the first device to indicate the location of the first device to other devices.

25. The first device of claim 24, further comprising:
means for communicating a user identifier or device identifier, said user identifier or device identifier matching a user identifier or device identifier corresponding to the user specific set of codeword to location mapping information that corresponds to the user of the first device.

26. A computer program product for use in a first device, the computer program product comprising:
a non-transitory computer readable medium comprising:
code for causing at least one computer to receive a peer discovery signal from a second device providing a codeword communicating location information;
code for causing said at least one computer to select, based on a user identifier or device identifier associated with the received peer discovery signal, which one of a plurality of user specific sets of codeword to location mapping information to use in interpreting the received codeword; and
code for causing said at least one computer to determine a location of the second device indicated by the received codeword from the selected one of the user specific sets of codeword to location mapping information.

27. A first device comprising:
at least one processor configured to:
receive a peer discovery signal from a second device providing a codeword communicating location information;
select, based on a user identifier or device identifier associated with the received peer discovery signal, which one of a plurality of user specific sets of codeword to location mapping information to use in interpreting the received codeword; and
determine a location of the second device indicated by the received codeword from the selected one of the user specific sets of codeword to location mapping information; and
memory coupled to said at least one processor.

28. The first device of claim 27, wherein said at least one processor is further configured to:
receive said plurality of user specific sets of codeword to location mapping information from a codeword dictionary distribution node, said plurality of user specific sets of codeword to location mapping information corresponding to users on a buddy list.

29. The first device of claim 27, wherein said at least one processor is further configured to:
- communicate first device location information to a codeword dictionary distribution node, said first device location information indicating various locations visited by said first device over a period of time; and
- receive from the codeword dictionary distribution node a user specific set of codeword to location mapping information corresponding to the first device, said received user specific set of codeword to location mapping information indicating codewords corresponding to at least some of the various locations visited by the first device.

30. The first device of claim 29, wherein said at least one processor is further configured to:
- broadcast a codeword from the received user specific set of codeword to location mapping information corresponding to the first device to indicate the location of the first device to other devices.

31. A method of operating a device to transmit location information, the method comprising:
- determining, based on the location of said device, first location information to transmit;
- determining, based on the location of said device, second location information to transmit, said second location information indicating a second geographic area which intersects a first geographic area indicated by said first location information;
- transmitting the first location information at a first power level and at a first coding rate; and
- transmitting the second location information at a second power level and at a second coding rate, at least one of: the second power level being lower than said first power level and the second coding rate being higher than said first coding rate.

32. The method of claim 31, wherein the transmission range of the first location information is greater than the transmission range of the second location information.

33. The method of claim 32, wherein the transmission rate of the second location information is higher than the transmission rate of the first location information.

34. The method of claim 31, wherein the first location information and the second location information are transmitted during the same peer discovery transmission time interval.

35. The method of claim 34, wherein said second location information is transmitted as a superimposed signal on the first location information.

36. A mobile wireless device comprising:
- means for determining, based on the location of said device, first location information to transmit;
- means for determining, based on the location of said device, second location information to transmit, said second location information indicating a second geographic area which intersects a first geographic area indicated by said first location information;
- means for transmitting the first location information at a first power level and at a first coding rate; and
- means for transmitting the second location information at a second power level and at a second coding rate, at least one of: the second power level being lower than said first power level and the second coding rate being higher than said first coding rate.

37. The mobile wireless device of claim 36, wherein the transmission range of the first location information is greater than the transmission range of the second location information.

38. The mobile wireless device of claim 37, wherein the transmission rate of the second location information is higher than the transmission rate of the first location information.

39. The mobile wireless device of claim 36, wherein the first location information and the second location information are transmitted during the same peer discovery transmission time interval.

40. The mobile wireless device of claim 39, wherein said second location information is transmitted as a superimposed signal on the first location information.

41. A computer program product for use in a mobile wireless device, the computer program product comprising:
- a non-transitory computer readable medium comprising:
  - code for causing at least one computer to determine, based on the location of said device, first location information to transmit;
  - code for causing said at least one computer to determine, based on the location of said device, second location information to transmit, said second location information indicating a second geographic area which intersects a first geographic area indicated by said first location information;
  - code for causing said at least one computer to transmit the first location information at a first power level and at a first coding rate; and
  - code for causing said at least one computer to transmit the second location information at a second power level and at a second coding rate, at least one of: the second power level being lower than said first power level and the second coding rate being higher than said first coding rate.

42. A mobile wireless device comprising:
at least one processor configured to:
- determine, based on the location of said device, first location information to transmit;
- determine, based on the location of said device, second location information to transmit, said second location information indicating a second geographic area which intersects a first geographic area indicated by said first location information;
- transmit the first location information at a first power level and at a first coding rate; and
- transmit the second location information at a second power level and at a second coding rate, at least one of: the second power level being lower than said first power level and the second coding rate being higher than said first coding rate; and memory coupled to said at least one processor.

43. The mobile wireless device of claim 42, wherein said at least one processor is configured such that the transmission range of the first location information is greater than the transmission range of the second location information.

44. The mobile wireless device of claim 43, wherein said at least one processor is configured such that the transmission rate of the second location information is higher than the transmission rate of the first location information.

45. The mobile wireless device of claim 42, wherein said at least one processor is further configured to transmit said first location information and the second location information during the same peer discovery transmission time interval.

* * * * *